United States Patent
Kang et al.

(10) Patent No.: US 11,334,222 B2
(45) Date of Patent: *May 17, 2022

(54) USER TERMINAL DEVICE AND DISPLAYING METHOD THEREOF

(71) Applicant: SAMSUNG ELECTRONICS CO., LTD., Suwon-si (KR)

(72) Inventors: Dong-Goo Kang, Seoul (KR);
Yun-kyung Kim, Suwon-si (KR);
Yong-yeon Lee, Suwon-si (KR);
Ji-yeon Kwak, Seoul (KR); Yeo-jun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,456

(22) Filed: Nov. 6, 2020

(65) Prior Publication Data

US 2021/0055840 A1 Feb. 25, 2021

Related U.S. Application Data

(63) Continuation of application No. 16/683,629, filed on Nov. 14, 2019, now Pat. No. 10,831,343, which is a
(Continued)

(30) Foreign Application Priority Data

Jul. 3, 2014 (KR) ........................ 10-2014-0083244

(51) Int. Cl.
*G06F 3/041* (2006.01)
*G06F 3/0482* (2013.01)
(Continued)

(52) U.S. Cl.
CPC .......... *G06F 3/0482* (2013.01); *G06F 1/1641* (2013.01); *G06F 1/1652* (2013.01);
(Continued)

(58) Field of Classification Search
CPC .... G06F 1/1641; G06F 1/1652; G06F 1/1694; G06F 2203/04803; G06F 3/0482;
(Continued)

(56) References Cited

U.S. PATENT DOCUMENTS 7,453,437 B2 11/2008 Inui
8,502,788 B2 8/2013 Cho
(Continued)

FOREIGN PATENT DOCUMENTS

CN 1334690 A 2/2002
CN 1879395 A 12/2006
(Continued)

OTHER PUBLICATIONS

Communication dated Mar. 29, 2021, issued by the Korean Intellectual Property Office in Korean Patent Application No. 10-2020-0066043.
(Continued)

*Primary Examiner* — Insa Sadio
(74) *Attorney, Agent, or Firm* — Sughrue Mion, PLLC

(57) ABSTRACT

A user terminal device and a displaying method thereof are provided. The user terminal device includes a display configured to display a first screen on a display which is divided by a folding line into a first area and a second area, the second area being larger than the first area with reference to a folding line and including an exposure area that is exposed while the display is folded along the folding line such that the first area faces the second area, a detector configured to detect, while the first screen is displayed, a first folding interaction of folding the display such that the first area faces
(Continued)

the second area and a second folding interaction of folding the display such that a first cover corresponding to the first area faces a second cover corresponding to the second area, and a controller configured to, in response to detecting the first folding interaction, display a second screen related to the first screen on the exposure area, and in response to the second folding interaction being detected, display a third screen related to the first screen on the first area or the second area.

24 Claims, 81 Drawing Sheets

Related U.S. Application Data continuation of application No. 16/165,736, filed on Oct. 19, 2018, now Pat. No. 10,503,368, which is a continuation of application No. 14/618,447, filed on Feb. 10, 2015, now Pat. No. 10,152,201.

(60) Provisional application No. 61/937,744, filed on Feb. 10, 2014.

(51) Int. Cl.
| | | |
|---|---|---|
| *G06F 9/451* | (2018.01) | |
| *G06F 3/0487* | (2013.01) | |
| *G06F 1/16* | (2006.01) | |
| *H04M 1/02* | (2006.01) | |
| *G06F 3/04883* | (2022.01) | |
| *G06F 3/04886* | (2022.01) | |
| *G11B 27/34* | (2006.01) | |
| *G06F 3/04817* | (2022.01) | |
| *G06F 3/04842* | (2022.01) | |
| *H04M 1/72403* | (2021.01) | |
| *H04M 1/72469* | (2021.01) | |
| *G06F 3/0488* | (2022.01) | |

(52) U.S. Cl.
CPC .......... *G06F 1/1677* (2013.01); *G06F 1/1694* (2013.01); *G06F 3/0487* (2013.01); *G06F 3/0488* (2013.01); *G06F 3/04817* (2013.01); *G06F 3/04842* (2013.01); *G06F 3/04883* (2013.01); *G06F 3/04886* (2013.01); *G06F 9/451* (2018.02); *G11B 27/34* (2013.01); *H04M 1/0214* (2013.01); *H04M 1/0243* (2013.01); *H04M 1/0245* (2013.01); *H04M 1/0268* (2013.01); *H04M 1/72403* (2021.01); *H04M 1/72469* (2021.01); *G06F 2200/1637* (2013.01); *G06F 2203/04803* (2013.01); *H04M 2250/16* (2013.01); *H04M 2250/22* (2013.01)

(58) Field of Classification Search
CPC .. G06F 3/0487; G06F 3/0488; G06F 3/04883; G06F 3/04886; G06F 9/4443; G06F 9/451; H04M 1/0214; H04M 1/0243; H04M 1/0245; H04M 1/0268; H04M 1/72522; H04M 1/72583; H04M 2250/16; H04M 2250/22

See application file for complete search history.

(56) References Cited

U.S. PATENT DOCUMENTS

| | | |
|---|---|---|
| 8,836,611 B2 | 9/2014 | Kilpatrick, II et al. |
| 8,863,038 B2 | 10/2014 | King et al. |
| 8,866,840 B2 | 10/2014 | Dahl et al. |
| 8,923,934 B2 | 12/2014 | Choi et al. |
| 8,947,462 B2 | 2/2015 | Joo |
| 9,020,571 B2 | 4/2015 | Chi et al. |
| 9,112,988 B2 | 8/2015 | Lee et al. |
| 9,436,378 B2 | 9/2016 | Lee et al. |
| 9,448,660 B2 | 9/2016 | Seo et al. |
| 9,489,078 B2 | 11/2016 | Seo et al. |
| 9,489,079 B2 | 11/2016 | Seo et al. |
| 9,489,080 B2 | 11/2016 | Seo et al. |
| 9,495,094 B2 | 11/2016 | Kang et al. |
| 9,684,342 B2 | 6/2017 | Kim et al. |
| 9,818,370 B2 | 11/2017 | Joo |
| 9,864,438 B2 | 1/2018 | Seo et al. |
| 10,114,476 B2 | 10/2018 | Seo et al. |
| 10,275,045 B2 | 4/2019 | Seo et al. |
| 10,459,625 B2 | 10/2019 | Seo et al. |
| 10,503,274 B2 | 12/2019 | Seo et al. |
| 10,534,531 B2 | 1/2020 | Seo et al. |
| 10,642,485 B1 | 5/2020 | Seo et al. |
| 2002/0005818 A1 | 1/2002 | Bruzzone |
| 2005/0104866 A1 | 5/2005 | Inui |
| 2006/0189345 A1 | 8/2006 | Suzuki et al. |
| 2007/0149262 A1 | 6/2007 | Navntoft |
| 2008/0158795 A1 | 7/2008 | Aoki et al. |
| 2009/0011798 A1 | 1/2009 | Yamada |
| 2009/0164951 A1 | 6/2009 | Kumar |
| 2010/0056272 A1 | 3/2010 | Dutilly et al. |
| 2010/0064244 A1 | 3/2010 | Kilpatrick, II et al. |
| 2010/0079355 A1 | 4/2010 | Kilpatrick, II et al. |
| 2010/0085274 A1 | 4/2010 | Kilpatrick, II et al. |
| 2010/0120470 A1 | 5/2010 | Kim et al. |
| 2010/0131880 A1 | 5/2010 | Lee et al. |
| 2010/0162169 A1 | 6/2010 | Skarp |
| 2010/0182265 A1 | 7/2010 | Kim et al. |
| 2010/0241989 A1 | 9/2010 | Wen |
| 2010/0302179 A1 | 12/2010 | Ahn et al. |
| 2011/0126141 A1 | 5/2011 | King et al. |
| 2011/0216064 A1 | 9/2011 | Dahl et al. |
| 2011/0241998 A1 | 10/2011 | McKinney et al. |
| 2012/0115422 A1 | 5/2012 | Tziortzis et al. |
| 2012/0129581 A1 | 5/2012 | Choi et al. |
| 2012/0174026 A1 | 7/2012 | Shim et al. |
| 2012/0212430 A1 | 8/2012 | Jung et al. |
| 2012/0262367 A1 | 10/2012 | Chiu et al. |
| 2012/0299813 A1 | 11/2012 | Kang et al. |
| 2012/0307472 A1 | 12/2012 | Bohn et al. |
| 2013/0021762 A1 | 1/2013 | van Dijk et al. |
| 2013/0027364 A1 | 1/2013 | Kim et al. |
| 2013/0050270 A1 | 2/2013 | Joo |
| 2013/0076649 A1 | 3/2013 | Myers et al. |
| 2013/0097668 A1 | 4/2013 | Park et al. |
| 2013/0120239 A1 | 5/2013 | Suzuki et al. |
| 2013/0127918 A1* | 5/2013 | Kang ............... G06F 1/1652 345/660 |
| 2013/0141373 A1 | 6/2013 | Takuma et al. |
| 2013/0154970 A1 | 6/2013 | Seo et al. |
| 2013/0176248 A1 | 7/2013 | Shin et al. |
| 2013/0215041 A1 | 8/2013 | Kim et al. |
| 2013/0222998 A1* | 8/2013 | Cho ............... G06F 1/1652 361/679.27 |
| 2013/0265221 A1 | 10/2013 | Lee et al. |
| 2013/0296000 A1 | 11/2013 | Park et al. |
| 2013/0300679 A1 | 11/2013 | Oh et al. |
| 2013/0300687 A1 | 11/2013 | Park |
| 2013/0300697 A1 | 11/2013 | Kim et al. |
| 2013/0307816 A1 | 11/2013 | Lee et al. |
| 2013/0314349 A1 | 11/2013 | Chien et al. |
| 2013/0315419 A1 | 11/2013 | Chien |
| 2013/0321340 A1 | 12/2013 | Seo et al. |
| 2013/0328914 A1 | 12/2013 | Smith et al. |
| 2014/0004906 A1 | 1/2014 | Chi et al. |
| 2014/0015743 A1 | 1/2014 | Seo et al. |
| 2014/0028596 A1 | 1/2014 | Seo et al. |
| 2014/0029212 A1 | 1/2014 | Hwang et al. |
| 2014/0062919 A1 | 3/2014 | Park |
| 2014/0245225 A1 | 8/2014 | Yagihashi et al. |
| 2014/0320393 A1 | 10/2014 | Modarres et al. |
| 2015/0004939 A1 | 1/2015 | Higashibeppu |
| 2015/0145798 A1 | 5/2015 | Joo |

(56) References Cited

U.S. PATENT DOCUMENTS

| | | | |
|---|---|---|---|
| 2015/0153778 A1 | 6/2015 | Jung | |
| 2015/0227271 A1 | 8/2015 | Kang et al. | |
| 2015/0277695 A1 | 10/2015 | Lee et al. | |
| 2015/0309691 A1 | 10/2015 | Seo et al. | |
| 2015/0378503 A1 | 12/2015 | Seo et al. | |
| 2016/0357397 A1 | 12/2016 | Lee et al. | |
| 2016/0370877 A1 | 12/2016 | Seo et al. | |
| 2017/0052698 A1 | 2/2017 | Seo et al. | |
| 2018/0120954 A1 | 5/2018 | Seo et al. | |
| 2019/0033984 A1 | 1/2019 | Seo et al. | |
| 2019/0179425 A1 | 6/2019 | Seo et al. | |
| 2019/0272091 A1 | 9/2019 | Seo et al. | |
| 2020/0117285 A1 | 4/2020 | Seo et al. | |

FOREIGN PATENT DOCUMENTS

| | | |
|---|---|---|
| CN | 101452365 A | 6/2009 |
| CN | 101788850 A | 7/2010 |
| CN | 102150095 A | 8/2011 |
| CN | 102150120 A | 8/2011 |
| CN | 102187296 A | 9/2011 |
| CN | 102469183 A | 5/2012 |
| CN | 102591558 A | 7/2012 |
| CN | 103477304 A | 12/2013 |
| EP | 2 581 808 A1 | 4/2013 |
| EP | 3 105 667 | 8/2015 |
| ER | 3 105 666 | 8/2015 |
| JP | 2005-149364 A | 6/2005 |
| JP | 2009-124449 A | 6/2009 |
| JP | 2009-201157 A | 9/2009 |
| JP | 2010-63159 A | 3/2010 |
| JP | 2010-66918 A | 3/2010 |
| JP | 2010-146506 A | 7/2010 |
| JP | 2013-073352 A | 4/2013 |
| KR | 10-2006-0066136 A | 6/2006 |
| KR | 10-2010-0019164 A | 2/2010 |
| KR | 10-1063882 B1 | 9/2011 |
| KR | 10-2012-0091979 A | 8/2012 |
| KR | 1020120092037 A | 8/2012 |
| KR | 10-2013-0024085 A | 3/2013 |
| KR | 10-2013-0056674 A | 5/2013 |
| KR | 10-2013-0113895 A | 10/2013 |
| KR | 10-2013-0127122 A | 11/2013 |
| KR | 10-2014-0003132 A | 1/2014 |
| KR | 10-2014-0016082 A | 2/2014 |
| RU | 2 480 811 C2 | 4/2013 |
| WO | 2005053287 A1 | 6/2005 |
| WO | 2008/147637 A1 | 12/2008 |
| WO | 2010028394 A1 | 3/2010 |
| WO | 2012160674 A1 | 11/2012 |
| WO | 2013/154318 A1 | 10/2013 |
| WO | 2014/021628 A1 | 2/2014 |

OTHER PUBLICATIONS

Communication dated Apr. 6, 2021, issued by the European Patent Office in counterpart European Application No. 20170860.9.
Communication dated May 3, 2021, issued by the United States Patent and Trademark Office in counterpart U.S. Appl. No. 16/571,261.
Communication dated May 12, 2021, issued by the Korean Intellectual Property Office in Korean Patent Application No. 10-2014-0134886.
Communication dated Jun. 4, 2021, issued by the European Patent Office in counterpart European Application No. 21156096.6.
Communication dated Oct. 31, 2018, issued by the Korean Intellectual Property Office in counterpart Korean Patent Application No. 10-2014-0090403.
Communication dated Feb. 12, 2019, from the European Patent Office in counterpart European Application No. 15746532.9.
Communication from United States Patent and Trademark Office dated Apr. 27, 2018, in U.S. Appl. No. 14/618,379.
Office Action dated Jul. 11, 2017, issued by the Australian Patent Office in counterpart Australian Application No. 2015214697.
Communication dated Nov. 28, 2018, issued by the USPTO in counterpart U.S. Appl. No. 14/618,379.
Communication dated Feb. 8, 2019, from the European Patent Office in counterpart European Application No. 15745916.5.
Communication dated Apr. 2, 2019, from the State Intellectual Property Office of People's Republic of China in counterpart Application No. 201580007942.5.
Communication dated Dec. 22, 2017, from the European Patent Office in counterpart European Application No. 15746584.0.
Communication dated Sep. 4, 2017 by the European Patent Office in counterpart European Patent Applicaation No. 15746532.9.
Communication dated Feb. 12, 2019, from the European Patent Office in counterpart European Application No. 15746883.6.
Communication dated Sep. 3, 2018, issued by the State Intellectual Property Office of P.R. China in counterpart Chinese Application No. 201580007989.1.
Communication dated Jul. 3, 2018, issued by the State Intellectual Property Office of P.R. China in counterpart Chinese Application No. 201580007942.5.
Communication dated Jul. 10, 2017, from the Japanese Patent Office in counterpart application No. 2016-568774.
Search Report dated Apr. 28, 2015, issued by the International Searching Authority in counterpart International Application No. PCT/KR2015/001347.
Search Report dated May 19, 2015, issued by the International Searching Authority in counterpart International Application No. PCT/KR2015/001341.
Communication dated Nov. 30, 2020, issued by the European Patent Office in European Application No. 15746584.0.
Communication dated Dec. 22, 2020, issued by the Korean Intellectual Property Office in Korean Application No. 10-2014-0083244.
Communication dated Dec. 22, 2020, issued by the Korean Intellectual Property Office in Korean Application No. 10-2014-0083282.
Communication issued by the European Patent Office dated Sep. 4, 2017 in counterpart European Patent Application No. 15746584.0.
Communication issued by the Australian Patent Office dated Nov. 8, 2017 in counterpart Australian Patent Application No. 2015214697.
Communication dated Mar. 22, 2017, issued by the United States Patent and Trademark Office in counterpart U.S. Appl. No. 14/618,379.
Communication dated May 14, 2019, issued by the Chinese Patent Office in counterpart Chinese Application No. 201580007972.6.
Communication dated Jun. 28, 2019, issued by the European Patent Office in counterpart European Application No. 15746584.0.
Communication dated Oct. 8, 2019, issued by the State Intellectual Property Office of P.R. China in counterpart Chinese Application No. 201580007942.5.
Written Opinion dated Apr. 28, 2015, issued by the International Searching Authority in counterpart International Application No. PCT/KR2015/001347.
Written Opinion dated May 19, 2015, issued by the International Searching Authority in counterpart International Application No. PCT/KR2015/001341.
Communication issued by the European Patent Office dated Sep. 19, 2017 in counterpart European Patent Application No. 15745916.5.
Communication issued by the United States Patent and Trademark Office dated Nov. 9, 2017 in counterpart United States U.S. Appl. No. 14/618,223.
Communication dated May 8, 2019, issued by the Chinese Patent Office in counterpart Chinese Application No. 201580007989.1.
Search Report dated Apr. 27, 2015, issued by the International Searching Authority in counterpart International Application No. PCT/KR2015/001266.
Search Report dated Apr. 30, 2015, issued by the International Searching Authority in counterpart International Application No. PCT/KR2015/001312.
Communication issued by the European Patent Office dated Oct. 2, 2017 in counterpart European Patent Application No. 15746883.6.
Communication issued by the United States Patent and Trademark Office dated Nov. 9, 2017 in counterpart United States U.S. Appl. No. 14/618,421.

(56) References Cited

OTHER PUBLICATIONS

Communication dated May 13, 2019, issued by the Korean Intellectual Property Office in corresponding Korean Application No. 10-2014-0090403.
Communication dated Dec. 17, 2018, issued by the USPTO in counterpart U.S. Appl. No. 14/618,223.
Communication dated Jan. 18, 2019, from the State Intellectual Property Office of People's Republic of China in counterpart Application No. 201580007966.0.
Communication dated Sep. 10, 2018, issued by the State Intellectual Property Office of P R. China in counterpart Chinese Application No. 201580007972.6.
Communication dated Jul. 2, 2018, issued by the State Intellectual Property Office of P R. China in counterpart Chinese Application No. 201580007966.0.
Communication from United States Patent and Trademark Office dated Jan. 29, 2018, in U.S. Appl. No. 14/618,223.
Communication from United States Patent and Trademark Office dated Jun. 8, 2017, in U.S. Appl. No. 14/618,223.
Communication dated Aug. 31, 2017 by the United States Patent and Trademark Office in counterpart U.S. Appl. No. 14/618,379.
Written Opinion dated Apr. 27, 2015, issued by the International Searching Authority in counterpart International Application No. PCT/KR2015/001266.
Written Opinion dated Apr. 30, 2015, issued by the International Searching Authority in counterpart International Application No. PCT/KR2015/001312.
Communication issued by the Russian Patent Office dated Oct. 27, 2007 in counterpart Russian Patent Application No. 2016136345.
Communication dated Jan. 20, 2017, issued by the United States Patent and Trademark Office in counterpart U.S. Appl. No. 14/618,421.
Communication dated Jun. 2, 2016 issued by the United States Patent and Trademark Office in counterpart U.S. Appl. No. 14/618,421.
Communication dated Jul. 9, 2019, issued by the European Patent Office in counterpart European Application No. 15746532.9.
Patent Examination Report No. 1 issued by the Australian IP Office in counterpart Australian Patent Application No. 2018203609 dated Jul. 31, 2019.
Communication dated Jul. 19, 2019, issued by the European Patent Office in counterpart European Application No. 15745916.5.
Communication dated Feb. 7, 2019, issued by the USPTO in counterpart U.S. Appl. No. 14/618,379.
Communication dated Nov. 20, 2019 issued by the Australian Patent Office in counterpart Australian Application No. 2018203609.
Communication dated Jan. 14, 2020 issued by the European Intellectual Property Office in counterpart European Application No. 15 746 532.9.
European Patent Office Examiner's proposal dated Dec. 11, 2019 issued by the European Intellectual Property Office in counterpart European Application No. 15 746 532.9.
Communication dated Dec. 30, 2019 issued by the Korean Intellectual Property Office in counterpart Korean Application No. 10-2014-0090403.

"How to Answer a Call on Samsung Galaxy Note 2", Jan. 1, 2013, 1 pages total, XP055651506, retrieved from URL: primeinspiration.com/how-to-answer-a-call-on-samsung-galaxy-note-2.html.
"Mailbox", 2013, 2 pages total, XP055651298, retrieved from URL: https://web.archive.org/web/20130427055457/http://uxarchive.com/apps/mailbox.
Communication dated Mar. 20, 2020 from the Indian Patent Office in application No. 201617029937.
Communication dated Apr. 20, 2020 from the Indian Patent Office in application No. 201617029932.
Communication dated May 14, 2020 from the United States Patent and Trademark Office in U.S. Appl. No. 16/594,666.
Communication dated May 14, 2020 from the United States Patent and Trademark Office in U.S. Appl. No. 16/849,653.
Communication dated May 19, 2020 from the Indian Patent Office in application No. 201617029935.
Communication dated Mar. 12, 2020 from the European Patent Office in application No. 19208930.8.
Communication dated Mar. 19, 2020 from the Indian Patent Office in application No. 201617029934.
Communication dated Jul. 7, 2020, from the European Patent Office in counterpart European Application No. 15746584.0.
Communication dated Aug. 5, 2020, from the Brazilian Patent Office in counterpart application No. BR112016018262-6.
Communication dated Aug. 12, 2020, from the European Patent Office in counterpart European Application No. 20170860.9.
Communication dated Aug. 31, 2020, issued by the Korean Intellectual Property Office in corresponding Korean Application No. 10-2020-0066043.
Communication dated Aug. 24, 2021 issued by the Intellectual Property India Patent Office in Indian Application No. 202018019449.
Communication dated Jun. 29, 2021 issued by the Korean Intellectual Property Office in Korean Application No. 10-2014-0083244.
Communication dated Oct. 11, 2021 issued by the European Patent Office in counterpart European Application No. 20 170 860.9.
Communication dated Nov. 9, 2021 issued by the European Patent Office in counterpart European Application No. 19 208 930.8.
Communication dated Dec. 6, 2021 issued by the Korean Intellectual Property Office in counterpart Korean Application No. 10-2021-0117204.
Communication dated Dec. 29, 2021 issued by the Korean Intellectual Property Office in counterpart Korean Application No. 10-2014-0083244.
Communication dated Feb. 24, 2022 by the European Patent Office for European Patent Application No. 20170860.9.
Communication dated Feb. 28, 2022 by the U.S. Patent Office for U.S. Appl. No. 17/164,364.
Communication dated Mar. 3, 2022 by the Korean Patent Office for Korean Patent Application No. 10-2014-0083244.
Communication dated Apr. 5, 2022, issued by the European Patent Office in counterpart European Application No. 20170860.9.

* cited by examiner

FIG. 23A
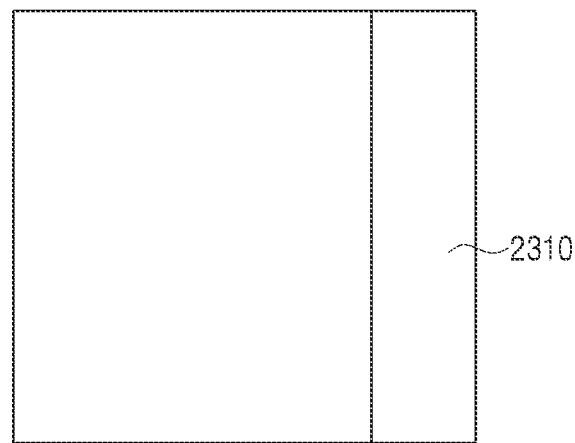
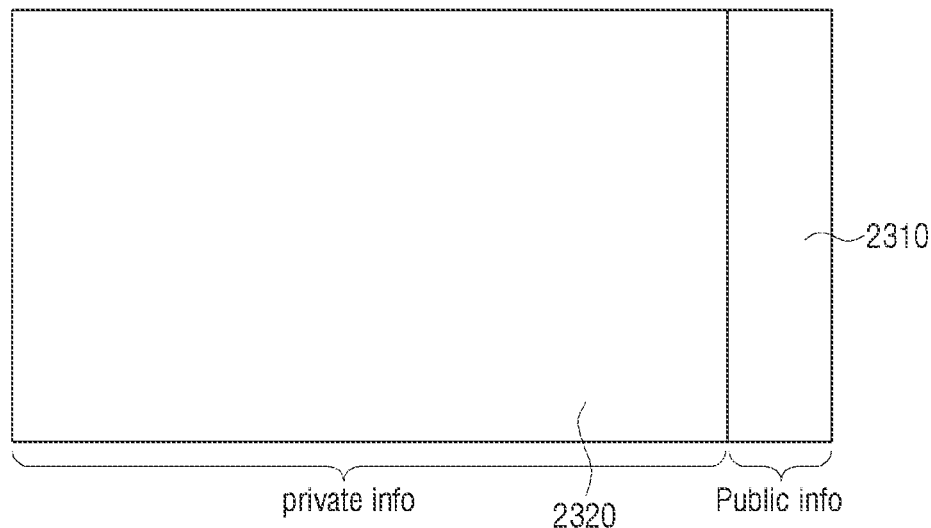

FIG. 23B
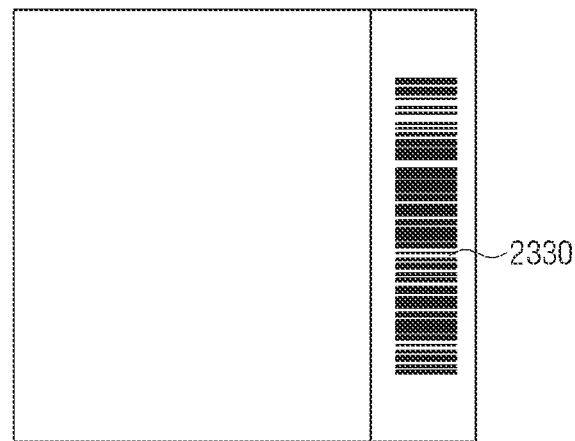
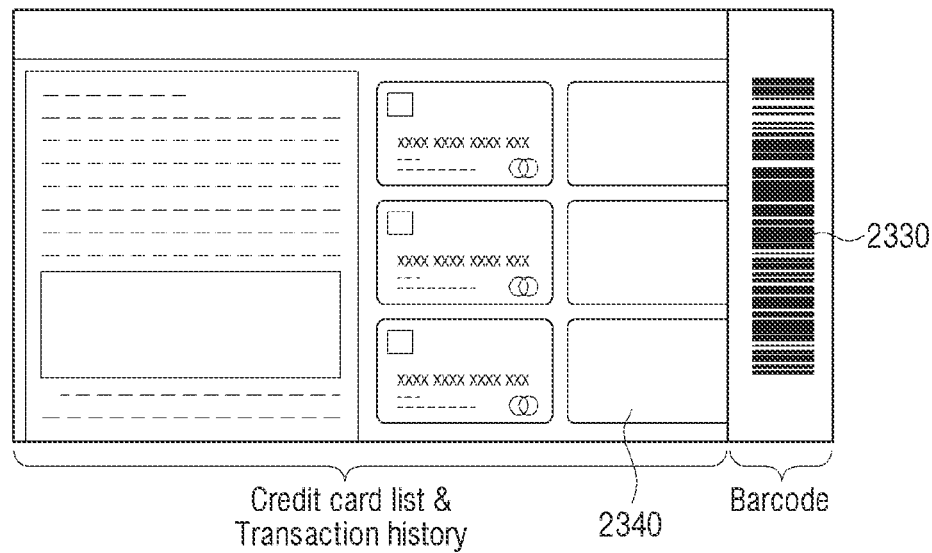

FIG. 26
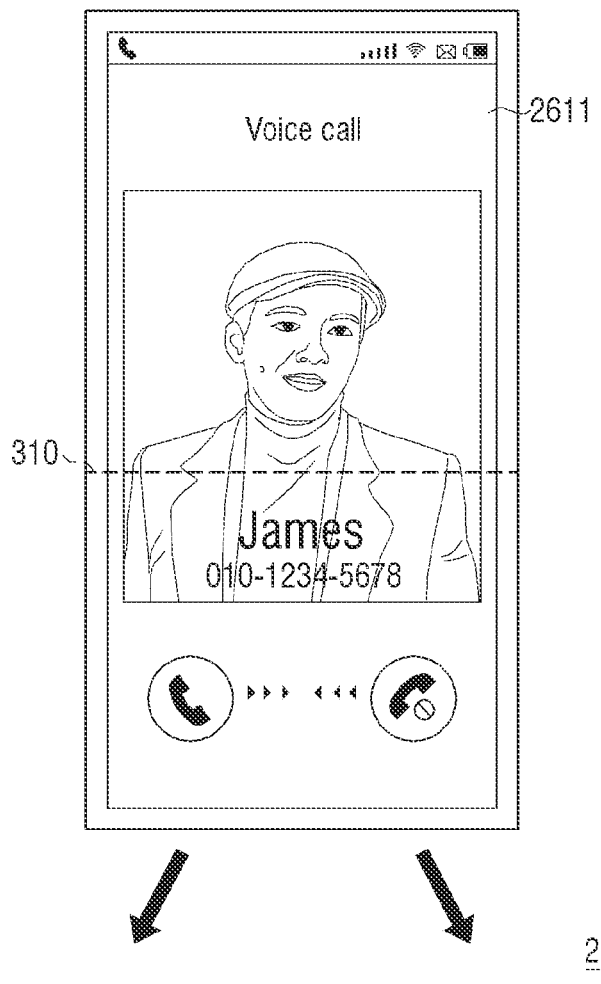
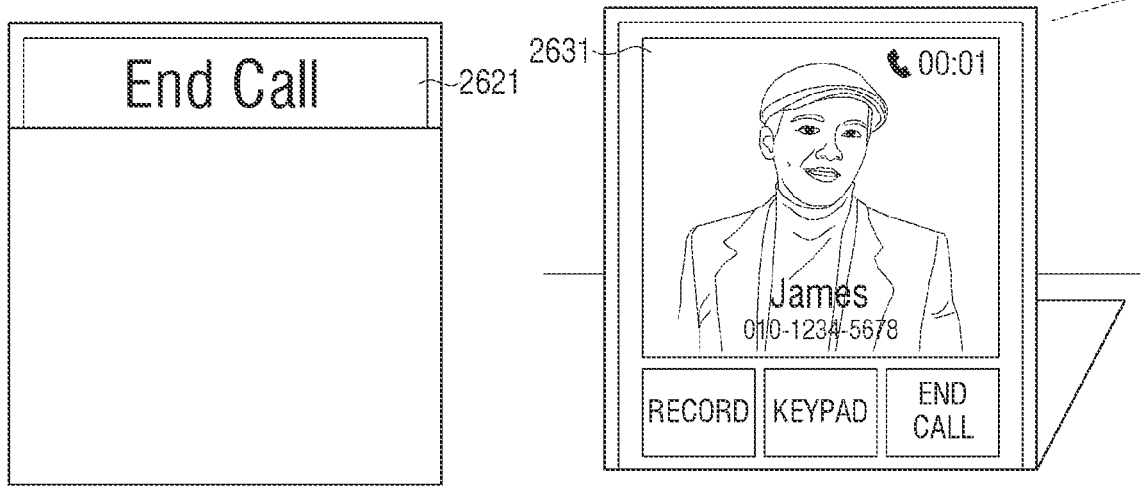

USER TERMINAL DEVICE AND DISPLAYING METHOD THEREOF

CROSS-REFERENCE TO RELATED APPLICATIONS

This application is a Continuation Application of U.S. application Ser. No. 16/683,629, filed on Nov. 14, 2019, which is a Continuation Application of U.S. patent application Ser. No. 16/165,736, filed on Oct. 19, 2018, which was issued as U.S. Pat. No. 10,503,368 on Dec. 10, 2019, which is a Continuation Application of U.S. patent application Ser. No. 14/618,447, filed on Feb. 10, 2015, in the U.S. Patent and Trademark Office, which was issued as U.S. Pat. No. 10,152,201 on Dec. 11, 2018, which claims priority from Korean Patent Application No. 10-2014-0083244, filed in the Korean Intellectual Property Office on Jul. 3, 2014, and the benefit of U.S. Provisional Application No. 61/937,744, filed in the United States Patent and Trademark Office on Feb. 10, 2014, the disclosures of which are incorporated herein by reference in their entireties.

BACKGROUND

1. Field

Apparatuses and methods consistent with exemplary embodiments relate to a user terminal device and a displaying method thereof, and more particularly, to a user terminal device where a display is folded asymmetrically with reference to a folding line so as to expose a part of the display and a displaying method thereof

2. Description of Related Art

With the development of electronic technology, various types of user terminal devices have been developed and distributed. Recently, the size of such user terminal devices has been minimized while the functions of the devices have become diverse and thus, the demands for user terminal devices have been increasing continuously.

A user terminal device may provide various content such as multimedia content and application screens according to a user's request. A user may select a desired function using a button or a touch screen provided with a user terminal device. A user terminal device may execute a program selectively according to a user interaction and display the result of execution.

Meanwhile, as a user terminal device provides far more diverse functions, there are various needs for a method of displaying content or a user interface method. In other words, as the method of displaying content has changed and the type and function of content have increased, the existing interaction methods, such as simply selecting a button or touching a screen, may not be sufficient to perform various functions of a user terminal device.

Particularly, a user terminal device of which display can be folded with reference to a folding line has been developed in order to minimize the size of the user terminal device. When the display is folded symmetrically with reference to the folding line, however, the display is folded completely and a user may not use or watch the display.

SUMMARY

Aspects of one or more exemplary embodiments relate to a user terminal device that, when a display is folded asymmetrically with reference to a folding line, exposes a part of the display, provides various User Interface (UI) through the exposed area, and a displaying method thereof According to an aspect of an exemplary embodiment, there is provided a displaying method of a user terminal device including a display which is divided into a first area and a second area by a folding line, the second area being larger than the first area and including an exposure area that is exposed while the display is folded along the folding line such that the first area faces the second area, the method including displaying a first screen on the first area and the second area, detecting at least one of a first folding interaction of folding the display such that the first area faces the second area and a second folding interaction of folding the display such that a first cover corresponding to the first area faces a second cover corresponding to the second area while the first screen is displayed, and in response to detecting the first folding interaction, displaying a second screen related to the first screen on the exposure area, and in response to detecting the second folding interaction, displaying a third screen related to the first screen on one of the first area and the second area, and the first screen.

In response to an incoming telephone call, the first screen is a screen for indicating the telephone call, one of the second screen and the third screen may be a screen for refusing the telephone call, and an other screen of the second screen and the third screen may be a screen for accepting the telephone call.

In response to the first screen including information, one of the second screen and the third screen may be a screen including brief summary information of the information.

In response to the first screen including one or more application icons, one of the second screen and the third screen may be a screen where each of the one or more application icons is classified and included in a corresponding folder according to its classification.

The method may further include displaying a visual effect of changing an object or an image content on the display.

According to an aspect of another exemplary embodiment, there is provided a displaying method of a user terminal device including a display which is divided into a first area and a second area by a folding line, the second area being larger than the first area and including an exposure area that is exposed while the display is folded along the folding line such that the first area faces the second area, the method including displaying a first screen on the exposure area, detecting at least one of an unfolding interaction of unfolding the display and a folding interaction of folding the display such that a first cover corresponding to the first area faces a second cover corresponding to the second area, and in response to detecting the unfolding interaction, displaying a second screen related to the first screen on the first area and the second area, and in response to detecting the folding interaction, displaying a third screen related to the first screen on the first area or the second area.

In response to the first screen including information, one of the second screen and the third screen may be a screen including detailed information of the information.

According to an aspect of another exemplary embodiment, there is provided a displaying method of a user terminal device including a display which is divided into a first area and a second area by a folding line, the second area being larger than the first area and including an exposure area that is exposed while the display is folded along the folding line such that the first area faces the second area, the method including displaying a first screen on the first area and the second area, detecting at least one of a first flap interaction of folding the display forward up to a predetermined angle range and then unfolding the display and a second flap interaction of folding the display backward up to a predetermined angle range and then unfolding the display, and in response to detecting the first flap interaction, displaying a second screen related to the first screen on the second area, and in response to detecting the second flap interaction, displaying a third screen related to the first screen on the second area.

In response to the first screen including information, one of the second screen and the third screen may be a screen including brief summary information of the information, and an other screen of the second screen and the third screen may be a screen including detailed information of the information.

In response to the first screen being a screen including an image content, one of the second screen and the third screen may be a screen displaying the image content magnified, and an other screen of the second screen and the third screen may be a screen displaying the image content reduced.

According to an aspect of still another exemplary embodiment, there is provided a user terminal device including a display which is divided into a first area and a second area by a folding line, the second area being larger than the first area and including an exposure area that is exposed while the display is folded along the folding line such that the first area faces the second area, the device including a display configured to display a first screen on the first area and the second area, a detector configured to detect, while the first screen is displayed, a first folding interaction of folding the display such that the first area faces the second area and a second folding interaction of folding the display such that a first cover corresponding to the first area faces a second cover corresponding to the second area, and a controller configured to, in response to detecting the first folding interaction, display a second screen related to the first screen on the exposure area, and in response to detecting the second folding interaction, display a third screen related to the first screen on the first area or the second area.

In response to an incoming telephone call, the first screen may be a screen for indicating the telephone call, one of the second screen and the third screen may be a screen for refusing the telephone call, and an other screen of the second screen and the third screen may be a screen for accepting the telephone call.

In response to the first screen including information, one of the second screen and the third screen may be a screen including brief summary information of the information.

In response to the first screen including one or more application icons, one of the second screen and the third screen may be a screen where each of the one or more application icons is classified and included in a corresponding folder according to its classification.

The controller may control the display to display a visual effect of changing an object or an image content on the display.

According to an aspect of yet another exemplary embodiment, there is provided a user terminal device including a display which is divided into a first area and a second area by a folding line, the second area being larger than the first area and including an exposure area that is exposed while the display is folded along the folding line such that the first area faces the second area, the device including a display configured to display a first screen on the exposure area, a detector configured to detect an unfolding interaction of unfolding the display and a folding interaction of folding the display such that a first cover corresponding to the first area faces a second cover corresponding to the second area, and a controller configured to, in response to detecting the unfolding interaction, displaying a second screen related to the first screen on the first area and the second area, and in response to detecting the folding interaction, displaying a third screen related to the first screen on the first area or the second area.

In response to the first screen including information, one of the second screen and the third screen may be a screen including detailed information of the information.

According to an aspect of another exemplary embodiment, there is provided a user terminal device including a display which is divided into a first area and a second area by a folding line, the second area being larger than the first area and including an exposure area that is exposed while the display is folded along the folding line such that the first area faces the second area, the device including a display configured to display a first screen on the first area and the second area, a detector configured to detect a first flap interaction of folding the display forward up to a predetermined angle range with reference to the folding line and then unfolding the display and a second flap interaction of folding the display backward up to a predetermined angle range and then unfolding the display, and a controller configured to, in response to detecting the first flap interaction, display a second screen related to the first screen on the second area, and in response to detecting the second flap interaction, display a third screen related to the first screen on the second area.

In response to the first screen including information, one of the second screen and the third screen may be a screen including brief summary information of the information, and an other screen of the second screen and the third screen may be a screen including detailed information of the information.

In response to the first screen being a screen including an image content, one of the second screen and the third screen may be a screen displaying the image content magnified, and an other screen of the second screen and the third screen may be a screen displaying the image content reduced.

Meanwhile, according to an aspect of another exemplary embodiment, a computer readable recording medium where a program for executing the above-described method is recorded may be provided.

In addition, another method for realizing an aspect of an exemplary embodiment, another system, and a computer readable recording medium where a computer program for executing the above-described method may be further provided.

As described above, according to various exemplary embodiments, a user may perform various functions of a user terminal device through a UI displayed on the exposure area even when the display is folded, and may be provided with various information.

BRIEF DESCRIPTION OF THE DRAWINGS

The above and/or other aspects of exemplary embodiments will become more apparent from the following description with reference to the accompanying drawings, in which:

FIGS. 8A to 16B are views illustrating various exemplary embodiments where a user terminal device performs various functions according to a folding interaction and an unfolding interaction;

FIGS. 17A to 34 are views illustrating various exemplary embodiments for maintaining functions of a user terminal device when a folding interaction and an unfolding interaction are detected.

DETAILED DESCRIPTION

Specific exemplary embodiments will be described with reference to accompanying drawings and detailed explanation. However, this does not necessarily limit the scope of the exemplary embodiments to a specific form. Instead, modifications, equivalents and replacements included in the disclosed concept and technical scope of this specification may be employed. While describing exemplary embodiments, if a specific description regarding a known technology might obscure the gist of an inventive concept, the specific description may be omitted.

In the present disclosure, relational terms such as first and second, and the like, may be used to distinguish one entity from another entity, without necessarily implying any actual relationship or order between such entities.

The terms used in the following description are provided to explain a specific exemplary embodiment and are not intended to limit the scope of rights. A singular term includes a plural form unless it expressly says otherwise. The terms, "include", "comprise", "is configured to", etc. of the description are used to indicate that there are features, numbers, steps, operations, elements, parts or a combination thereof, and they should not exclude the possibilities of combination or addition of one or more features, numbers, steps, operations, elements, parts or combination thereof In an exemplary embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor except for 'modules' or 'units' that should be realized in a specific hardware.

Figure 1:
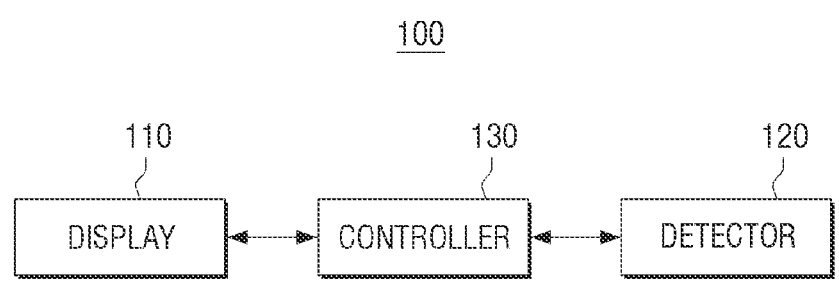
FIG. 1 is a block diagram illustrating configuration of a user terminal device briefly according to an exemplary embodiment.

Hereinafter, an exemplary embodiment will be described in detail with reference to accompanying drawings. FIG. 1 is a block diagram illustrating configuration of a user terminal device 100 according to an exemplary embodiment. As illustrated in FIG. 1, the user terminal device 100 includes a display 110, a detector 120, and a controller 130. The user terminal device 100 may be realized as various types of devices, such as a TV, monitor, PC, laptop PC, mobile phone, tablet PC, touchscreen, PDA, MP3 player, kiosk, electronic album, table display device, LCD display, LED display, OLED display, camera, watch, wearable device, etc. If a user terminal device is realized as a portable device, such as mobile phone, tablet PC, PDA, MP3 player, laptop PC, watch, wearable device, etc., the user terminal device may be referred to as a mobile device. Throughout this specification, for convenience and not for any limiting purposes, it may be referred to as a user terminal device.

The display 110 displays various image data and UIs. In particular, the display 110 may be realized as a touch screen as it is combined with a touch detector. In addition, the display 110 may include a folding line so that the display 110 may be folded.

In particular, the display 110 is divided by a folding line to form a first area and a second area which is larger than the first area. If the display is folded such that the first area comes in touch with the second area, the display 110 may display on an exposure area of the second area, the area exposed while the display 110 is folded, at least one of a UI including information regarding the user terminal device 100 and a UI for controlling the user terminal device 100.

The detector 120 detects a user interaction. In particular, the detector 120 may include a touch detector which detects a user's touch interaction. In addition, the detector 120 may include a folding detector which detects a folding interaction of folding the display 110 and an unfolding interaction of unfolding the display 110.

The controller 130 controls overall operations of the user terminal device 100. In particular, if the detector 120 detects a first folding interaction of folding the display 110 forward such that the first area faces the second area with reference to the folding line while a first screen is displayed on the first area and the second area, the controller 130 may control the display 110 to display a second screen related to the first screen on the exposed area of the second area in response to the first folding interaction. In addition, if the detector 120 detects a second folding interaction of folding the display 110 backward such that a first cover corresponding to the first area faces a second cover corresponding to the second area with reference to the folding line while the first screen is displayed on the first area and the second area, the controller 130 may control the display 110 to display a third screen related to the first screen on the first area or the second area. In this case, the first screen, the second screen, and the third screen may be different from one another.

Figure 2:
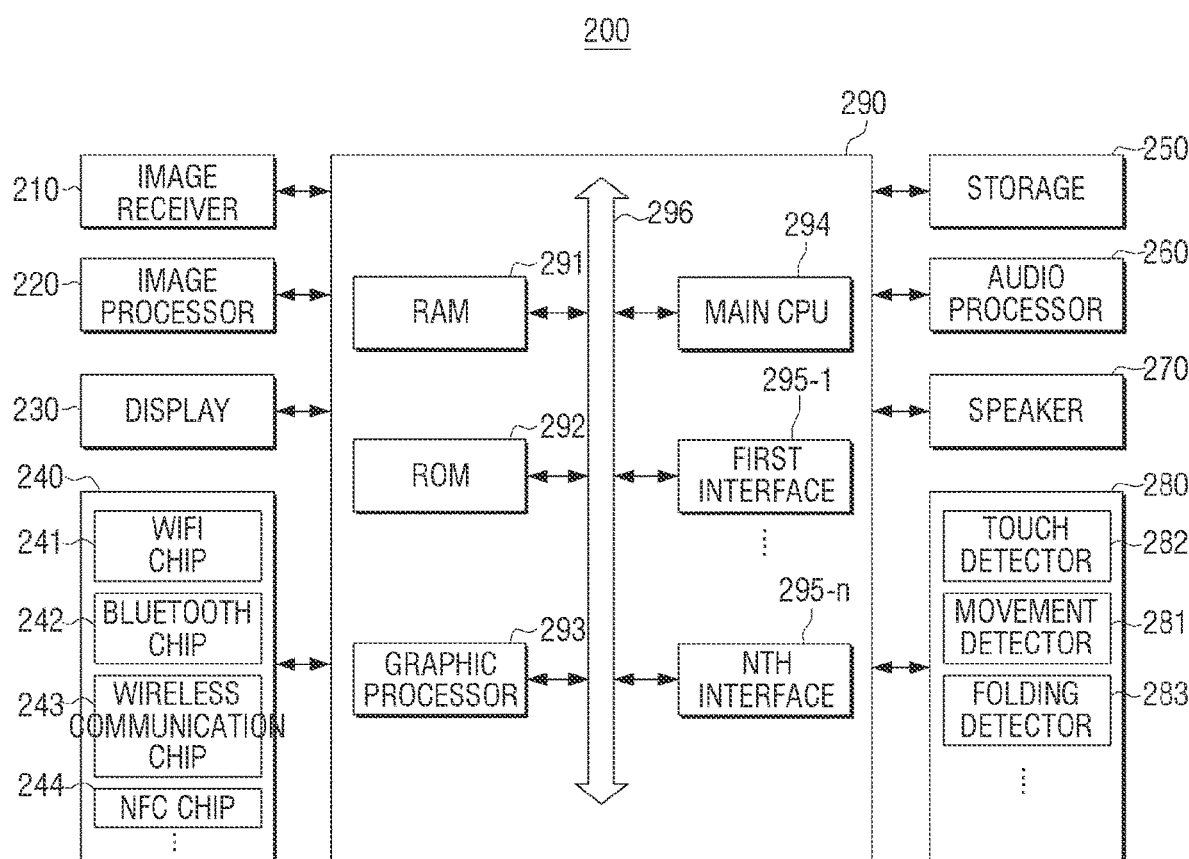
FIG. 2 is a block diagram illustrating a detailed configuration of a user terminal device according to an exemplary embodiment.

One or more exemplary embodiments will be described in greater detail with reference to FIGS. 2 to 23B. FIG. 2 is a block diagram illustrating configuration of a user terminal device 200 in detail according to an exemplary embodiment. As illustrated in FIG. 2, the user terminal device includes an image receiver 210, an image processor 220, a display 230, a communicator 240, a storage 250, an audio processor 260, a speaker 270, a detector 280, and a controller 290.

Meanwhile, FIG. 2 illustrates various components of the user terminal device 200 having various functions, such as a content providing function, display function, etc. Accordingly, according to one or more exemplary embodiments, a part of the components illustrated in FIG. 2 may be omitted or changed, or other components may be further added.

The image receiver 210 receives image data through various sources. For example, the image receiver 210 may receive broadcasting data from an external broadcasting station, VOD data in real time from an external server, or image data from an external apparatus.

The image processor 220 processes image data received from the image receiver 210. The image processor 220 may perform various image processing with respect to image data, such as decoding, scaling, noise filtering, frame rate conversion, resolution conversion, etc.

The display 230 displays at least one of a video frame which is generated as the image processor 220 processes image data received from the image receiver 220 and various screens generated by a graphic processor 293.

Figure 3A:
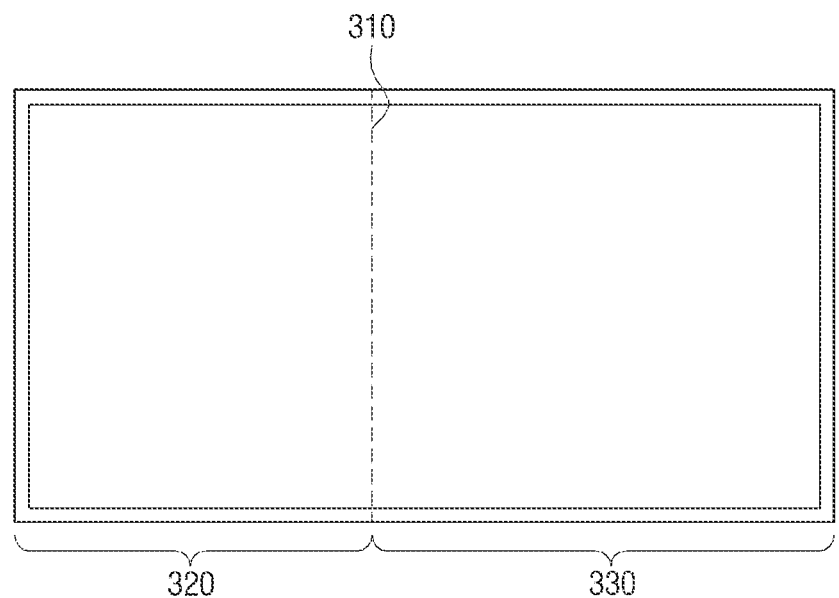
FIGS. 3A to 3E are views illustrating a user terminal device with a rectangular display panel according to an exemplary embodiment.
Figure 3B:
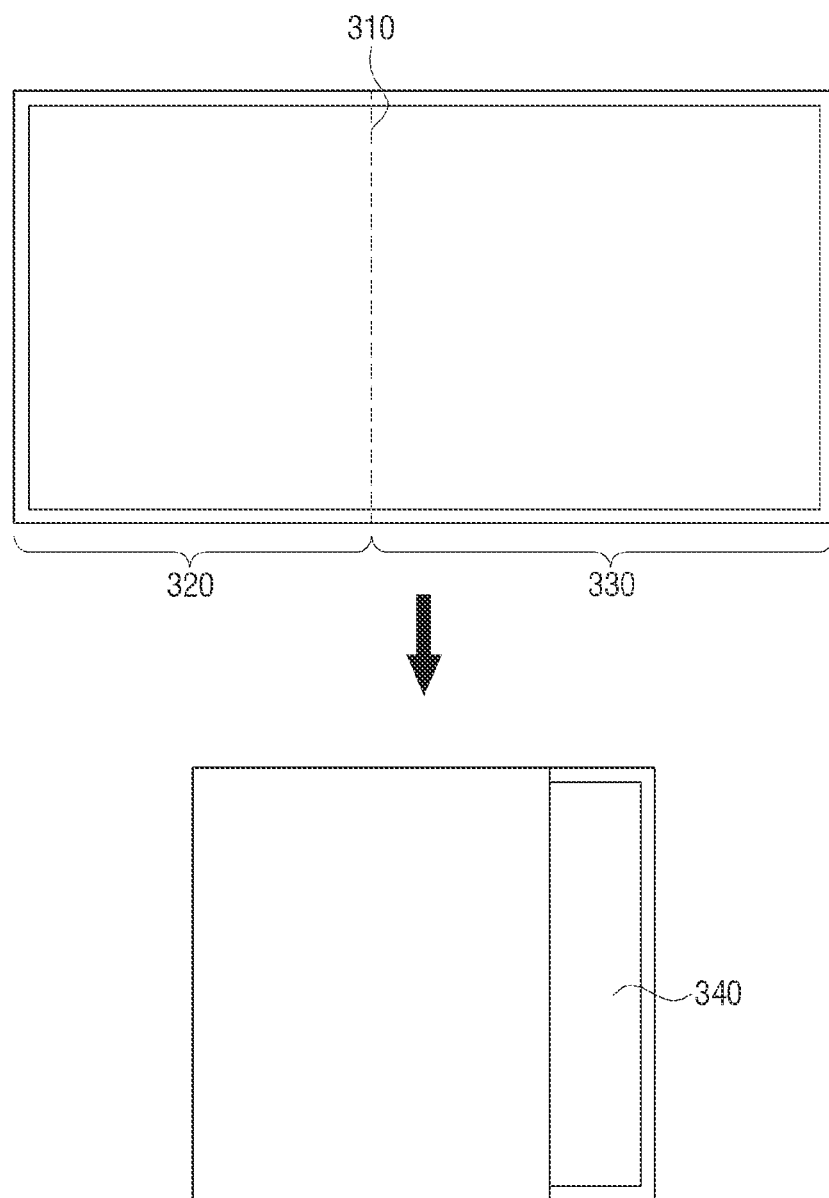
Figure 3C:
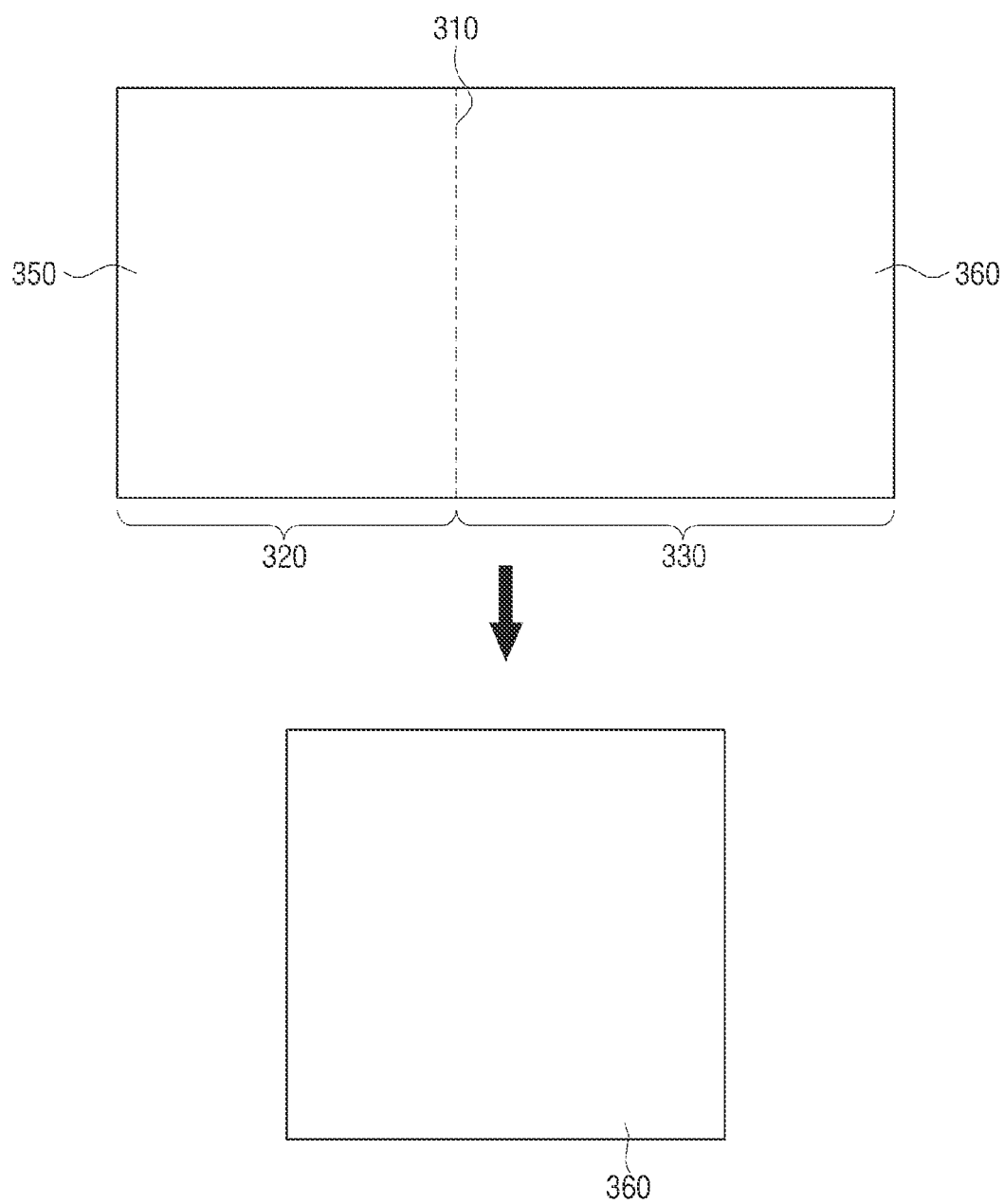

In particular, as illustrated in FIG. 3A, the display 230 may consist of a first area 320 and a second area 330 which is larger than the first area 320 with reference to a folding line 310. As illustrated in FIG. 3B, if the display 230 is folded with reference to the folding line 310, the display 230 may include an exposure area 340 which is the exposed part of the second area 330. Meanwhile, FIG. 3C is a view illustrating a cover which is on the rear side of the user terminal device 200 when the user terminal device 200 is folded. In other words, the rear side of the user terminal device 200 may include a first cover 350 corresponding to the first area 320 and a second cover 360 corresponding to the second area 330.

Figure 3D:
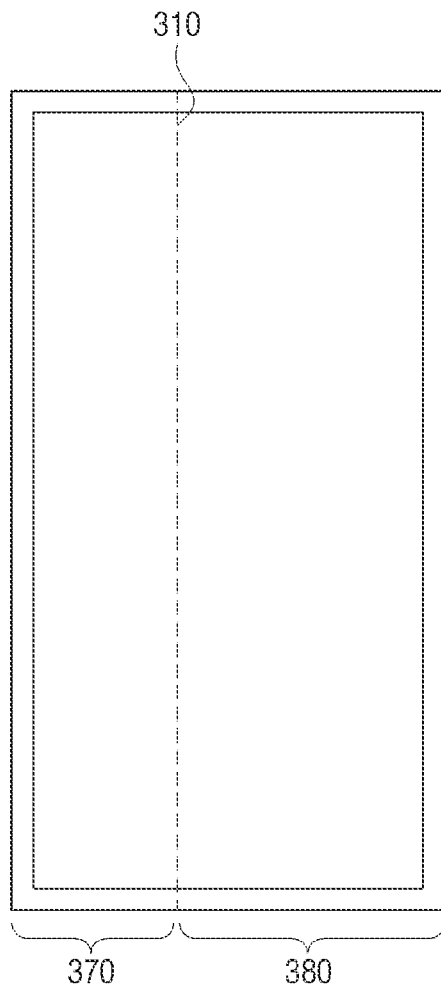
Figure 3E:
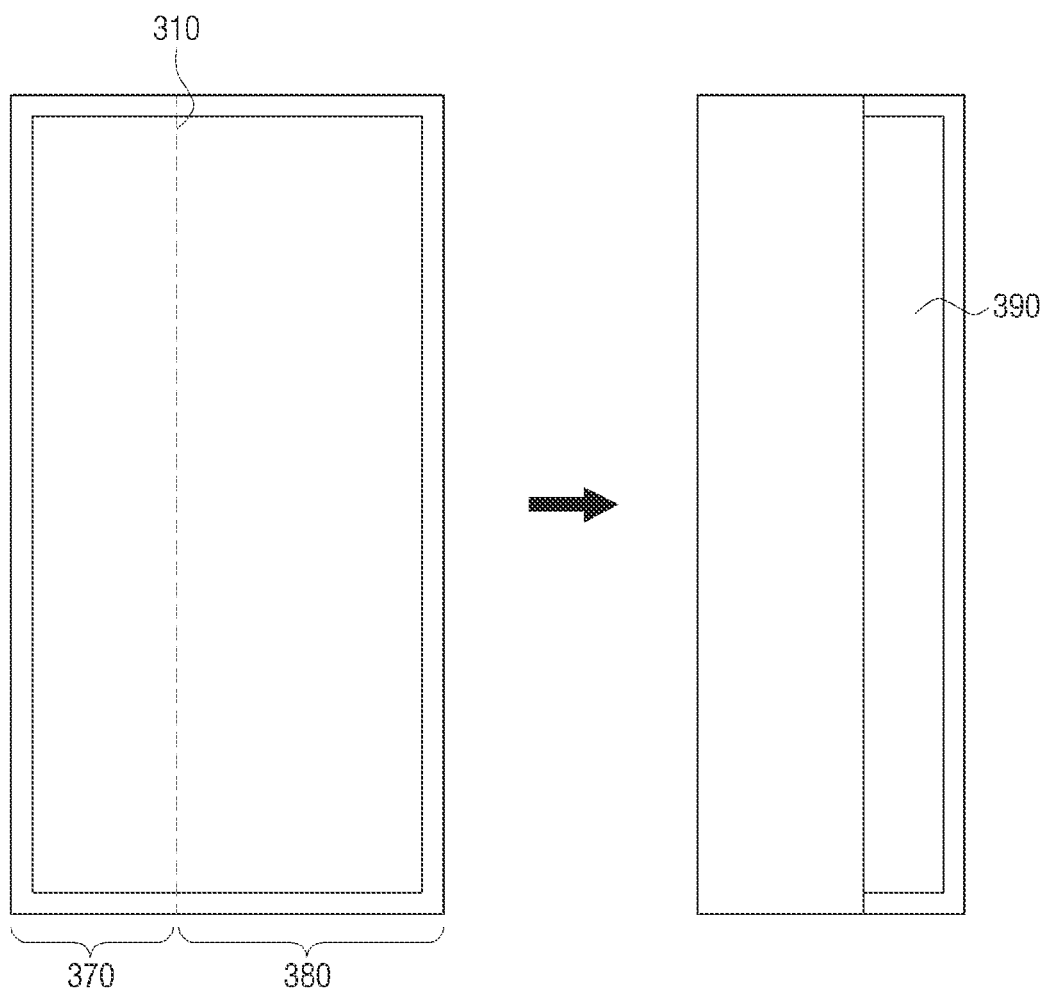

Meanwhile, in the above-described exemplary embodiment, the length of the folding line 310 is parallel with a short side, but this is only an example. As illustrated in FIG. 3D, the length of the folding line 310 may be in parallel with a long side. In this case, the display 230 may consist of a first area 370 and a second area 380 with reference to the folding line 310. As illustrated in FIG. 3E, if the display 230 is folded with reference to the folding line 310, the display 230 may include an exposure area 390 of the second area 380, which is exposed to outside.

Meanwhile, in the above-exemplary embodiment, the folding line 310 may be a line generated by a physical hinge. In addition, if the display 230 is a flexible display, the folding line 310 may be a line which can be folded by a user.

The communicator 240 performs communication with various types of external apparatuses according to various types of communication methods. The communicator 240 may include a WiFi chip 241, a Bluetooth chip 242, a wireless communication chip 243, and a Near Field Communication (NFC) chip 244. The controller 290 performs communication with various external apparatuses using the communicator 240.

In particular, the WiFi chip 241 and the Bluetooth chip 242 perform communication according to a WiFi method and a Bluetooth method, respectively. In the case of the WiFi chip 241 or the Bluetooth chip 242, various connection information, such as an SSID and a session key, may be transmitted/received first for communication connection and then, various information may be transmitted/received. The wireless communication chip 243 represents a chip which performs communication according to various communication standards such as IEEE, Zigbee, 3rd Generation (3G), 3rd Generation Partnership Project (3GPP), Long Term Evolution (LTE) and so on. The NFC chip 244 represents a chip which operates according to an NFC method which uses 13.56 MHz band among various RF-ID frequency bands such as 135 kHz, 13.56 MHz, 433 MHz, 860-960 MHz, 2.45 GHz, and so on.

Figure 4:
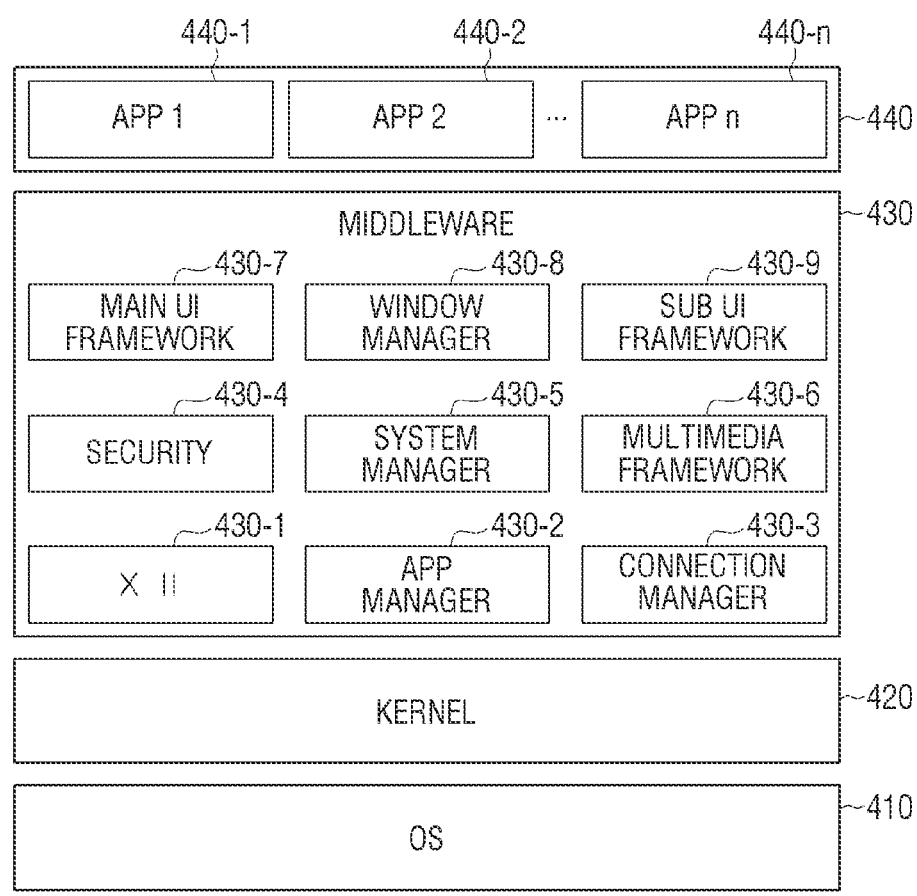
FIG. 4 is a view illustrating a configuration of software stored in a storage according to an exemplary embodiment.

The storage 250 may store various programs and data necessary to operate the user terminal device 200. Specifically, the storage 250 may store programs and data to configure various screens to be displayed on a main area and a sub area. FIG. 4 is a view provided to explain the structure of software stored in the user terminal device 200. According to FIG. 4, the storage 250 may store an Operating System (OS) 410, a kernel 420, middleware 430, an application 440, etc.

The OS 410 controls and manages overall operations of hardware. In other words, the OS 410 manages hardware and is responsible for basic functions such as memory and security.

The kernel 420 serves as a path transmitting various signals detected at the display 230, such as a touch signal, to the middleware 430.

The middleware 430 includes various software modules for controlling the operation of the user terminal device 200. According to FIG. 4, the middleware 430 includes an X11 module 430-1, an APP manager 430-2, a connection manager 430-3, a security module 430-4, a system manager 430-5, a multimedia framework 430-6, a UI framework 430-7, a window manager 430-8, and a writing recognition module 430-9.

The X11 module 430-1 receives various event signals from various hardware provided in the user terminal device 200. Herein, the event may vary, ranging from an event of setting of a system alarm, an event of executing or terminating a specific program, etc.

The APP manager 430-2 manages the execution state of various applications 440 which are installed in the storage 250. When an application execution event is detected from the X11 module 430-1, the APP manager 430-2 calls and executes an application corresponding to the event.

The connection manager 430-3 supports wired or wireless network connection. The connection manager 430-3 may include various detailed modules such as a DNET module, a UPnP module, etc.

The security module 430-4 supports certification, permission, secure storage, etc., with respect to hardware.

The system manager 430-5 monitors the state of each element of the user terminal device 200, and provides the monitoring result to other modules. For example, if there is not enough battery left, an error occurs, or connection is cut off, the system manager 430-5 may provide the monitoring result to a main UI framework 430-7 or a sub UI framework 430-9 and output an alarm message or an alarm sound.

The multimedia framework 430-6 may be stored in the user terminal device 200, or may reproduce multimedia content provided from an external source. The multimedia framework 430-6 may include a player module, a camcorder module, a sound processing module, etc. Accordingly, the multimedia framework 430-6 may reproduce various multimedia content, and generate and reproduce screens and sounds.

The main UI framework 430-7 provides various UIs to be displayed on a main area of the display 230, and the sub UI framework 430-9 provides various UIs to be displayed on a sub area. The main UI framework 430-7 and the sub UI framework 430-9 may include an image composite module to configure various objects, a coordinates composite module to calculate a coordinates where an object is to be displayed, a rendering module to render the configured object on the calculated coordinates, a 2D/3D UI toolkit to provide a tool for configuring a UI in 2D or 3D form, etc. The main UI framework 430-7 and the sub UI framework 430-9 may include an image composite module to configure various objects, a coordinates composite module to calculate a coordinates where an object is to be displayed, a rendering module to render the configured object on the calculated coordinates, a 2D/3D UI toolkit to provide a tool for configuring a UI in 2D or 3D form, etc.

The window manager 430-8 may detect a touch event using a user's body part or pen or other input events. When such an event is detected, the window manager 430-8 transmits an event signal to the main UI framework 430-7 or the sub UI framework 430-9 so that an operation corresponding to the event is performed.

In addition, if a user touches and drags a screen, various program modules such as a writing module for drawing a line according to a drag trace and an angle calculation module for calculating a pitch angle, a roll angle, a yaw angle, etc. based on a sensor value sensed by a movement detector 282 may be stored.

The application module 440 includes applications 440-1~440-*n* for supporting various functions. For example, program modules for providing various services, such as a navigation program module, a game module, an electronic book module, a calendar module, an alarm management module, a music module, an electronic banking module, a stock module, a calculator module, an electronic mail module, a spreadsheet module, a word processor module, etc. may be included. Such applications may be set as default or may be set temporarily by a user when necessary. If an object is selected, the main CPU 294 may execute an application corresponding to the selected object using the application module 440.

The software structure displayed in FIG. 4 is only an example and thus, an exemplary embodiment is not necessarily limited thereto. Thus, part of the structure may be omitted or changed, or new structure may be added, if necessary. For example, the storage 250 may additionally provide various programs such as a sensing module for analyzing signals sensed by various sensors, a messaging module including a messenger program, a Short Message Service (SMS) & Multimedia Message Service (MMS) program, an e-mail program, etc., a call info aggregator program module, a VoIP module, a web browser module, etc.

Referring back to FIG. 2, the audio processor 260 processes audio data of image content. The audio processor 260 may perform various processing such as decoding, amplification, noise filtering, compression, equalization, noise cancellation, echo or reverb removal or addition, etc. with respect to audio data. The audio data processed by the audio processor 260 may be output to the audio output unit 270 (e.g., audio outputter).

The audio output unit 270 outputs not only various audio data which is processed in many ways such as decoding, amplification, and noise filtering by the audio processor 260, but also various alarm sounds or voice messages. In particular, the audio output unit 270 may be realized as a speaker, but this is only an example. The audio output unit 270 may be realized as an output terminal which may output audio data.

The detector 280 detects various user interactions. In particular, the detector 280 may include a touch detector 281, a movement detector 282, and a folding detector 283, as illustrated in FIG. 2.

Specifically, the touch detector 281 may detect a user's touch interaction using a touch panel attached to the rear side of a display panel. The movement detector 282 may detect a movement (for example, a rotation movement, a vertical movement, a horizontal movement, etc.) of the user terminal device 100 using at least one of an accelerator sensor, a geomagnetic sensor, and a gyro sensor. The folding detector 283 may detect at least one of whether the user terminal device 200 is folded with reference to the folding line 310 and the angle at which the terminal device 200 is folded using a bending sensor (for example, a light sensor, a fiber optic sensor, a conductive ink-based sensor, a conductive fabric sensor, etc.).

Meanwhile, the touch detector 281 might activate only a touch sensor disposed on the exposure area while the display 230 is folded, and inactivate a touch sensor disposed on the other areas.

The controller 290 controls overall operations of the user terminal device 200 using various programs stored in the storage 250.

As illustrated in FIG. 2, the controller 290 includes a RAM 291, a ROM 292, a graphic processor 293, a main CPU 294, a first to an nth interface 295-1~295-*n*, and a bus 296. In this case, the RAM 291, the ROM 292, the graphic processor 293, the main CPU 294, the first to the nth interface 295-1~295-*n*, etc. may be interconnected through the bus 296.

The ROM 292 stores a set of commands for system booting. If a turn-on command is input and thus power is supplied, the main CPU 294 copies O/S stored in the storage 250 to the RAM 291 according to a command stored in the ROM 292, and boots a system by executing the O/S. When the booting is completed, the main CPU 294 copies various application programs stored in the storage 250 to the RAM 291, and executes the application programs copied in the RAM 291 to perform various operations.

The graphic processor 293 generates a screen including various objects, such as an icon, an image, a text, etc., using an computing unit and a rendering unit. The computing unit (e.g., computer) computes property values such as coordinates, shape, size, and color of each object to be displayed according to the layout of the screen using a control command received from the detector 280. The rendering unit (e.g., renderer) generates a screen with various layouts including objects based on the property values computed by the computing unit. The screen generated by the rendering unit is displayed in a display area of the display 230.

The main CPU 294 accesses the storage 250, and performs booting using the O/S stored in the storage 250. The main CPU 294 performs various operations using various programs, content, data, etc. stored in the storage 250.

The first to the nth interface 295-1~295-*n* are connected to the above-described various elements. One of the above interface may be a network interface which is connected to an external apparatus via network.

In particular, the controller 290 may provide various functions using an exposure area which is exposed to the outside when the display 110 is folded.

A UI Provided on the Exposure Area

If the display 230 is folded with reference to the folding line 310 such that the first area 320 and the second area 330 come in contact with each other, the controller 290 may control the display 230 to display a predetermined UI on the exposure area 340 of the second area 320, which is exposed to the outside. In this case, the predetermined UI may include at least one of a UI including the state information of the user terminal device 200 and a UI for controlling the user terminal device 200.

Figure 5A:
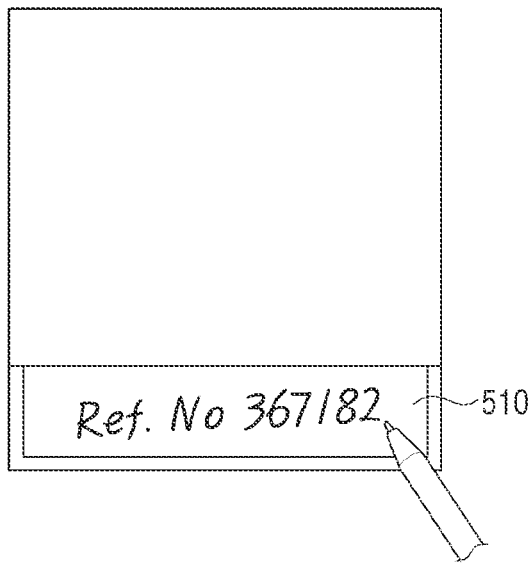
FIGS. 5A to 7B are views illustrating a UI displayed on an exposure area according to various exemplary embodiments.

In an exemplary embodiment, if a folding interaction of folding the display 230 with reference to the folding line 310 such that the first area 320 and the second area 330 come in contact with each other is detected, the controller 290 may control the display 230 to display a UI 510 providing a memo function on the exposure area, as illustrated in FIG. 5A. In this case, if a user input, e.g., a finger, pen, or stylus, is detected through the UI 510 which provides a memo function, the controller 290 may control the display 230 to display an image according to the user input.

Figure 5B:
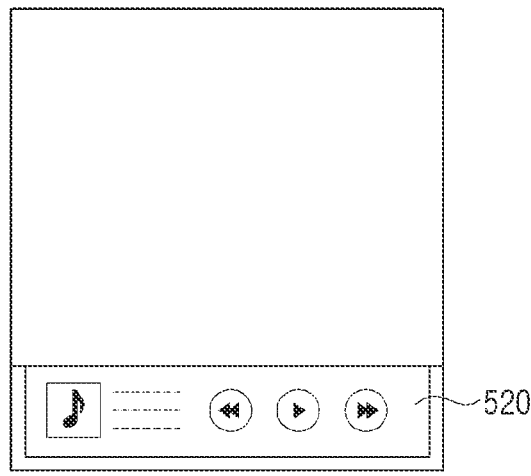

In addition, the controller 290 may control the display 230 to display a UI for controlling a specific application on the exposure area. Specifically, if a folding interaction of folding the display 230 with reference to the folding line 310 such that the first area 320 and the second area 330 come in contact with each other is detected while a specific application is executed, the controller 290 may control the display 230 to display a UI for controlling the specific application on the exposure area. For example, as shown in FIG. 5B, if a folding interaction of folding the display 230 with reference to the folding line 310 such that the first area 320 and the second area 330 come in contact with each other is detected while a music application is executed, the controller 290 may control the display 230 to display a UI 520 for controlling the music application on the exposure area. In this case, the UI 520 for controlling a music application may include information regarding currently-played music, a play/stop icon, a skip icon, a rewind icon, a next song, a past song, thumbs up, thumbs down, etc.

Figure 5C:
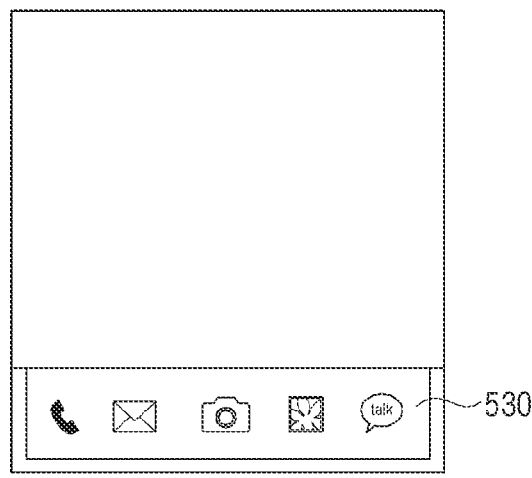

In addition, the controller 290 may control the display 230 to display a UI including a hot key icon for checking the current state of the user terminal device 200 on the exposure area. For example, if a predetermined user interaction (for example, an interaction of touching or tapping the exposure area twice in a row) is detected while the display 230 is folded, the controller 290 may control the display 230 to display a UI 530 including a hot key icon for checking the current state of the user terminal device 200 on the exposure area as illustrated in FIG. 5C. In this case, the hot key icon for checking the current state of the user terminal device 200 may include a hot key icon for checking a battery state, a hot key icon for checking a network state, a hot key icon for checking display brightness setting, etc.

Figure 5D:
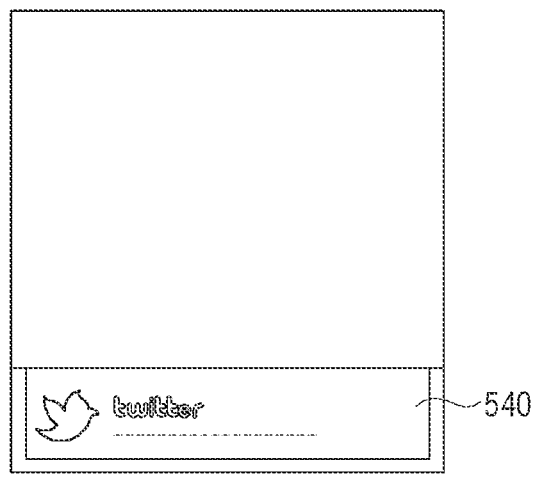

In addition, the controller 290 may control the display 230 to display a UI informing that a message or data is received from outside on the exposure area. For example, if an social network service (SNS) message is received from outside through the communicator 240 while the display 230 is folded, the controller 290 may control the display 230 to display a UI 540 informing that the SNS message is received on the exposure area as illustrated in FIG. 5D. In this case, the UI 540 informing that an SNS message is received may include at least one of information regarding a sender and information regarding the SNS message.

Further, the controller 290 may control the display 230 to display various types of UIs for releasing a lock state of the user terminal device 200 on the exposure area.

Figure 6A:
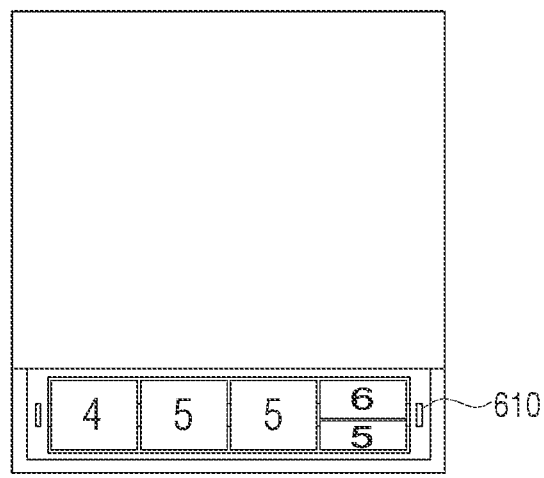

Specifically, as illustrated in FIG. 6A, the controller 290 may control the display 230 to display a UI 610 for inputting a pin number to release the lock state of the user terminal device 200 on the exposure area. In this case, the UI 610 for inputting a pin number may change the pin number by a touch interaction of swiping up and down. If a predetermined pin number is input on the UI 610 displayed on the exposure area, the controller 290 may release the lock state of the user terminal device 200. Additionally, the user may set the pin number through user input.

Figure 6B:
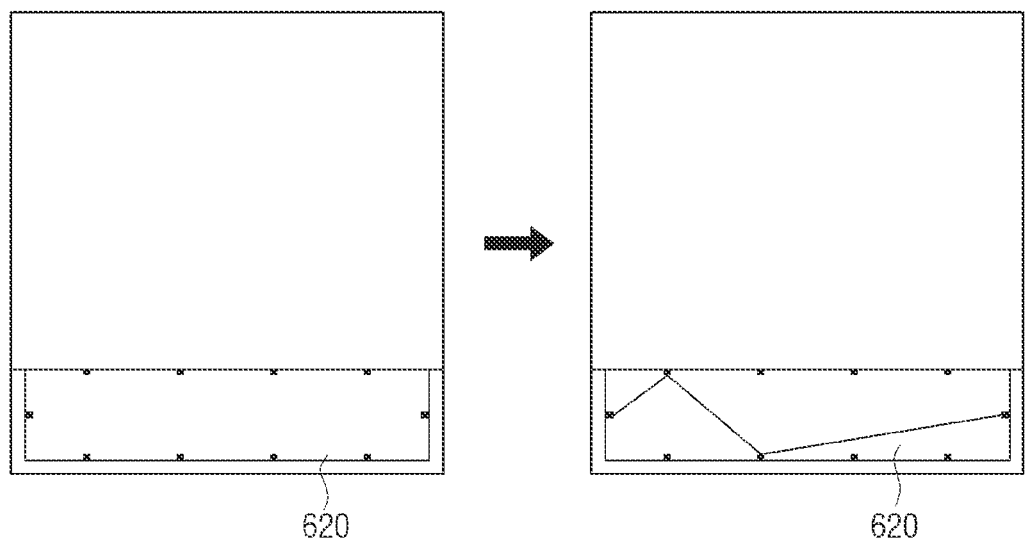

In addition, as illustrated in FIG. 6B, the controller 290 may control the display 230 to display a UI 620 including a plurality of dots on a corner of the exposure area to release the lock state of the user terminal device 200 on the exposure area. In this case, if a touch interaction of connecting dots in a predetermined pattern is detected on the UI 620, the controller 290 may release the lock state of the user terminal device 200. Additionally, the user may set the pattern through user input.

Figure 6C:
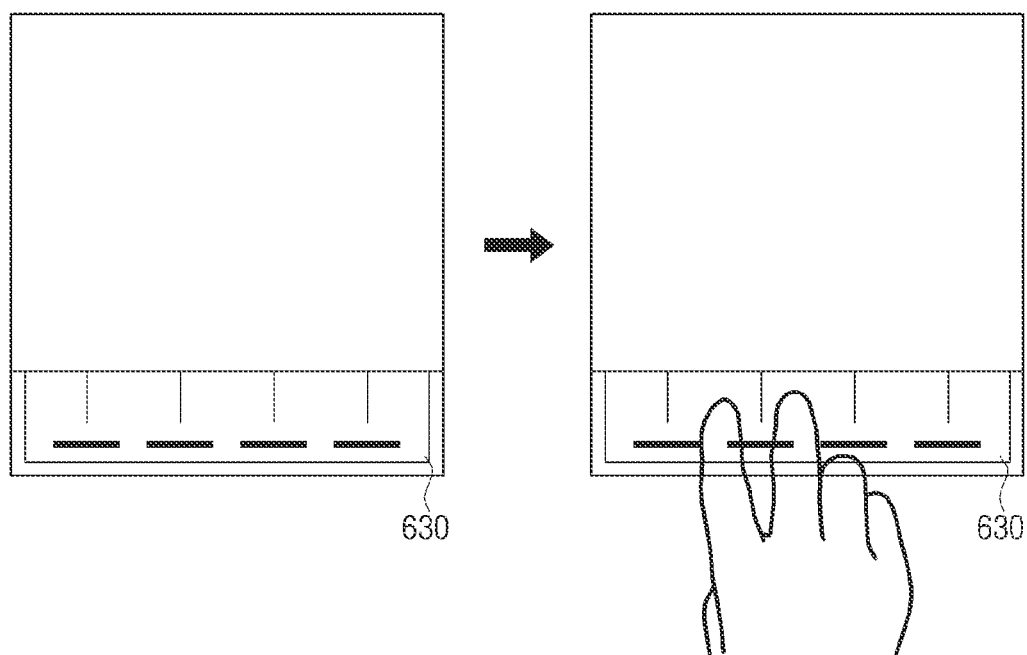

As illustrated in FIG. 6C, the controller 290 may control the display 230 to display a UI 630 in the form of a keyboard, i.e., piano, to release the lock state of the user terminal device 200 on the exposure area. In this case, if a touch interaction of touching the keyboard in a predetermined rhythm is detected on the UI 630, the controller may release the lock state of the user terminal device 200. Additionally, the user may set the rhythm through user input.

Figure 6D:
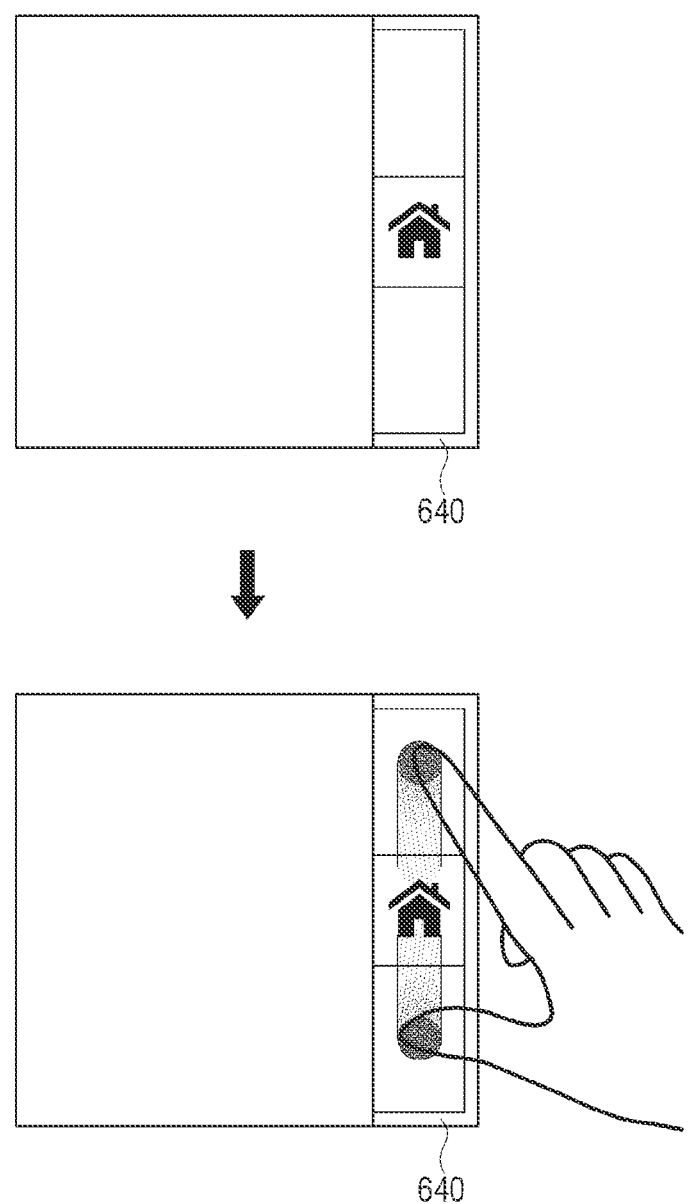

In addition, as illustrated in FIG. 6D, the controller 290 may control the display 230 to display a UI 640 including a home icon to release the lock state of the user terminal device on the exposure area. In this case, if a touch interaction of pinching out with reference to the home icon included in the UI 640 is detected, the controller 290 may release the lock state of the user terminal device 200.

The controller 290 may control the display 230 to display a UI for changing the setting of the user terminal device 200 on the exposure area.

Figure 7A:
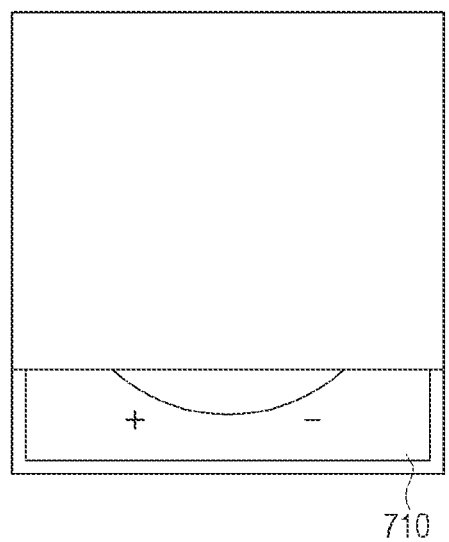

Specifically, as illustrated in FIG. 7A, the controller 290 may control the display 230 to display a UI 710 in the form of an arc for adjusting the volume of the user terminal device 200. Meanwhile, in the above exemplary embodiment, the UI displayed on the exposure area adjusts the volume, but this is only an example. A UI for adjusting another setting of the user terminal device 200 (for example, display brightness, etc.) may be displayed.

Figure 7B:
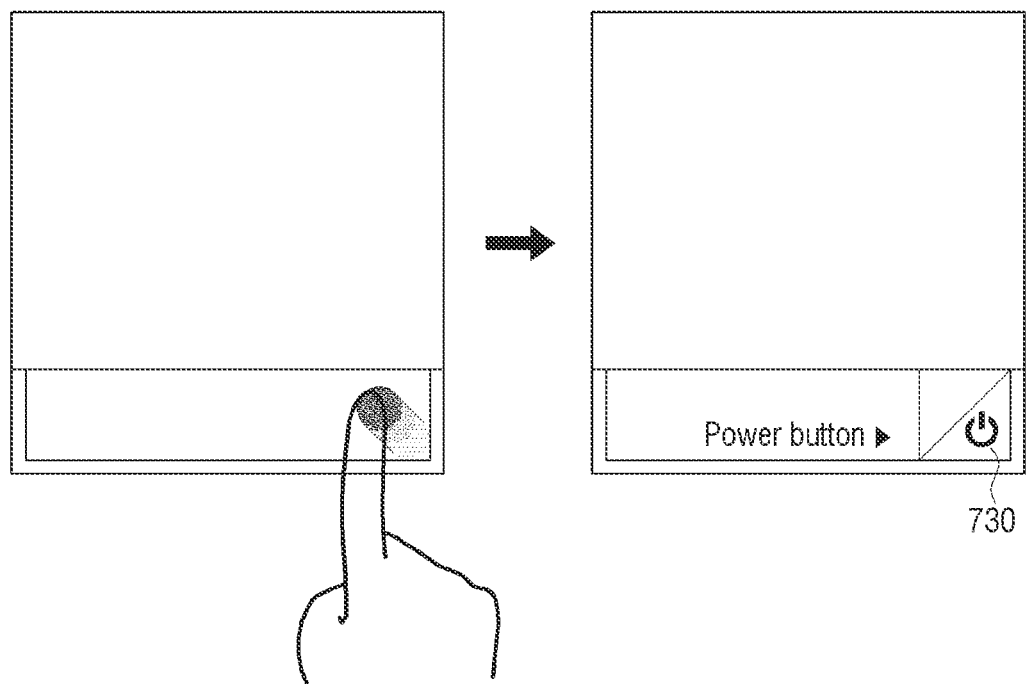

In addition, as illustrated in FIG. 7B, if a touch interaction of dragging one of a plurality of vertexes included in the exposure area in a diagonal direction is detected, the controller 290 may control the display 230 to display a UI 730 for turning off the power of the user terminal device 200 at the corner area corresponding to the vertex where the touch interaction is detected.

A Folding Interaction and an Unfolding Interaction

If a plurality of icons are displayed on the exposure area while the display 230 is folded, and an unfolding interaction of unfolding the display 230 while one of the plurality of icons is touched, the controller 290 may control the display 230 to display a screen corresponding to the touched icon on full screen.

Figure 8A:
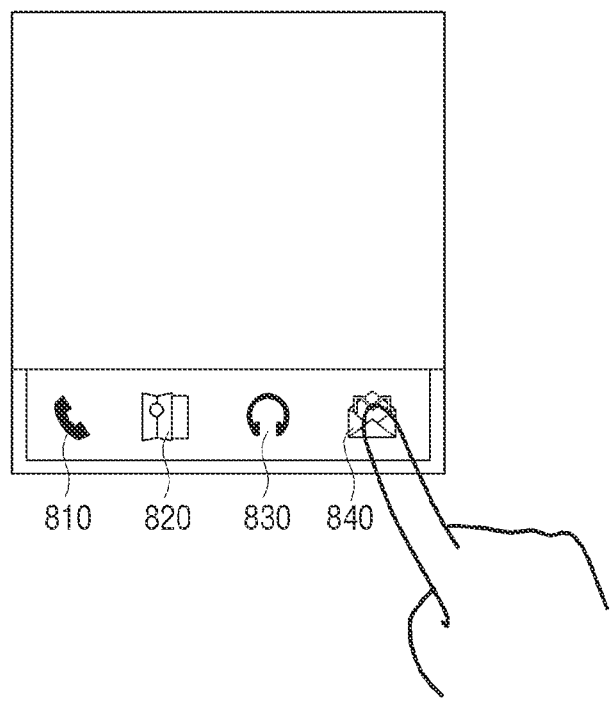
Figure 8B:
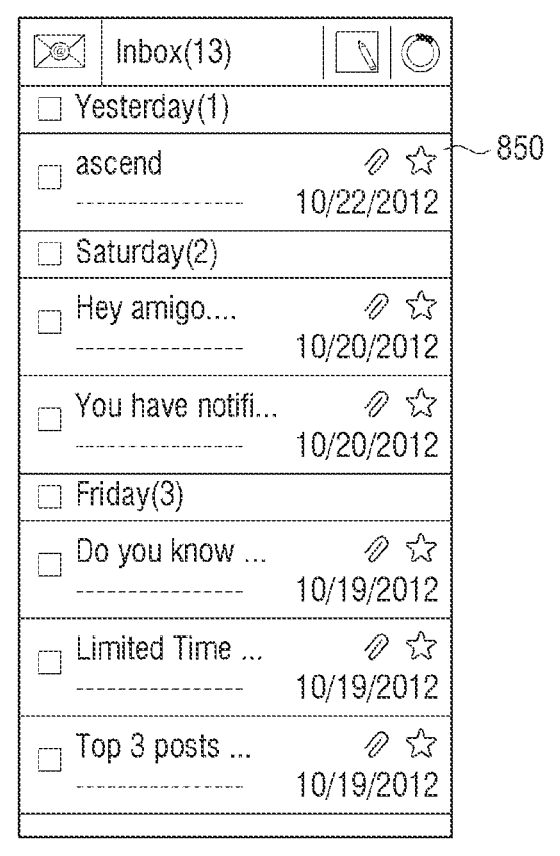

Specifically, as illustrated in FIG. 8A, the display 230 displays first to fourth icons 810 to 840 while the display 230 is folded. If an unfolding interaction of unfolding the display 230 is detected while the fourth icon 840 out of the first to the fourth icon 810 to 840 is touched, the controller 290 may control the display 230 to display a full screen message window 850 corresponding to the fourth icon 840, as illustrated in FIG. 8B.

Meanwhile, in the above exemplary embodiment, an unfolding interaction is detected while the fourth icon 840 is touched, but this is only an example. If an unfolding interaction is detected while another icon is touched, a screen corresponding to the other touched icon may be displayed on the full screen of the display 230. For example, if an unfolding interaction is detected while the first icon 810 is touched, the controller 290 may control the display 230 to display a full screen execution screen of a call application corresponding to the first icon 810 (for example, a recent call list screen, an address book screen, a call sending screen, etc.). In addition, if an unfolding interaction is detected while the second icon 820 is touched, the controller 290 may control the display 230 to display a web browser screen corresponding to the second icon 820 on full screen. If an unfolding interaction is detected while the third icon 830 is touched, the controller 290 may control the display 230 to display a full screen execution screen of a music application corresponding to the third icon 830 (for example, a music play screen, a music list screen, etc.).

In addition, if the exposure area is touched while the display 230 is folded and then, an unfolding interaction of unfolding a hinge angle of the display 230 as much as a predetermined angle is detected, the controller 290 may control the display 230 to display a screen for executing a specific function.

Figure 9A:
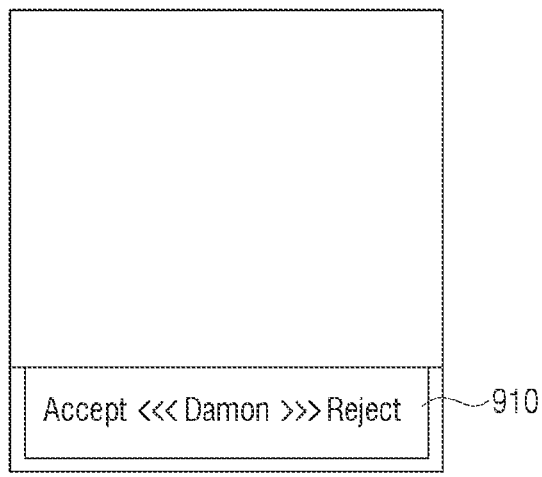
Figure 9B:
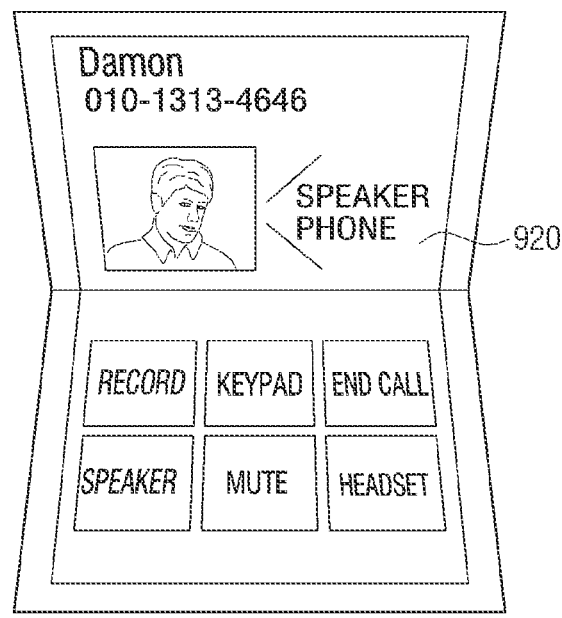

Specifically, if a call request is received while the display 230 is folded, the controller 290 may control the display 230 to display a UI 910 informing that a call request is received on the exposure area, as illustrated in FIG. 9A. If an unfolding interaction of unfolding a hinge angle of the display 230 as much as a predetermined angle (for example, 70° to 120°) is detected while the UI 910 informing that a call request is received is touched, the controller 290 may accept the call request, execute a speaker phone function, and control the display 230 to display an execution screen 920 including various icons, as illustrated in FIG. 9B.

Figure 10A:
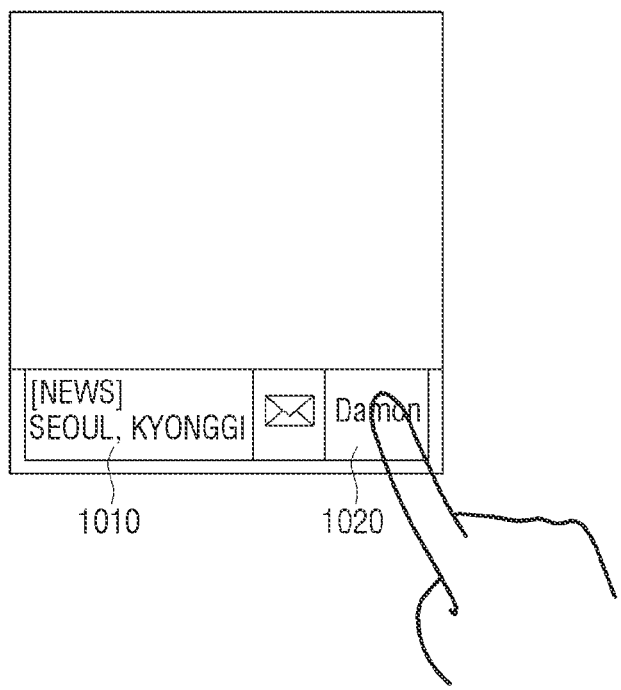
Figure 10B:
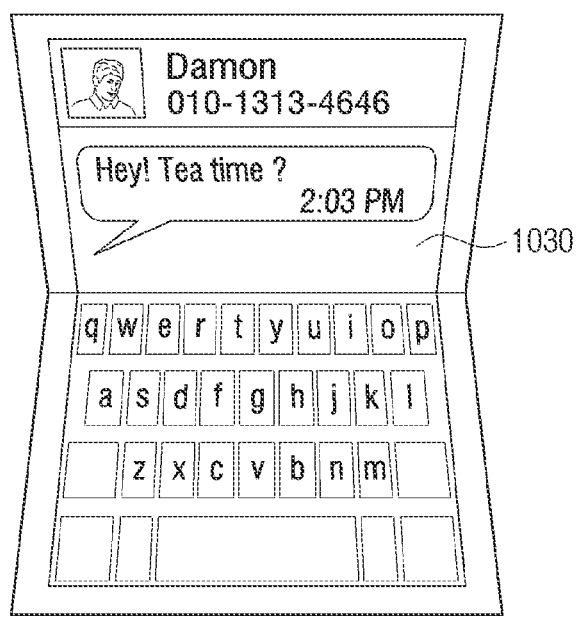

Specifically, if a message is received from outside while news information 1010 is displayed at the same as the display 230 is folded, the controller 290 may control the display 230 to display a UI 1020 informing that the message is received along with the news information 1010 on the exposure area as illustrated in FIG. 10A. If an unfolding interaction of unfolding a hinge angle of the display 230 as much as a predetermined angle (for example, 70° to 120°) is detected while the UI 1020 informing that a message is received is touched, the controller 290 may control the display 230 to display a message window 1030 for writing a reply to the received message, as illustrated in FIG. 10B.

In addition, the controller 290 may control the display 230 to display different screens when the exposure area is touched and then, an unfolding interaction is detected and when an unfolding interaction is detected.

Figure 11A:
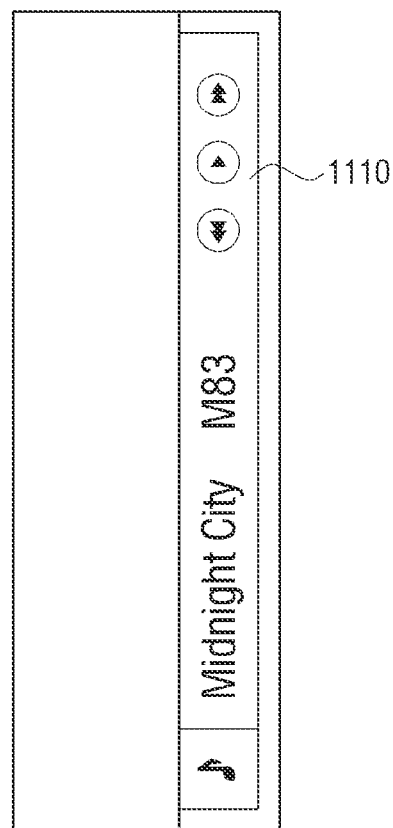

Specifically, the controller 290 may control the display 230 to display a UI 1110 corresponding to a music application on the exposure area as illustrated in FIG. 11A.

Figure 11B:
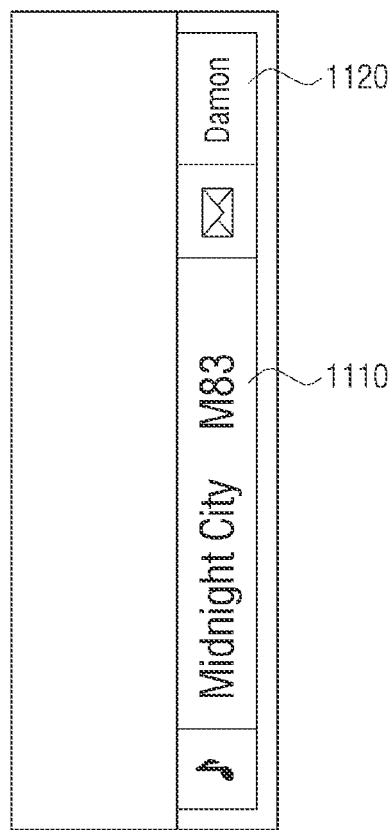

If a message is received from outside while the UI 1110 corresponding to a music application is displayed on the exposure area, the controller 290 may control the display 230 to display a UI 1120 informing that the message is received along with the music application UI 1110 on the exposure area as illustrated in FIG. 11B.

Figure 11C:
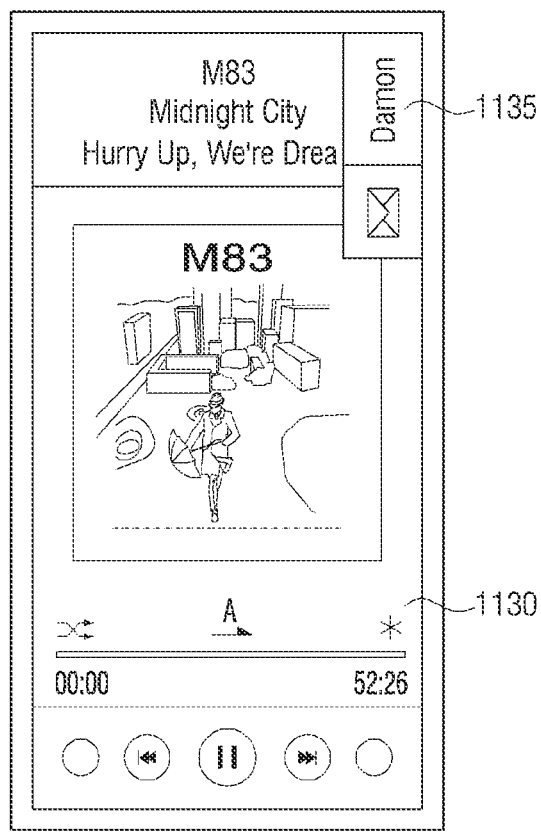

In this case, if an unfolding interaction of unfolding the display 230 is detected while the exposure area is not touched, the controller 290 may control the display 230 to display an execution screen 1130 of the existing music application as illustrated in FIG. 11C. In this case, a UI 1135 informing that a message is received may be displayed on one area of the execution screen 1130 of the music application for a predetermined time.

Figure 11D:
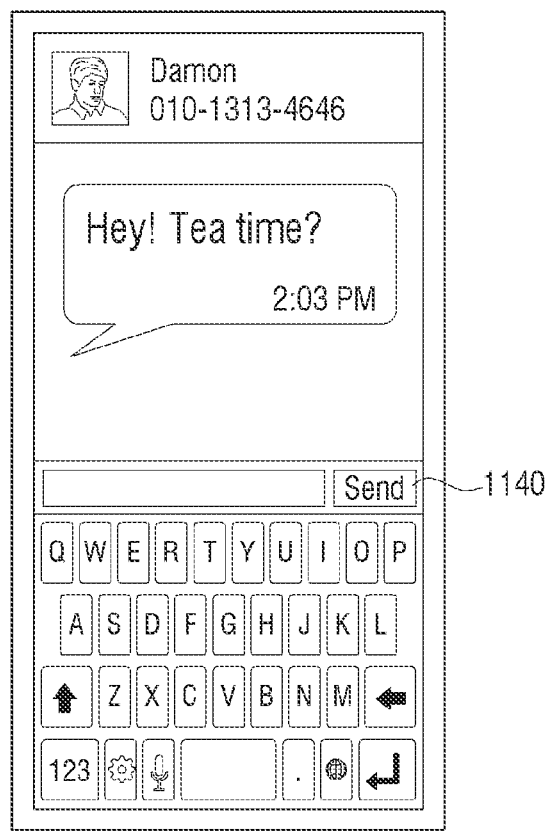

However, if an unfolding interaction of unfolding the display 230 is detected while the UI 1120 informing that a message is received is displayed on the exposure area, the controller 290 may control the display 230 to display a message window 1140 for writing a reply to the received message as illustrated in FIG. 11D.

In addition, the controller 290 may control the display 230 to display different screens in the order of detecting an unfolding interaction and a touch interaction for lock-releasing.

Figure 12A:
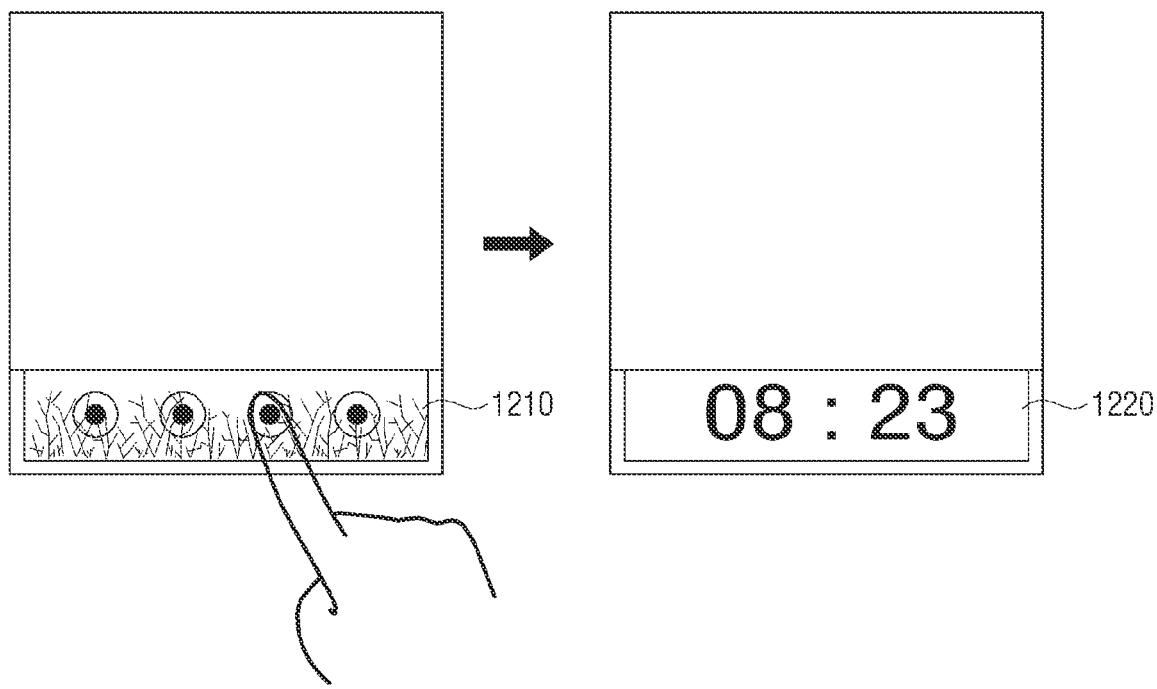

Specifically, as illustrated in the left side of FIG. 12A, if a touch interaction for lock-releasing is detected while a UI 1210 for releasing the lock of the user terminal device 200 is displayed on the exposure area, the controller 290 may release the lock state of the user terminal device 200, and as illustrated in the right side of FIG. 12A, may control the display 230 to display a first home screen 1220 including time information on the exposure area.

Figure 12B:
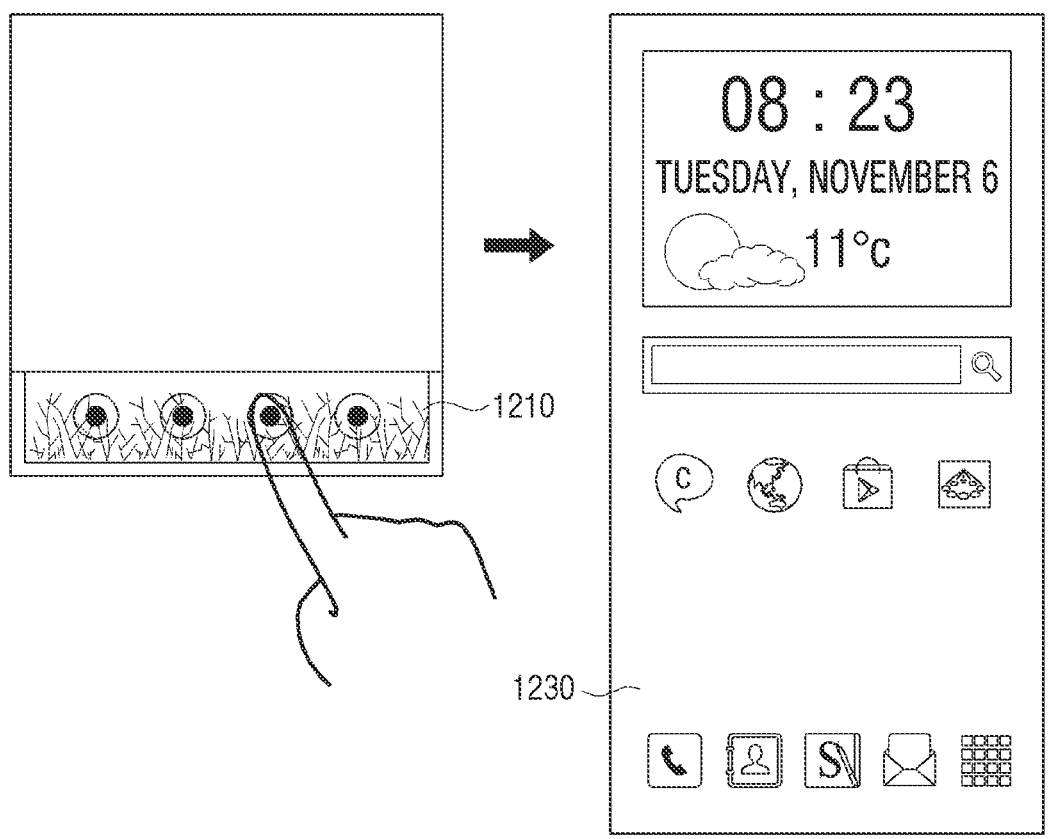

In addition, as illustrated in the left side of FIG. 12B, if a touch interaction for lock-releasing is detected while the UI 1210 for releasing the lock of the user terminal device 200 is displayed on the exposure area, and an unfolding interaction is detected, the controller 290 may release the lock state of the user terminal device 200, and as illustrated in the right side of FIG. 12B, may control the display 230 to display a second home screen 1230 on full screen.

Figure 12C:
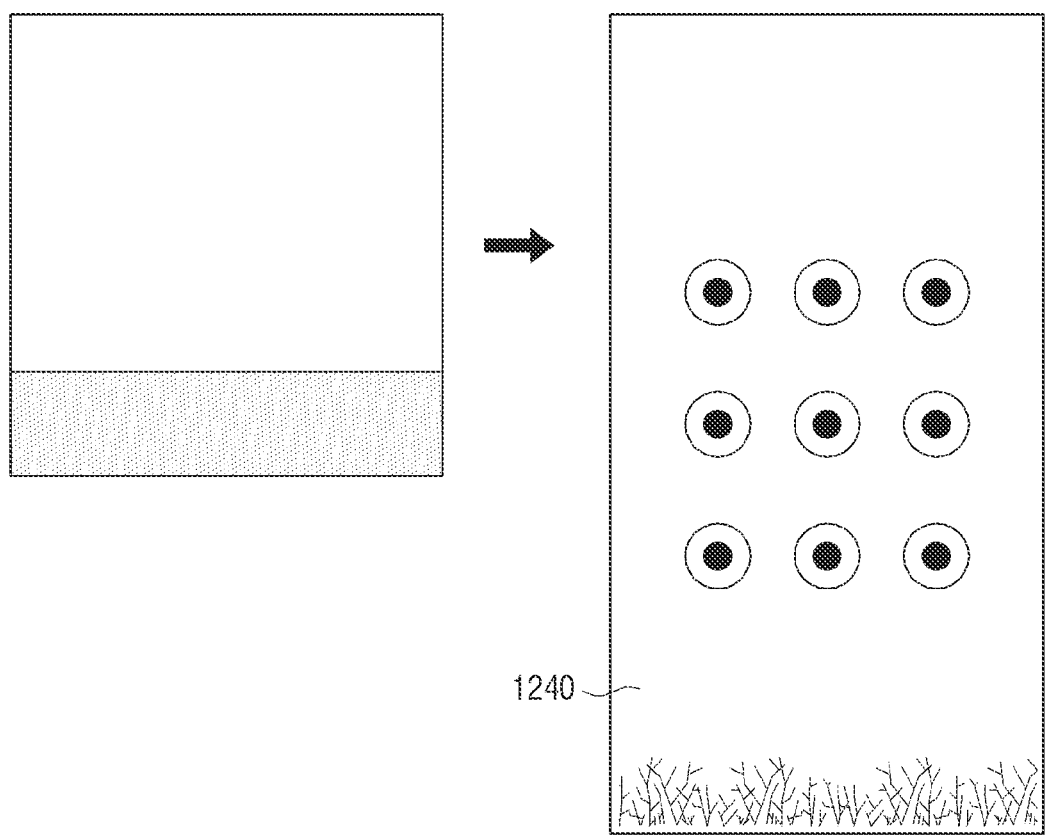

As illustrated in the left side of FIG. 12C, if an unfolding interaction is detected while an image is not displayed on the exposure area, the controller 290 may control the display 230 to display a UI 1240 for releasing the lock of the user terminal device on full screen as illustrated in the right side of FIG. 12C. If a touch interaction for lock-releasing is detected on the UI 1240 for releasing the lock of the user terminal device 200, which is displayed on full screen, the controller 290 may release the lock state of the user terminal device 200, and as illustrated in the right side of FIG. 12B, may control the display 230 to display the second home screen 1230 on full screen.

In addition, the controller 290 may control the display 230 to display distinctively a screen which is displayed when only an unfolding interaction is detected while a UI corresponding to a specific application is displayed on the exposure area and a screen which is displayed when an unfolding interaction is detected after the exposure area is touched.

Figure 13A:
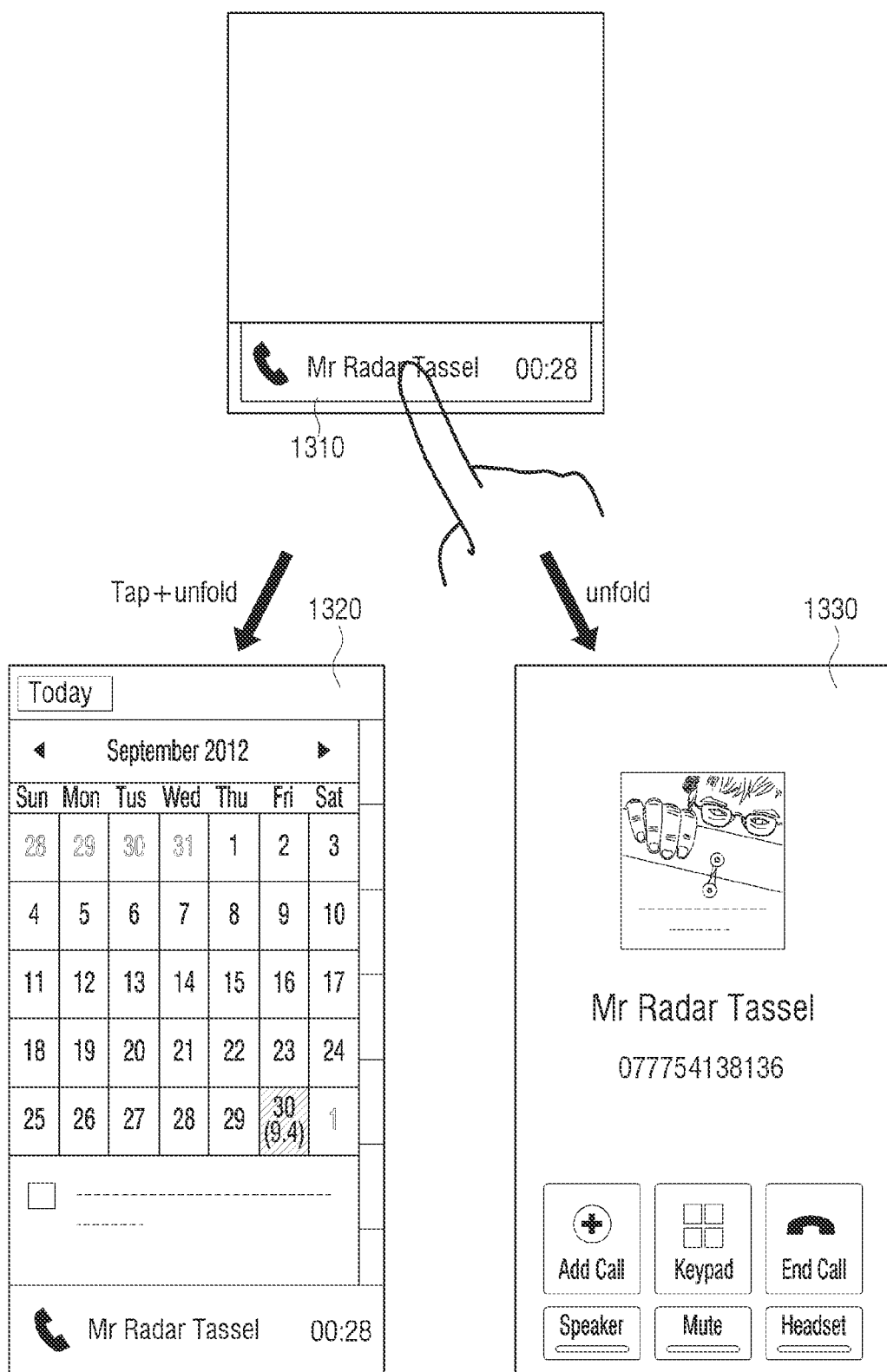

Specifically, if a call request is received from outside while the display 230 is folded, the controller 290 may control the display 230 to display a UI 1310 informing a call request is received on the exposure area as illustrated in the left side of FIG. 13A. If the UI 1310 displayed on the exposure area is touched and then an unfolding interaction of unfolding the display 230 is detected, the controller 290 may control the display 230 to display an execution screen 1320 of a calendar application which is related to a call request function on full screen (in another example, an execution screen of a memo application) as illustrated in the lower left side of FIG. 13A. On the other hand, if an unfolding interaction of unfolding the display 230 is detected while the UI 1310 displayed on the exposure area is not touched, the controller 290 may control the display 230 to display a call screen 1330 on full screen as illustrated in the lower right side of FIG. 13A.

Figure 13B:
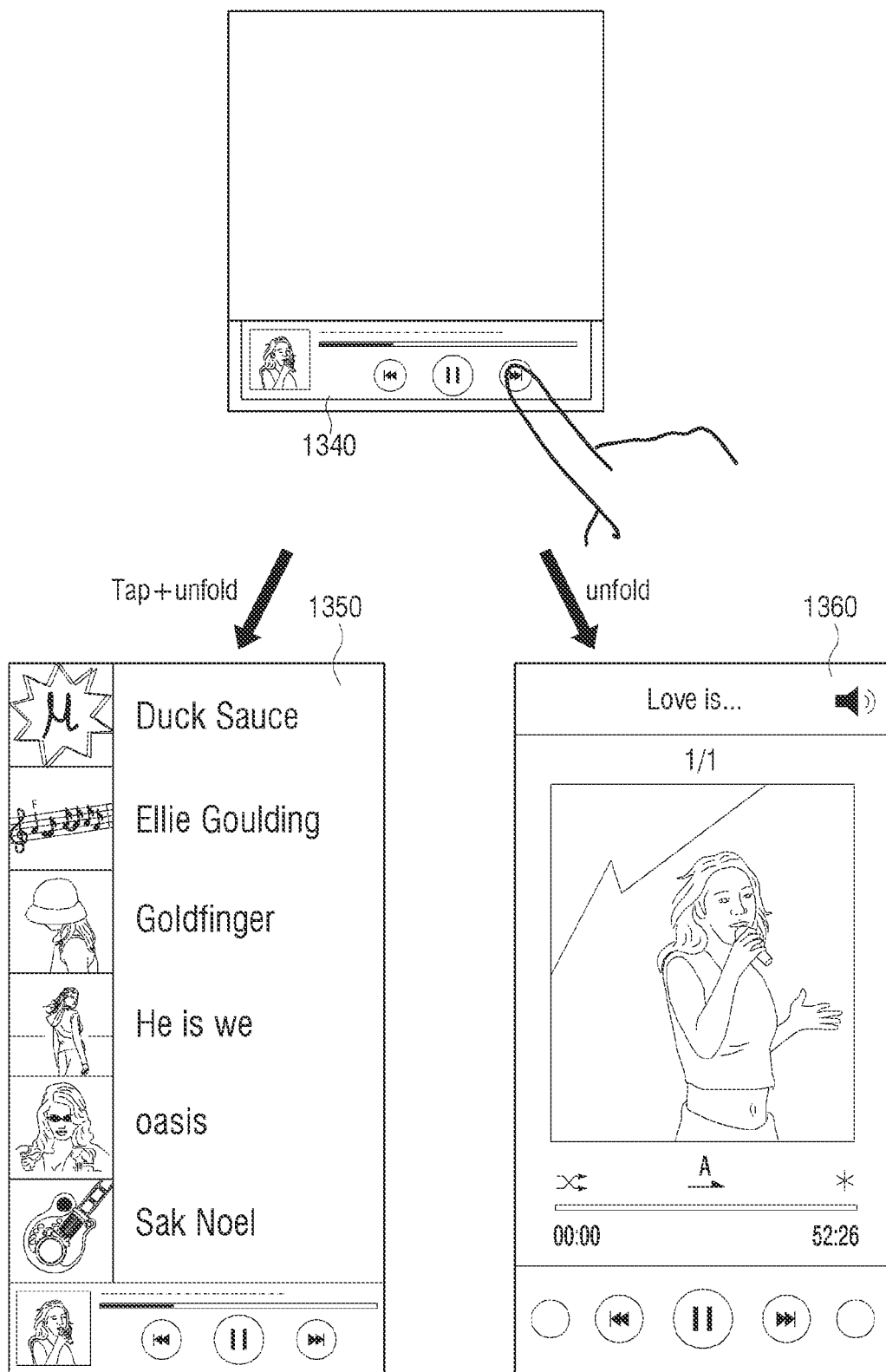

If a folding interaction of folding the display 230 is detected while a music application is executed, the controller 290 may control the display 230 to display a UI 1340 for controlling the music application on the exposure area as illustrated in the upper portion of FIG. 13B. If the UI 1340 displayed on the exposure area is touched and then, an unfolding interaction of unfolding the display 230 is detected, the controller 290 may control the display 230 to maintain music play and display a play list 1350 on full screen as illustrated in the lower left side of FIG. 13B. On the other hand, if an unfolding interaction of unfolding the display 230 is detected while the UI 1340 displayed on the exposure area is not touched, the controller 290 may control the display 230 to display a music player screen 1360 on full screen as illustrated in the lower right side of FIG. 13B.

If a first unfolding interaction of unfolding a hinge angle of the display 230 as much as a predetermined angle is detected, the controller 290 may control the display 230 to display at least one icon for executing a specific function. If a second unfolding interaction of unfolding the display 230 completely while at least one icon is touched, the controller 290 may execute a function corresponding to the touched icon.

Figure 14A:
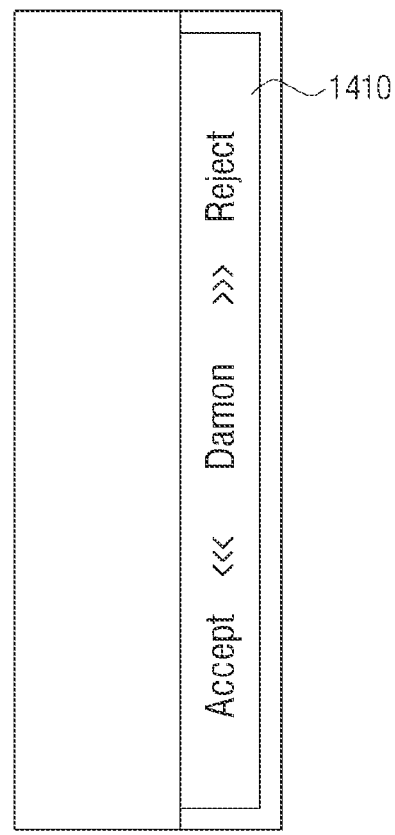

According to an exemplary embodiment, if a call request is received from outside while the display 230 is folded, the controller 290 may control the display 230 to display a UI 1410 informing that a call request is received on the exposure area as illustrated in FIG. 14A.

Figure 14B:
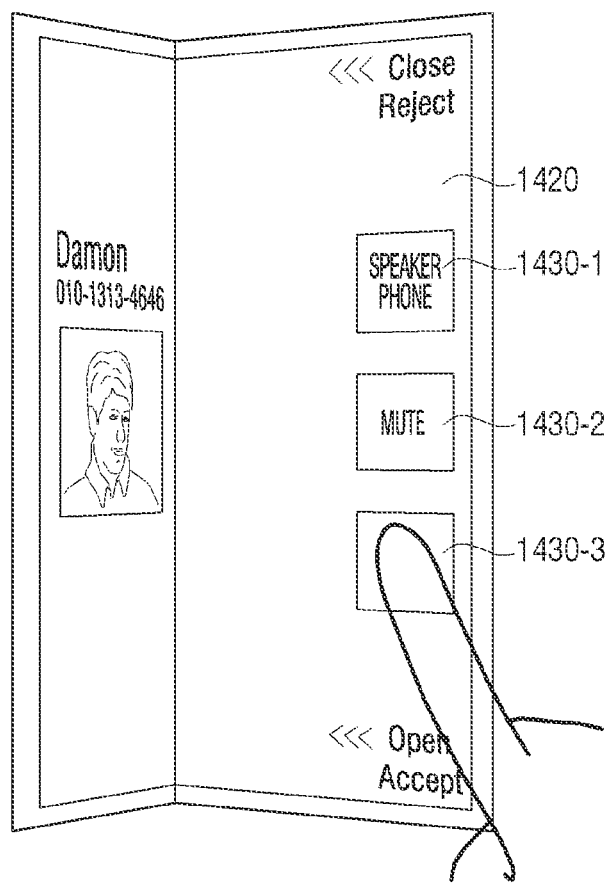

If the first unfolding interaction of unfolding a hinge angle of the display 230 as much as a predetermined angle (for example, 30° to 150°) is detected while the UI 1410 informing that a call request is received is displayed, the controller 290 may control the display 230 to display a UI 1420 including a plurality of icons 1430-1 to 1430-3 for performing various functions in relation with making a call as illustrated in FIG. 14B.

Figure 14C:
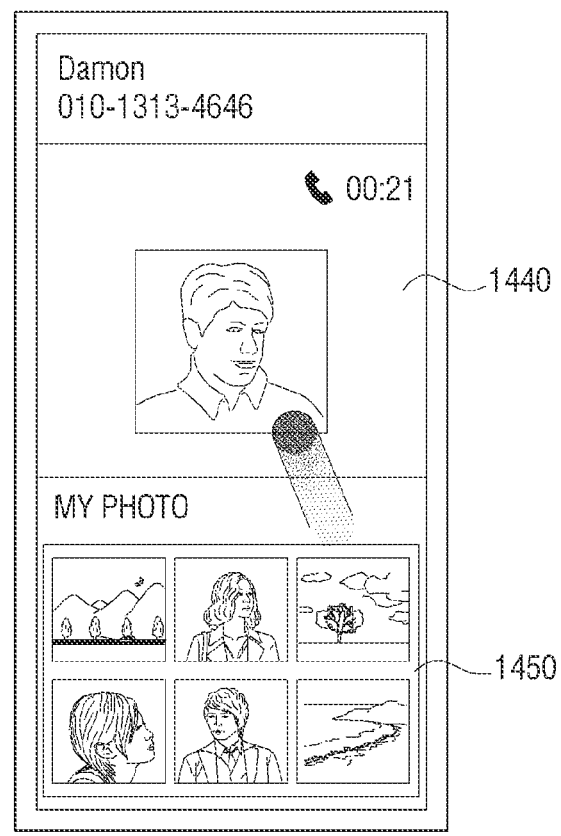

If an unfolding interaction of completely unfolding the display 230 (that is, unfolding the display 230 such that a hinge angle of the display 230 becomes 180°) is detected while a photo sharing icon is touched from among the plurality of icons 1430-1 to 1430-3, the controller 290 may accept a call request, and as illustrated in FIG. 14C, may control the display 230 to display a call screen 1440 on the upper area and a list 1450 for selecting a photo to be shared. In this case, if a touch interaction of dragging one of a plurality of photos included in the list 1450 to the call screen 1440 is selected, the controller 290 may control the communicator 240 to transmit the photo where the touch interaction is detected to a receiver.

If an unfolding interaction is detected, the controller 290 may control the display 230 to display a plurality of guidance messages according to a hinge angle of the display 230 while the unfolding interaction is detected. In this case, the guidance messages may include a guidance message for informing an incoming text message, a guidance message for informing a missed call, a guidance message for informing an incoming an SNS message, a guidance message for informing of application updates, etc.

Figure 15A:
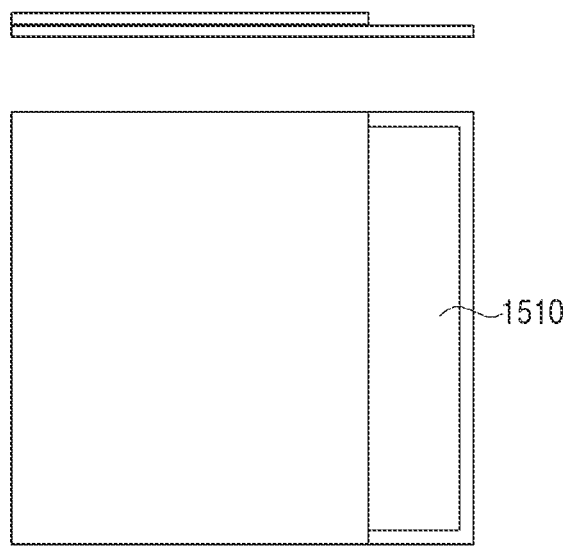

Specifically, as illustrated in FIG. 15A, the controller 290 may control the display 230 to display one guidance message 1510 while the display 230 is folded. Subsequently, if an unfolding interaction of unfolding the display 230 is detected, the controller 290 may control the display 230 to display a different number of guidance messages according to a hinge angle of the display 230. For example, if a hinge angle of the display 230 is within a first angle range (for example, between 5° and 15°), the controller 290 may control the display 230 to display two guidance messages 1510, 1520. If a hinge angle of the display 230 is within a second angle range (for example, between 15° and 25°), the controller 290 may control the display 230 to display three guidance messages 1510, 1520, 1530. That is, the controller 290 may increase the number of guidance messages displayed as a hinge angle of display 230 becomes greater.

Figure 15B:
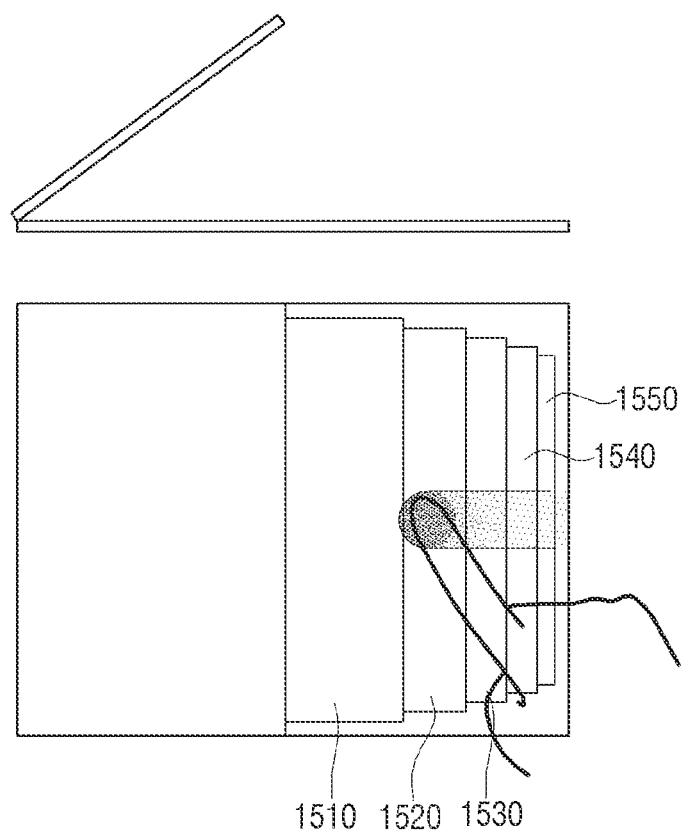

If a hinge angle of the display 230 is within a fourth angle range (for example, between 35° and 45°), the controller 290 may control the display 230 to display five guidance messages (possibly overlapping) 1510 to 1550, as illustrated in FIG. 15B. In this case, as illustrated in FIG. 15B, the first guidance message 1510 which is updated most recently may be disposed on the top.

Figure 15C:
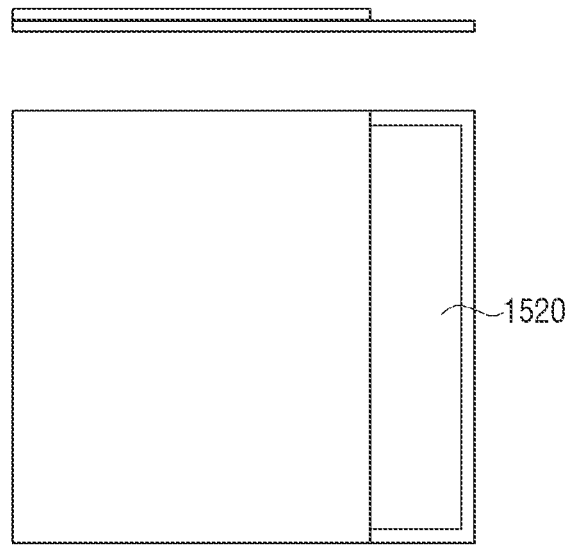

As illustrated in FIG. 15B, if an folding interaction of folding the display 230 again is detected when the second guidance message 1520 is touched while the five guidance messages 1510 to 1550 are displayed, the controller 290 may control the display 230 to display the second guidance message 1520 on the exposure area as illustrated in FIG. 15C.

Figure 15D:
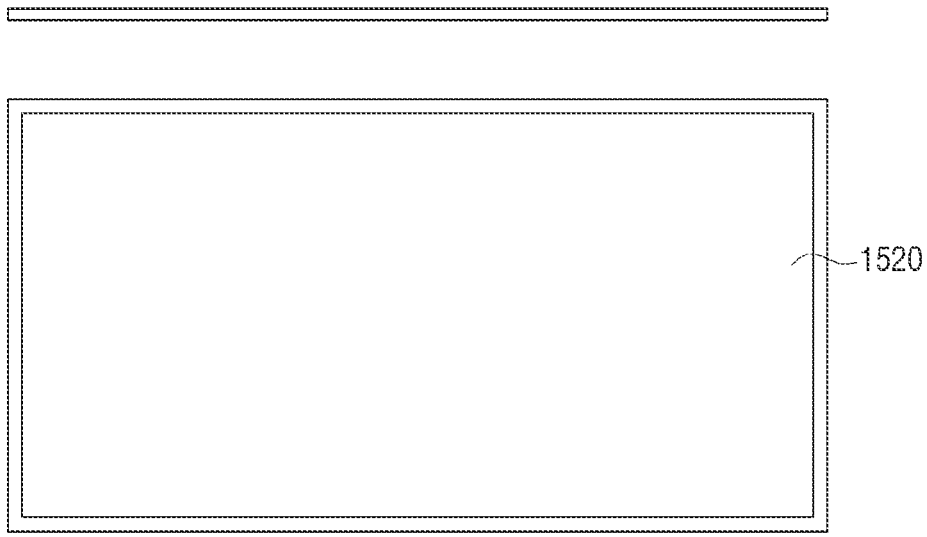

In addition, as illustrated in FIG. 15B, if an unfolding interaction of unfolding the display 230 completely is detected when the second guidance message 1520 is touched while the five guidance messages 1510 to 1550 are displayed, the controller 290 may control the display 230 to display a screen corresponding to the second guidance message 1520 on full screen as illustrated in FIG. 15D.

Further, the controller 290 may perform different functions according to the direction of a touch interaction which is detected on the exposure area while the display 230 is folded.

Figure 16A:
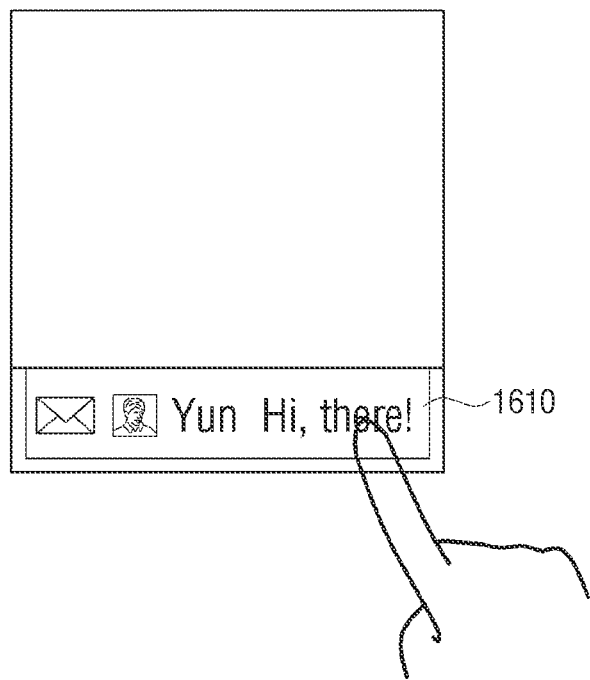

Specifically, if a message is received from outside while the display 230 is folded, the controller 290 may control the display 230 to display a UI 1610 informing that the message is received on the exposure area as illustrated in FIG. 16A.

In this case, if a touch interaction in the left-and-right direction is detected on the UI 1610 informing that a message is received, the controller 290 may control the display 230 to display a UI informing the previous message or the next message on the exposure area according to the touch interaction.

If a touch interaction in the down direction is detected on the UI 1610 informing that a message is received, the controller 290 may delete a currently-received message.

Figure 16B:
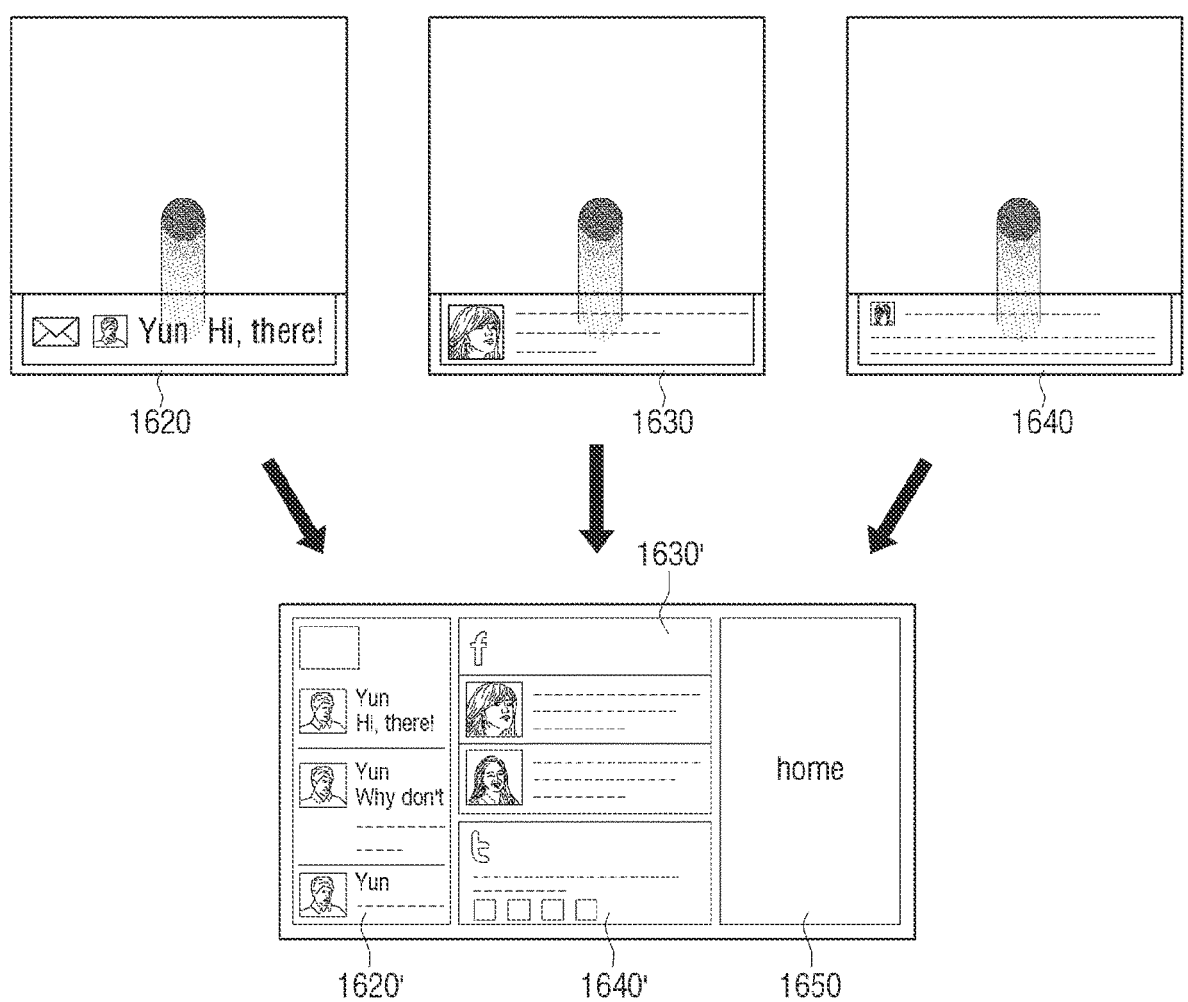

If a touch interaction in the up direction is detected on the UI 1610 informing that a message is received, the controller 290 may store the received messages. Specifically, as illustrated in FIG. 16B, if a touch interaction in the up direction is detected on a UI 1620 informing that a first message is received, a touch interaction in the up direction is detected on a UI 1630 informing a second message is received, a touch interaction in the up direction is detected on a UI 1640 informing that a third message is received and then, an unfolding interaction of unfolding the display 230 is detected, the controller 290 may control the display 230 to display a screen 1620' including the first message, a screen 1630' including the second message, a screen 1640' including the third message and a home screen 1650 as illustrated in FIG. 16B.

Maintain the Current Function Despite the Change in the Shape of the Display 230

The controller 290 may maintain the current function even if the shape of the display 230 changes according to a folding interaction or an unfolding interaction, and control the display 230 to display a screen corresponding to the current function.

Figure 17A:
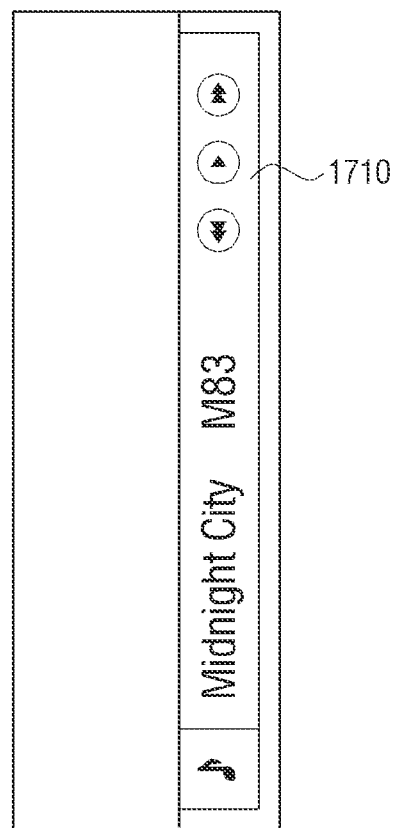
Figure 17B:
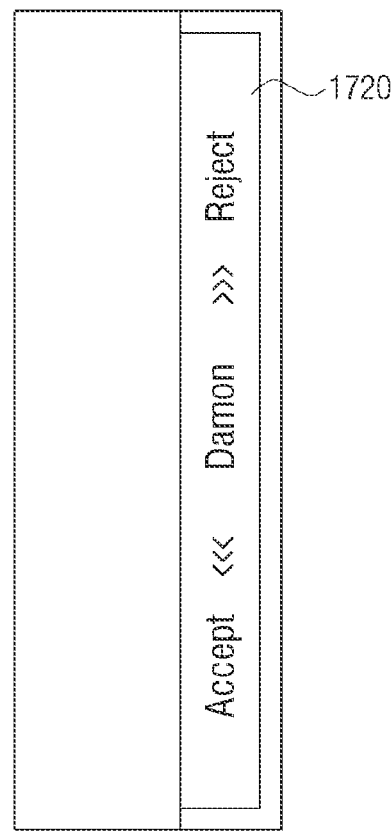
Figure 17C:
Figure 17D:
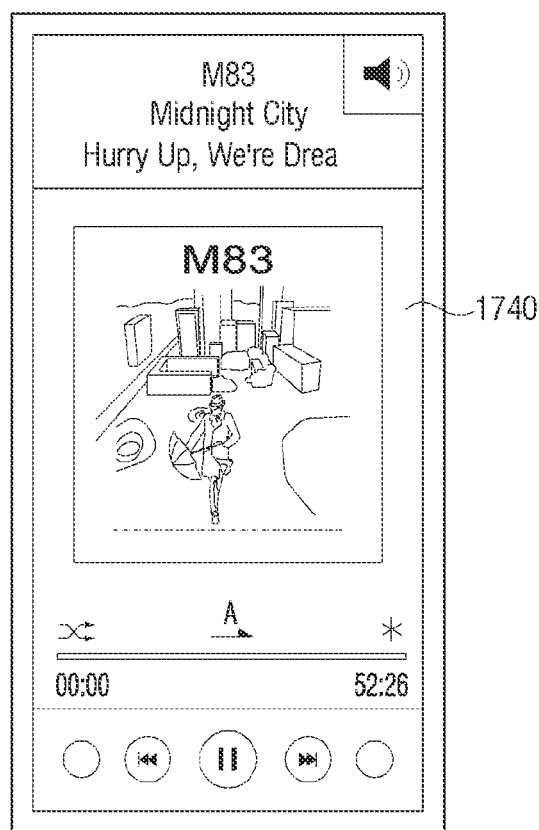
Figure 17E:
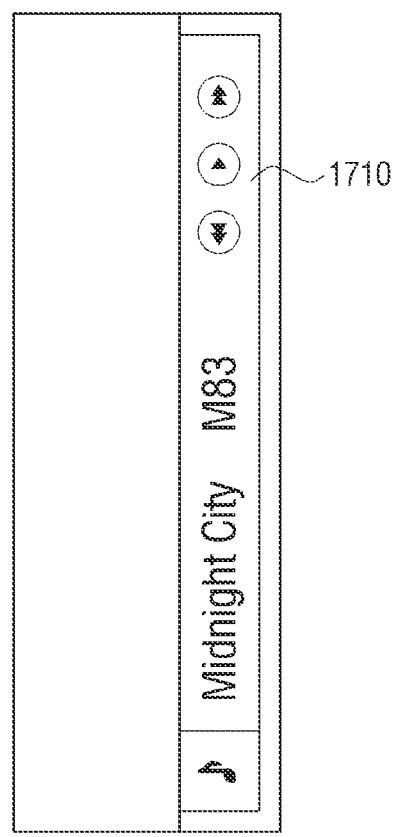

According to an exemplary embodiment, if a folding interaction of folding the display 230 is detected while a music application is executed, the controller 290 may control the display 230 to display a UI 1710 corresponding to the music application on the exposure area as illustrated in FIG. 17A. If a call request is received while the UI 1710 corresponding to the music application is displayed on the exposure area, the controller 290 may control the display 230 to display a UI 1720 informing that a call request is received on the exposure area as illustrated in FIG. 17B. If an unfolding interaction of unfolding the display 230 is detected while the UI 1720 informing that a call request is received is displayed on the exposure area, the controller 290 may control the display 230 to display a call screen 1730 on full screen as illustrated in FIG. 17C. Subsequently, when the telephone call is completed, the controller 290 may control the display 230 to display an execution screen 1740 of the music application on full screen as illustrated in FIG. 17D. If a folding interaction of folding the display 230 is detected again, the controller 290 may control the display 230 to display the UI 1710 corresponding to the music application on the exposure area as illustrated in FIG. 17E.

Figure 18A:
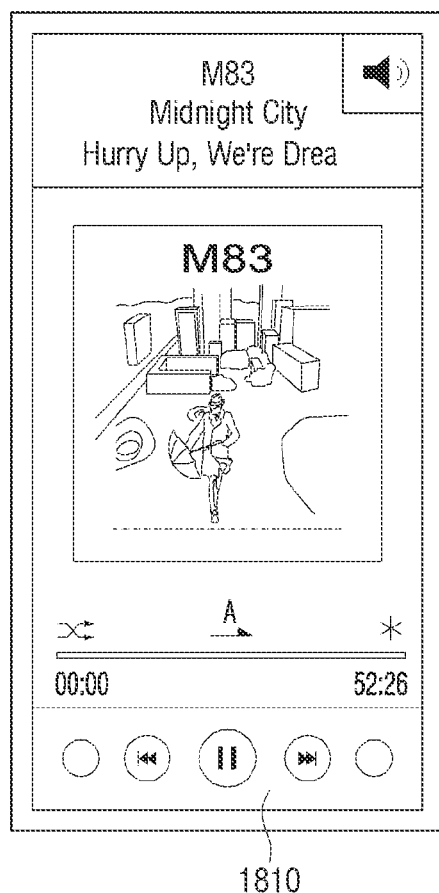
Figure 18B:
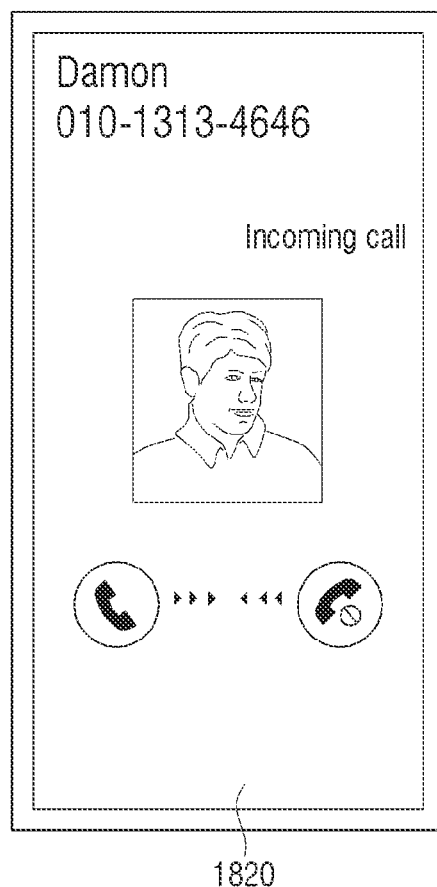
Figure 18C:
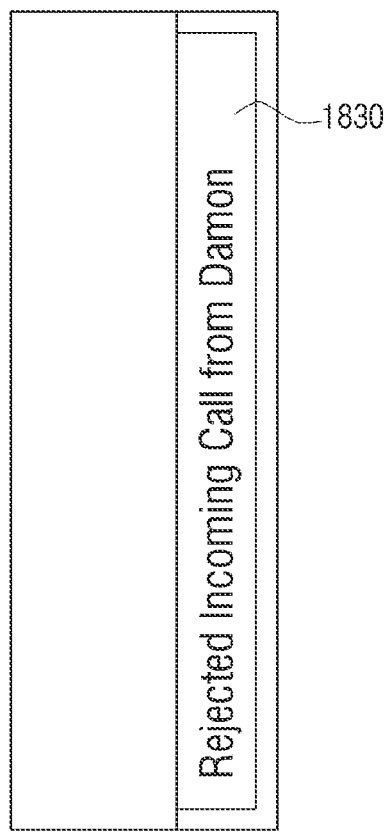
Figure 18D:
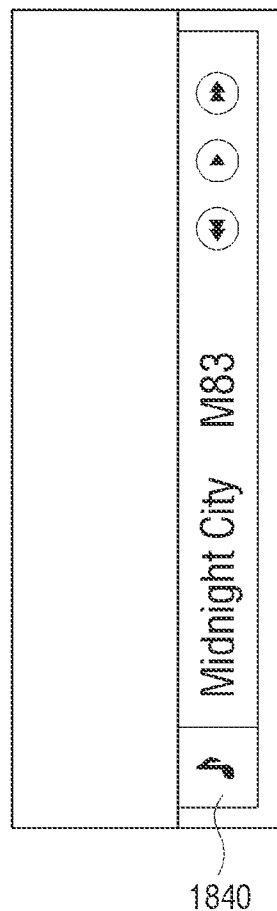
Figure 18E:
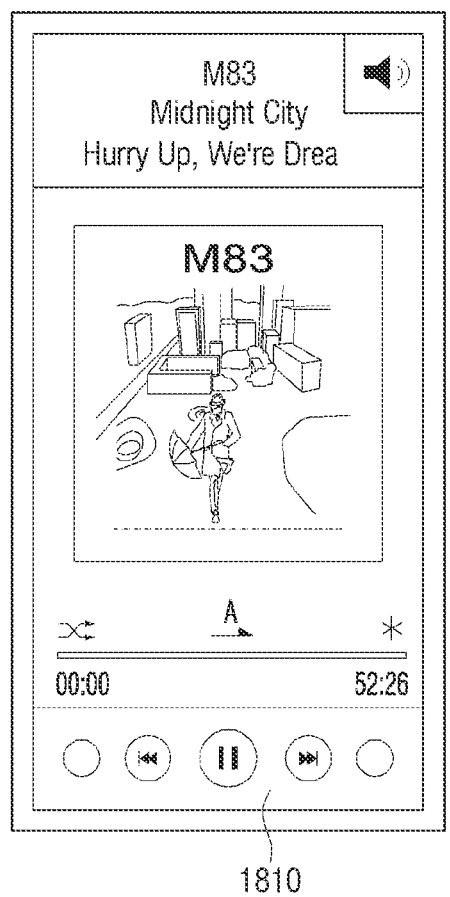

According to another exemplary embodiment, as illustrated in FIG. 18A, the controller 290 may control the display 230 to display an execution screen 1810 of a music application on full screen while the music application is executed. If a call request is received from outside, the controller 290 may control the display 230 to display a screen 1820 for confirming whether to accept the call request as illustrated in FIG. 18B. If a folding interaction of folding the display 230 is detected while the screen 1820 for confirming whether to accept the call request is displayed, the controller 290 may control the display 230 to display a UI 1830 informing that a call request is rejected on the exposure area as illustrated in FIG. 18C. When the telephone call is completed, the controller 290 may control the display 230 to display a UI 1840 corresponding to the music application on the exposure area as illustrated in FIG. 18D. Subsequently, if an unfolding interaction of unfolding the display 230 is detected again, the controller 290 may control the display 230 to display the execution screen 1810 of the music application on full screen as illustrated in FIG. 18E.

Figure 19A:
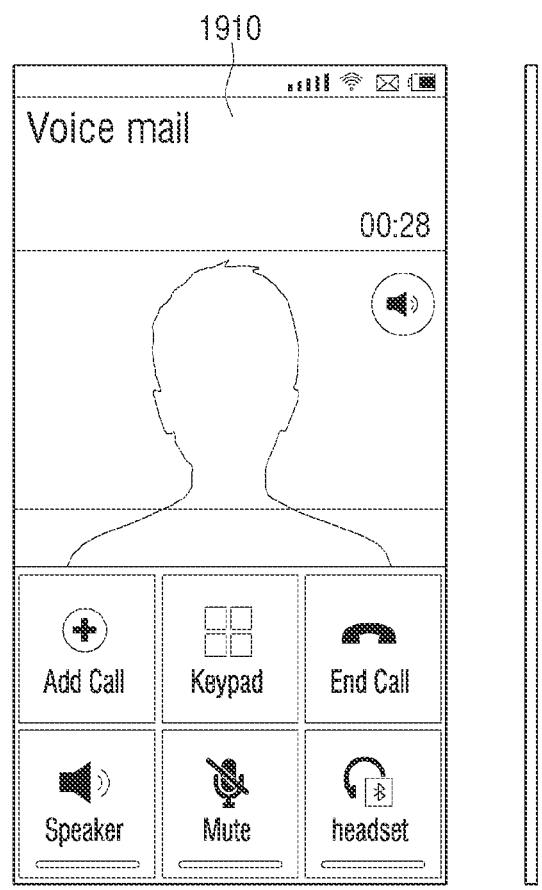

The controller 290 may determine a display area which can be watched by a user according to a hinge angle of the display 230, and control the display 230 to display a screen including different amount of information on the determined display area. In this case, the hinge angle of the display 230 may be matched with the watchable display area and then stored. According to an exemplary embodiment, if the display 230 is unfolded while a telephone call is performed, the controller 290 may control the display 230 to display a first telephone call screen 1910 on full screen as illustrated in FIG. 19A.

Figure 19B:
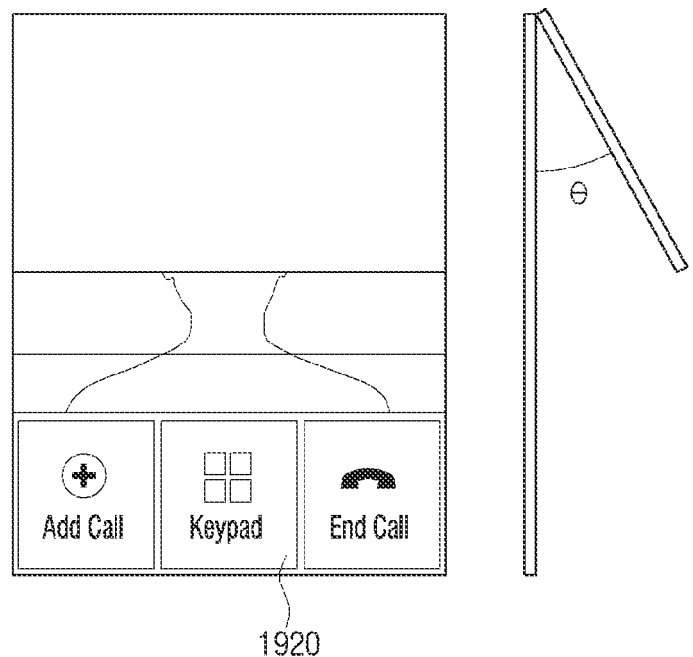

If a hinge angle of the display 230 is folded as much as θ while a telephone call is performed, the controller 290 may determine a display area corresponding to the hinge angle, and as illustrated in FIG. 19B, may control the display 230 to display a second telephone call screen 1920 on the determined display area. In this case, the second telephone call screen 1920 may include less information and fewer icons than those included in the first telephone call screen 1910.

Figure 19C:
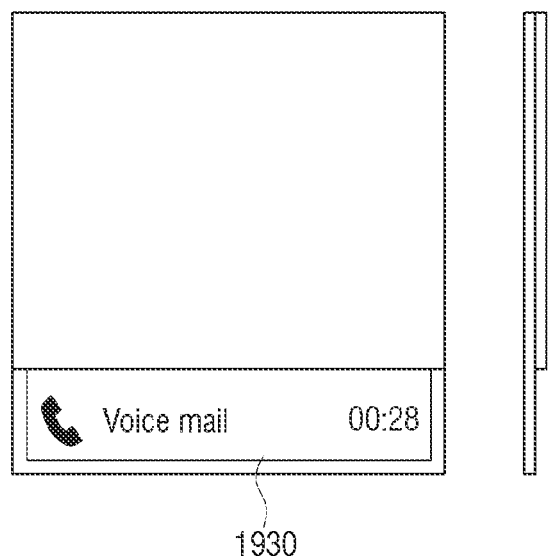

In addition, if the display 230 is folded while a telephone call is performed, the controller 290 may control the display 230 to display a UI 1930 informing that a telephone call is being performed on the exposure area as illustrated in FIG. 19C.

Figure 20A:
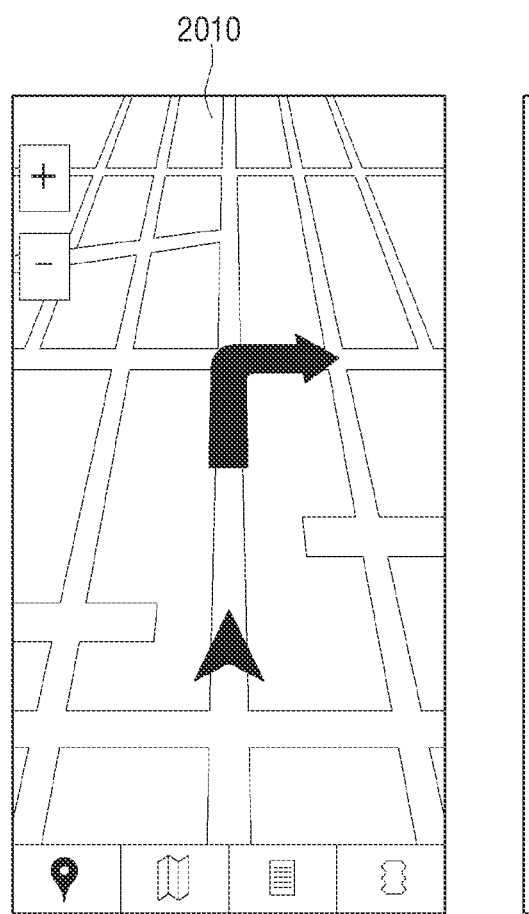

According to another exemplary embodiment, if the display 230 is unfolded while a navigation application is executed, the controller 290 may control the display 230 to display a first navigation screen 2010 on full screen as illustrated in FIG. 20A.

Figure 20B:
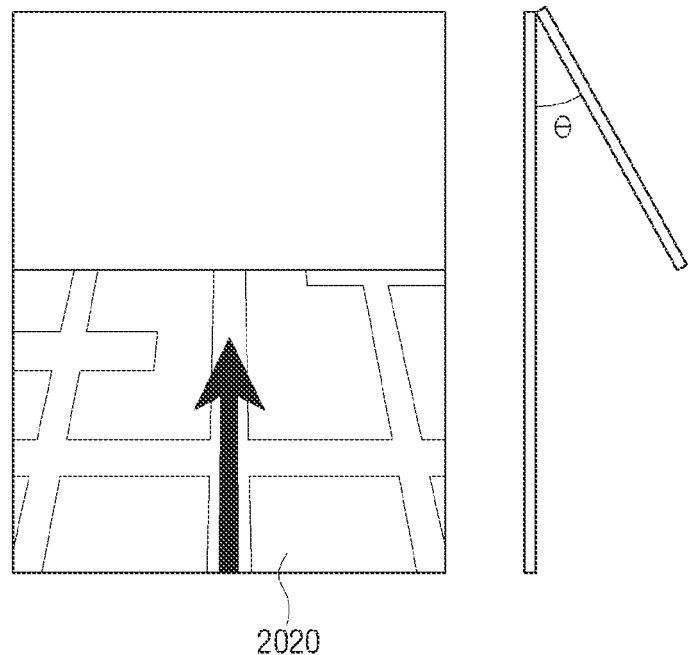

If a hinge angle of the display 230 is folded as much as θ while a navigation application is executed, the controller 290 may determine a display area corresponding to the hinge angle, and as illustrated in FIG. 20B, may control the display 230 to display a second navigation screen 2020 on the determined display area. In this case, the area guided by the second navigation screen 2020 may be smaller than the area guided by the first navigation screen 2010.

Figure 20C:
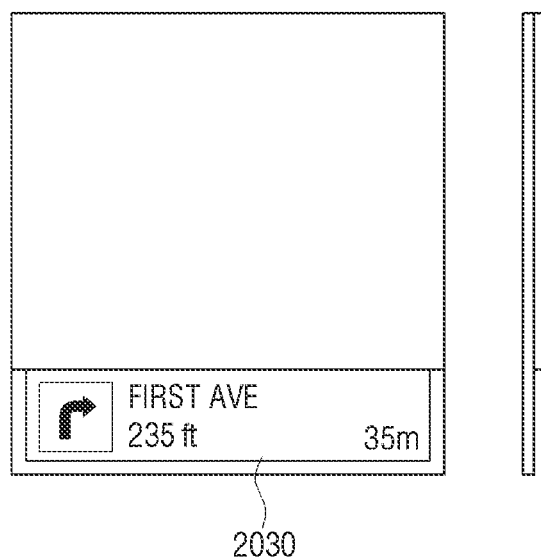

If the display 230 is folded while a navigation application is executed, the controller 290 may control the display 230 to display a third navigation screen 2030 on the exposure area as illustrated in FIG. 20C. In this case, the third navigation screen 2030 may include only direction information and distance information instead of a map screen included in the first navigation screen 2010 and the second navigation screen 2020. However, a map screen may also be included on the exposure area in third navigation screen 2030.

Whenever a folding interaction or an unfolding interaction is detected, the controller 290 may control the display 230 to reconfigure and display information such that the information corresponds to the size and direction of a screen.

Figure 21B:
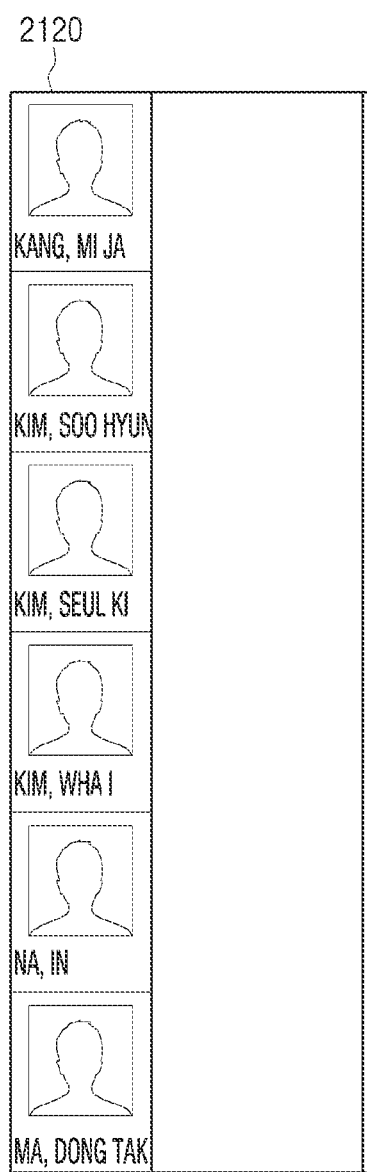

Specifically, as illustrated in FIG. 21A, if a folding interaction of folding the display 230 is detected while a first address book list 2110 is displayed on full screen, the controller 290 may control the display 230 to display a second address book list 2120 on the exposure area as illustrated in FIG. 21B. In this case, the first address book list 2110 might include user information such as image, name, telephone number, direct call icon, etc., and the second address book list 2120 might include user information such as image and name only, but the display is not limited to this.

Figure 22A:
Figure 22B:
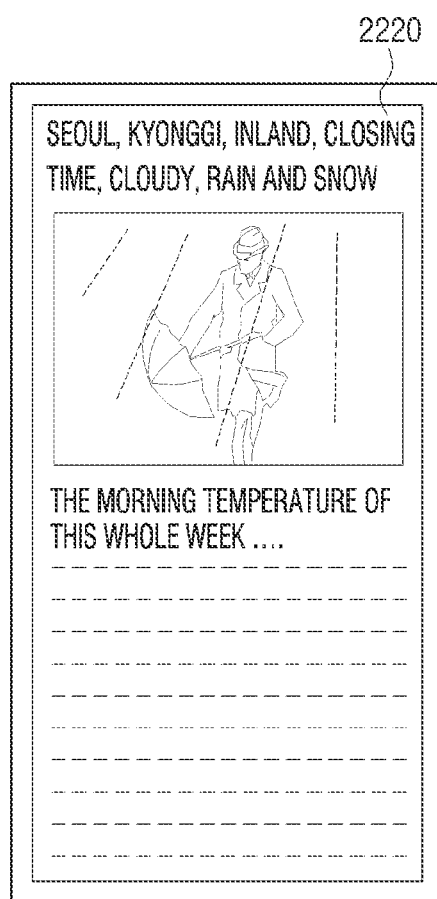

In addition, as illustrated in FIG. 22A, if an unfolding interaction of unfolding the display 230 is detected while a news title 2210 is displayed on the exposure area when the display 230 is folded, the controller 290 may control the display 230 to display a screen 2220 including not only the news title but also the news image and the news text as illustrated in FIG. 22B.

In addition, the controller 290 may control the display 230 to display different information on the exposure area and the hidden area when the display 230 is folded. In this case, as illustrated in FIG. 23A, the controller 290 may control the display 230 to display common information on an exposure area 2310 and private information on a hidden area 2320. For example, as illustrated in FIG. 23B, the controller 290 may control the display 230 to display barcode information which is common information on the exposure area 2330, and credit card list and transaction information which is private information on the hidden area 2340.

Function Change According to Change in Angle Where the Display is Folded

According to an exemplary embodiment, while the display 230 is folded forward such that the first area 320 faces the second area 330 which is larger than the first area 320 with reference to the folding line 310 of the display 230, the controller 290 may control the display 230 to display the first screen on the exposure area 340 which is an exposed area of the second area 330. For example, the first screen may include at least one of an image content, an object, an application, and a text. If the detector 280 detects an unfolding interaction of unfolding the display 230 with reference to the folding line 310 while the first screen is displayed, the controller 290 may control the display 230 to display the second screen related to the first screen on the first area 320 and the second area 330. If the detector 280 detects a folding interaction of folding the display 230 backward such that the first cover 350 corresponding to the first area 320 faces the second cover 370 corresponding to the second area 330 with reference to the folding line 310, the controller 290 may control the display 230 to display the third screen related to the first screen on the first area 320 or the second area 330.

In this case, the state that the first area 320 and the second area 330 facing each other means a state where the display 230 is folded forward such that a plane including the first area 320 is in parallel or substantially parallel with a plane including the second area 330. Alternatively, the state that the first area 320 and the second area 330 facing each other means a state where the display 230 is folded forward up to a predetermined angle range (for example, 160° to 180°) such that the display 230 is unfolded first and then, the first area 320 faces the second area 330. The state that first area 320 and the second area 330 facing each other may also mean a state where the display 230 is folded forward such that the first area 320 comes into contact with the second area 330.

Similarly, the state that the first cover 350 and the second cover 360 facing each other means a state where the display 230 is folded backward such that a plane including the first cover 350 is in parallel or substantially parallel with a plane including the second cover 360. Alternatively, the state that the first cover 350 and the second cover 360 facing each other means a state where the display 230 is folded backward up to a predetermined angle range (for example, 160° to 180°) such that the display 230 is unfolded first and then, the first cover 350 faces the second cover 360. The state that first cover 350 and the second area 360 facing each other may also mean a state where the display 230 is folded backward such that the first cover 350 comes into contact with the second cover 360.

Hereinafter, an exemplary embodiment will be described in greater detail with reference to FIGS. 24 and 25.

Figure 24:
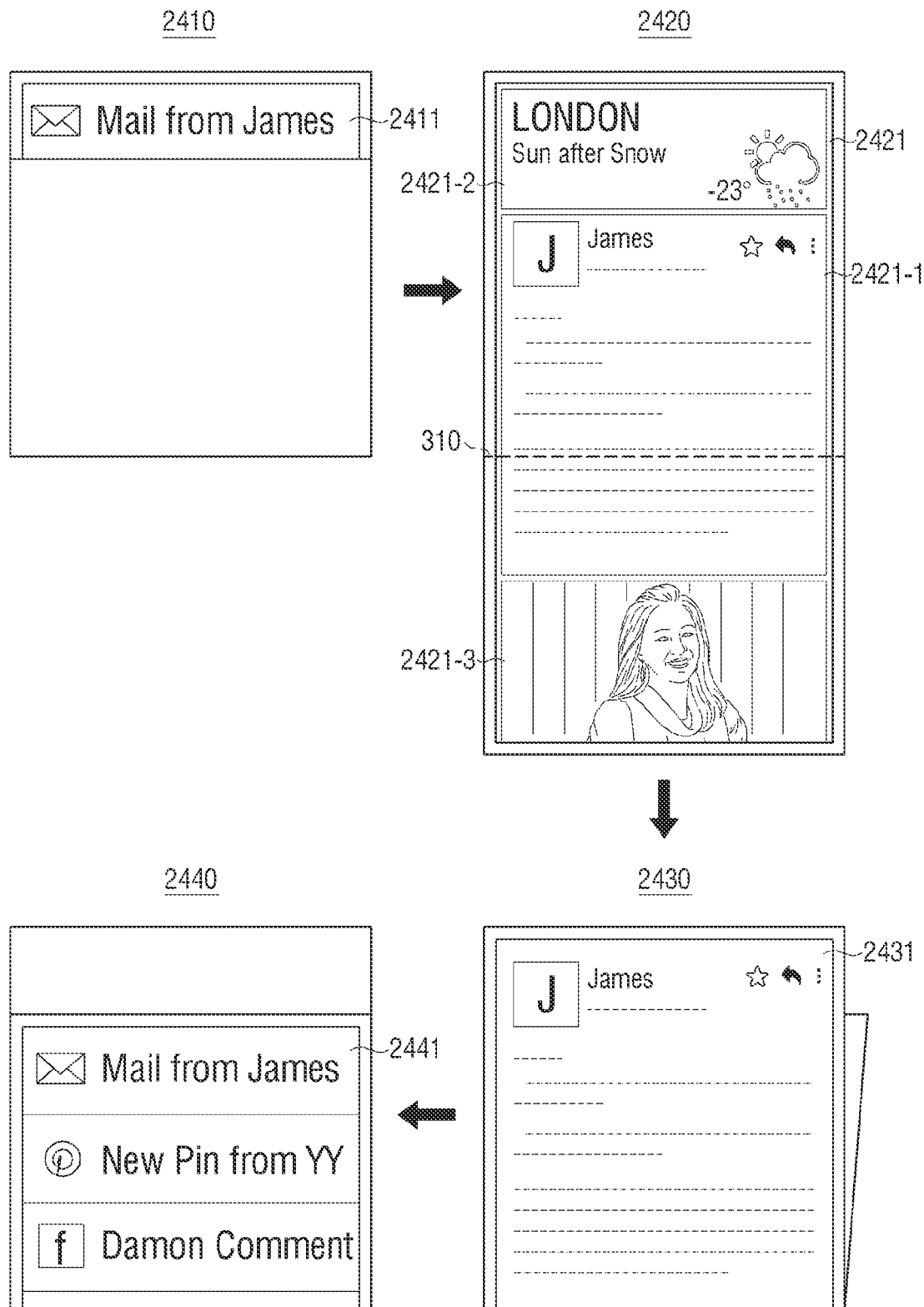

FIG. 24 is a view illustrating an exemplary embodiment of performing various functions of the user terminal device 200 illustrated in FIG. 2 based on a folding interaction.

As illustrated in 2410 of FIG. 24, the controller 290 may control the display 230 to display a first screen 2411 including common information (for example, a mail sender name or a mail-related object) on the exposure area 340 which is an exposed area of the second area 330. While the first screen 2411 is displayed, the detector 280 may detect an unfolding interaction of unfolding the display 230.

If the detector 280 detects an unfolding interaction, as illustrated in 2420 of FIG. 24, the controller 290 may control the display 230 to display a second screen 2421 with a widget 2421-1 including detailed common information (for example, the main text of a mail) on the first area 320 and the second area 330. In this case, the second screen 2421 may also include other widgets 2421-2, 2421-3. While the second screen 2421 is displayed, the detector 280 may detect a folding interaction of folding the display 230 backward such that the cover 350 corresponding to the first area 320 faces the cover 360 corresponding to the second area 330 with reference to the folding line 310.

If the detector 280 detects a folding interaction of folding the display 230 backward, as illustrated in 2430 of FIG. 24, the controller 290 may control the display 230 to display a third screen 2431 including detailed common information (for example, the main text of a mail) on the second area 330. While the third screen 2431 is displayed, the detector 280 may detect a flip interaction of flipping the user terminal device 200.

If the detector 280 detects a flip interaction, as illustrated in 2440 of FIG. 24, the controller 290 may control the display 230 to display a fourth screen 2441 including a common information list on the first area 320. The common information list may include, for example, identification information regarding a sender who sends a mail, a mail title, part of the main text of a mail, and common information regarding the state of the user terminal device 200. The common information may be accumulated and displayed in the order where the information is received. For example, the common information which is generated most recently may be on the top of the common information list.

In another example, in 2420 of FIG. 24, if the detector 280 detects a folding interaction of folding backward, the controller 290 may control the display 230 to display the third screen 2431 including the detailed common information on the second area 330 and to display the fourth screen 2441 including the common information list on the first area 320.

Figure 25:
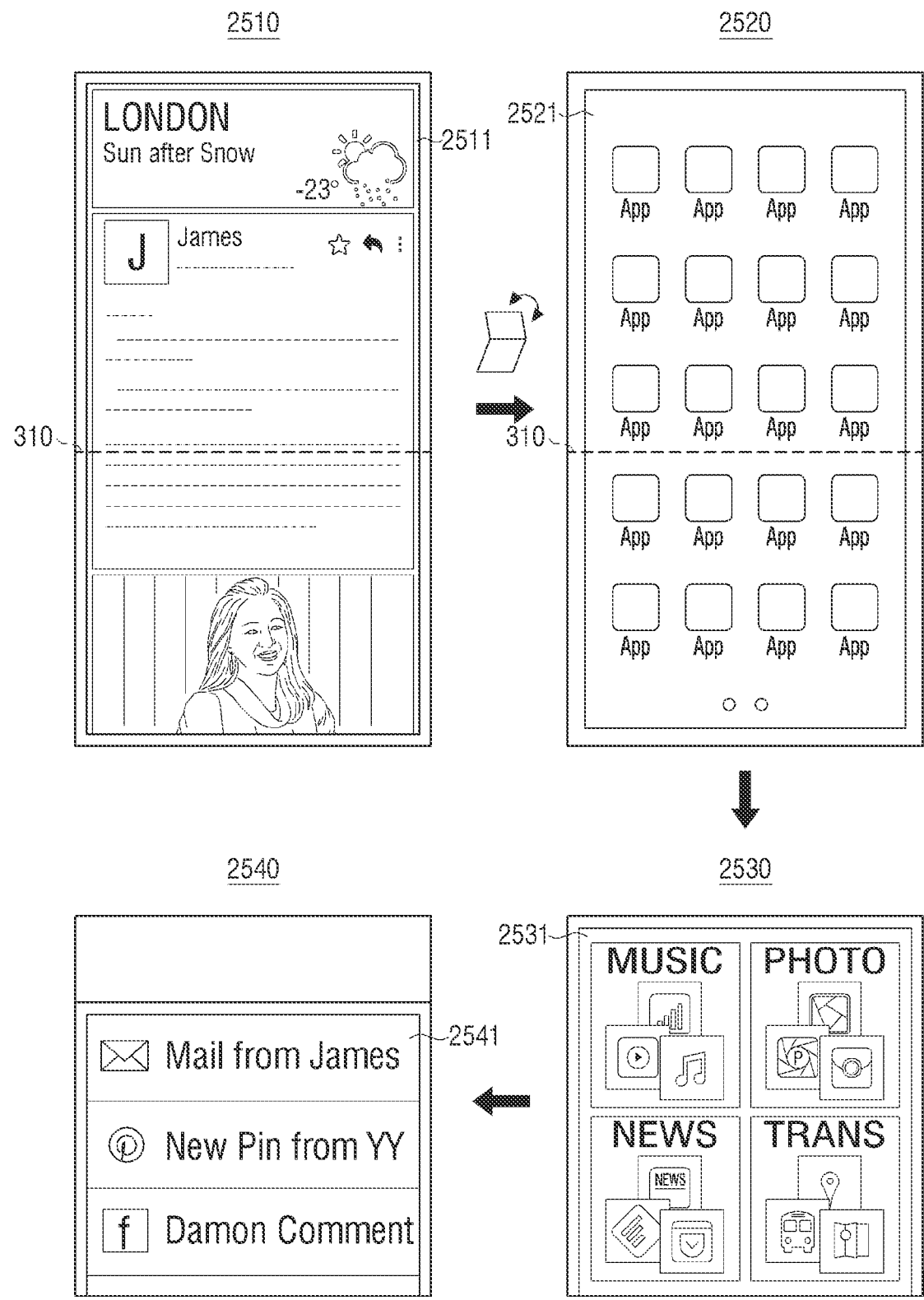

FIG. 25 illustrates an exemplary embodiment of performing various functions of the user terminal device 200 illustrated in FIG. 2 based on a folding interaction.

As illustrated in 2510 of FIG. 25, the controller 290 may control the display 230 to display a home screen 2511 including a plurality of widgets on the first area 320 and the second area 330. While the home screen 2511 is displayed, the detector 280 may detect a flap interaction of folding the display 230 forward up to a predetermined angle range (for example, more than 30°) with reference to the folding line 310 and then, unfolding the display 230 again.

If the detector 280 detects the flap interaction, as illustrated in 2520 of FIG. 25, the controller 290 may control the display 230 to display a home screen 2521 including application icons. While the home screen 2521 is displayed, the detector 280 may detect a folding interaction of folding the display 230 backward such that the first cover 350 corresponding to the first area 320 faces the second cover 360 corresponding to the second area 330 with reference to the folding line 310.

If the detector 280 detects the folding interaction, as illustrated in 2530 of FIG. 25, the controller 290 may control the display 230 to display a folder screen 2531 including a plurality of folders on the second area 330. In this case, each of the folders on the folder screen 2531 may include application icons which are classified according to their properties. While the folder screen 2531 is displayed, the detector 280 may detect a flip interaction of flipping the user terminal device 200.

If the detector 280 detects the flip interaction, as illustrated in 2540 of FIG. 25, the controller 290 may control the display 230 to display a common information list screen 2541 including a common information list on the first area 320.

According to another exemplary embodiment, the controller 290 may control the display 230 to display the first screen on the first area 320 and the second area 330. While the first screen is displayed, the detector 280 may detect the first folding interaction of folding the display 230 forward up to a predetermined angle range with reference to the folding line 310, or the second folding interaction of folding the display 230 backward up to a predetermined angle range.

If the detector 280 detects the first folding interaction, the controller 290 may control the display 230 to display the second screen related on the first screen on the exposure area 340 which is an exposed area of the second area 330. On the other hand, if the detector 280 detects the second folding interaction, the controller 290 may control the display 230 to display the third screen related to the first screen on the first area 320 or the second area 330.

Hereinafter, another exemplary embodiment will be described in greater detail with reference to FIG. 26.

FIG. 26 illustrates an exemplary embodiment of performing various functions of the user terminal device 200 illustrated in FIG. 2 based on a folding interaction.

As illustrated in 2610 of FIG. 26, the controller 290 may control the display 230 to display a telephone call request screen 2611 for requesting a telephone call from outside on the first area 320 and the second area 330. While the telephone call request screen 2611 is displayed, the detector 280 may detect the first folding interaction of folding the display 230 forward to up to a predetermined angle range, or the second folding interaction of folding the display 230 backward up to a predetermined angle range. In this case, folding the display 230 forward up to a predetermined angle range may be, for example, folding the display 230 forward with reference to the folding line 310 such that the first area 320 faces the second area 330. In addition, folding the display 230 backward up to a predetermined angle range may be, for example, folding the display 230 backward at more than 90° with reference to the folding line 310 such that the user terminal device 200 can stand on the floor.

If the detector 280 detects the first folding interaction, as illustrated in 2620 of FIG. 26, the controller 290 may control the display 230 to display a telephone call refusal screen 2621 including an object or a text for refusing the telephone call request. On the other hand, if the detector 280 detects the second folding interaction, as illustrated in 2630 of FIG. 26, the controller 290 may accept the telephone call request, execute a speaker phone function, and control the display 230 to display a telephone call acceptance screen 2631 including icons for controlling various functions of a telephone call.

Hereinafter, various exemplary embodiments wherein a visual effect of the user terminal device 200 illustrated in FIG. 2 where an object or an image content changes while the display 230 is folded will be described with reference to FIGS. 27 to 29.

Figure 27:
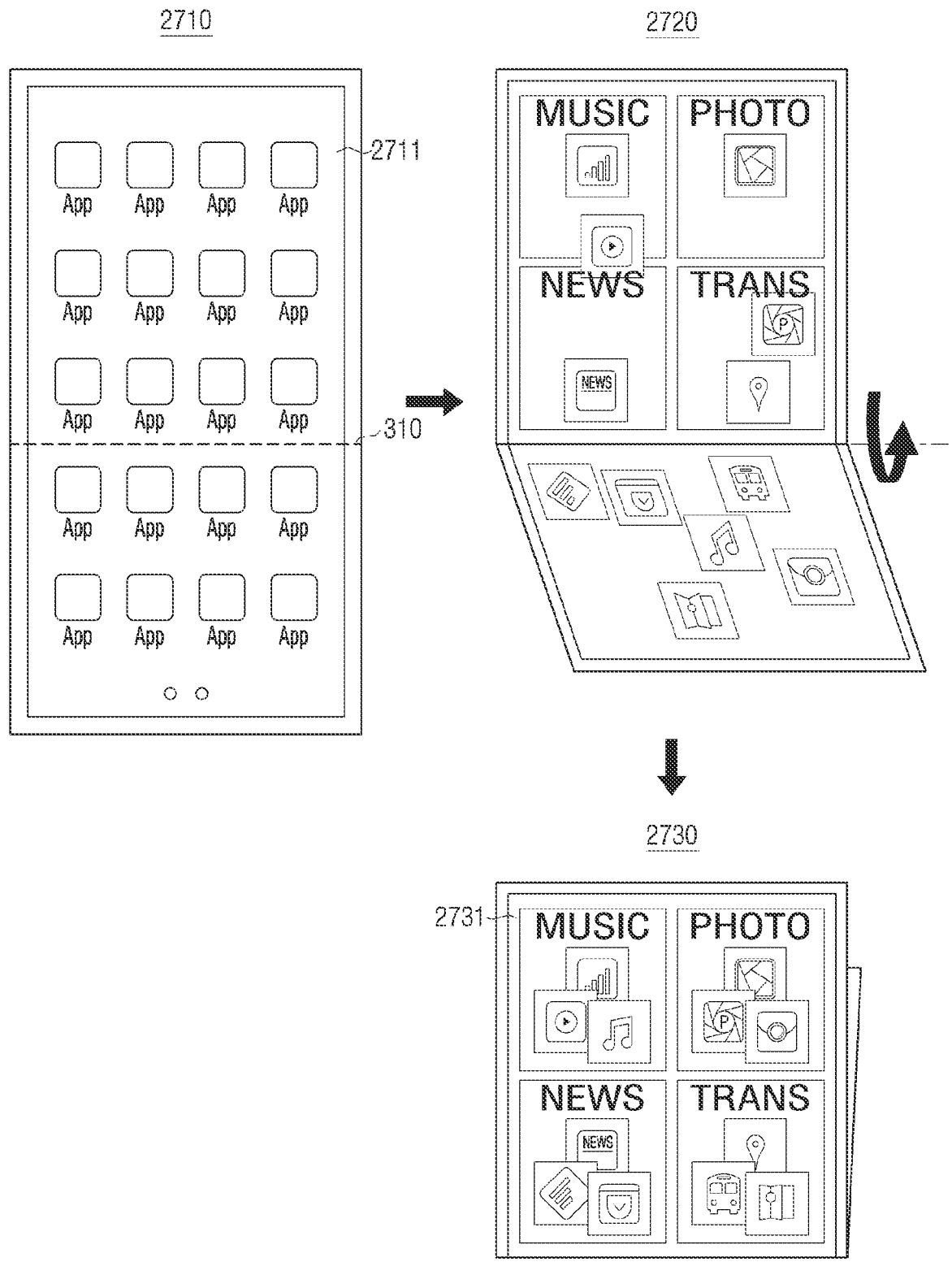

FIG. 27 is a view provided to explain an exemplary embodiment of performing various functions of the user terminal device 200 illustrated in FIG. 2 based on a folding interaction according to another exemplary embodiment.

As illustrated in 2710 of FIG. 27, the controller 290 may control the display 230 to display a home screen 2711 including application icons on the first area 320 and the second area 330. While the home screen 2721 is displayed, the detector 280 may detect a folding interaction of folding the display 230 backward with reference to the folding line 310.

If the detector 280 detects the folding interaction, as illustrated in 2720 of FIG. 27, the controller 290 may control the display 230 to display a visual effect of moving each of the application icons of the home screen 2711 to a respective folder. Specifically, as the angle at which the display 230 is folded increases, the controller 290 may control the display 230 to display a process where the application icons gradually move upward and enter categorized folders.

If the detector 280 keeps detecting a folding interaction and detects a folding interaction of folding the display 230 such that the cover 350 corresponding to the first area 320 faces the cover 360 corresponding to the second area 330, as illustrated in 2730 of FIG. 27, the controller 290 may control the display 230 to display a folder screen 2731 with folders including application icons on the second area.

Figure 28:
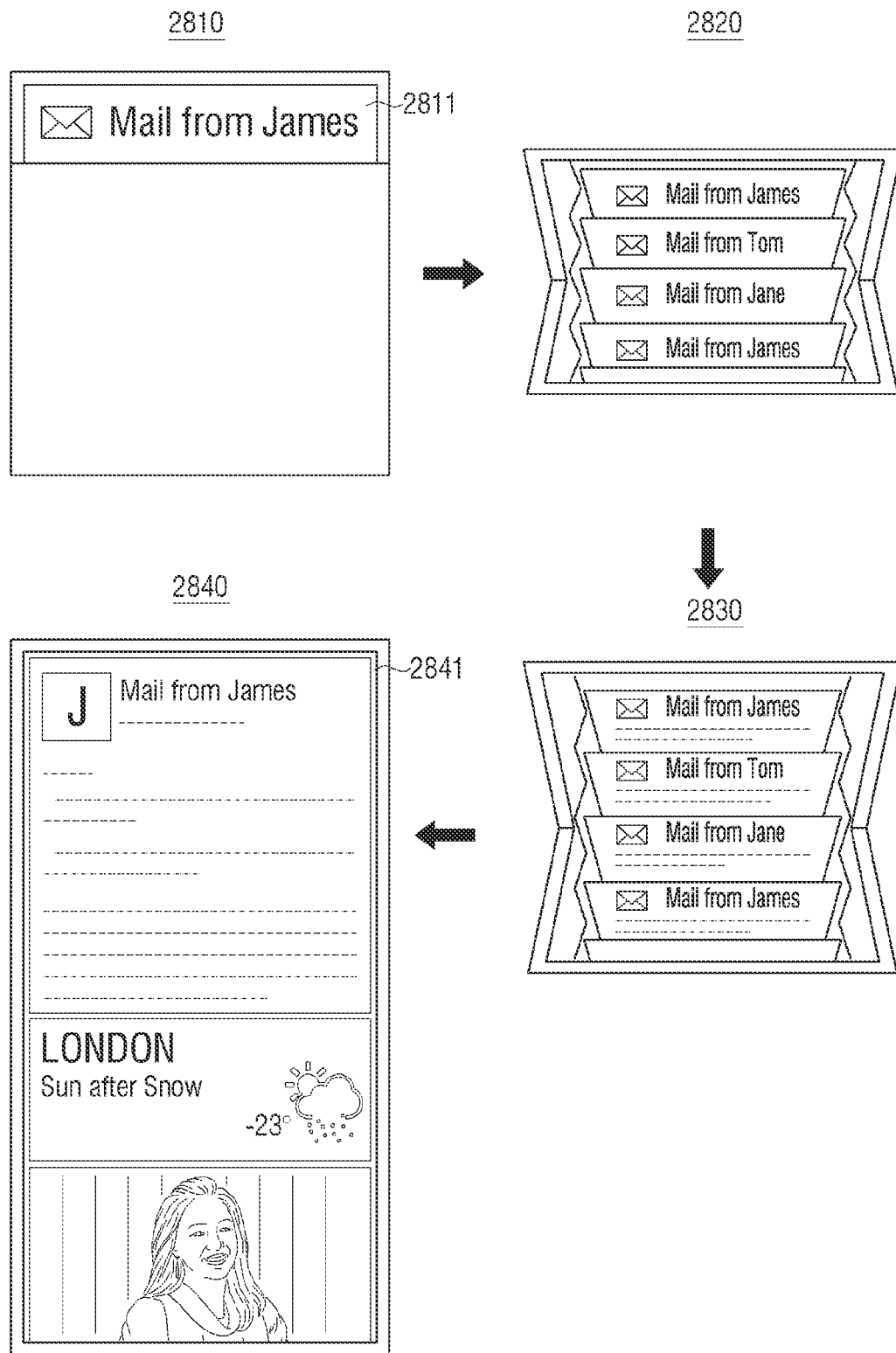

FIG. 28 illustrates an exemplary embodiment of performing various functions of the user terminal device 200 illustrated in FIG. 2 based on a folding interaction.

As illustrated in 2810 of FIG. 28, the controller 290 may control the display 230 to display a screen 2811 including common information (for example, a mail sender name or a mail-related object) on the exposure area 340 which is an exposed part of the second area 330. While the screen 2811 is displayed, the detector 280 may detect an unfolding interaction of unfolding the display 230.

If the detector 280 detects the unfolding interaction, the controller 290 may control the display 230 to display a visual metaphor effect of spreading a folder according to the angle where the display 230 is unfolded. Specifically, if the angle where the display 230 is unfolded is within the first angle range (for example, 5°~90°), as illustrated in 2820 of FIG. 28, the controller 290 may control the display 230 to display titles of common information of a common information list. If the angle where the display 230 is unfolded is within the second angle range (for example, 90°~160°), as illustrated in 2830 of FIG. 28, the controller 290 may control the display 230 to display titles and a part of main texts of common information of a common information list. If the angle where the display 230 is unfolded is within the third angle range (for example, 160°~180°), as illustrated in 2840 of FIG. 28, the controller 290 may control the display 230 to display a screen 2841 with a widget including detailed common information.

Figure 29:
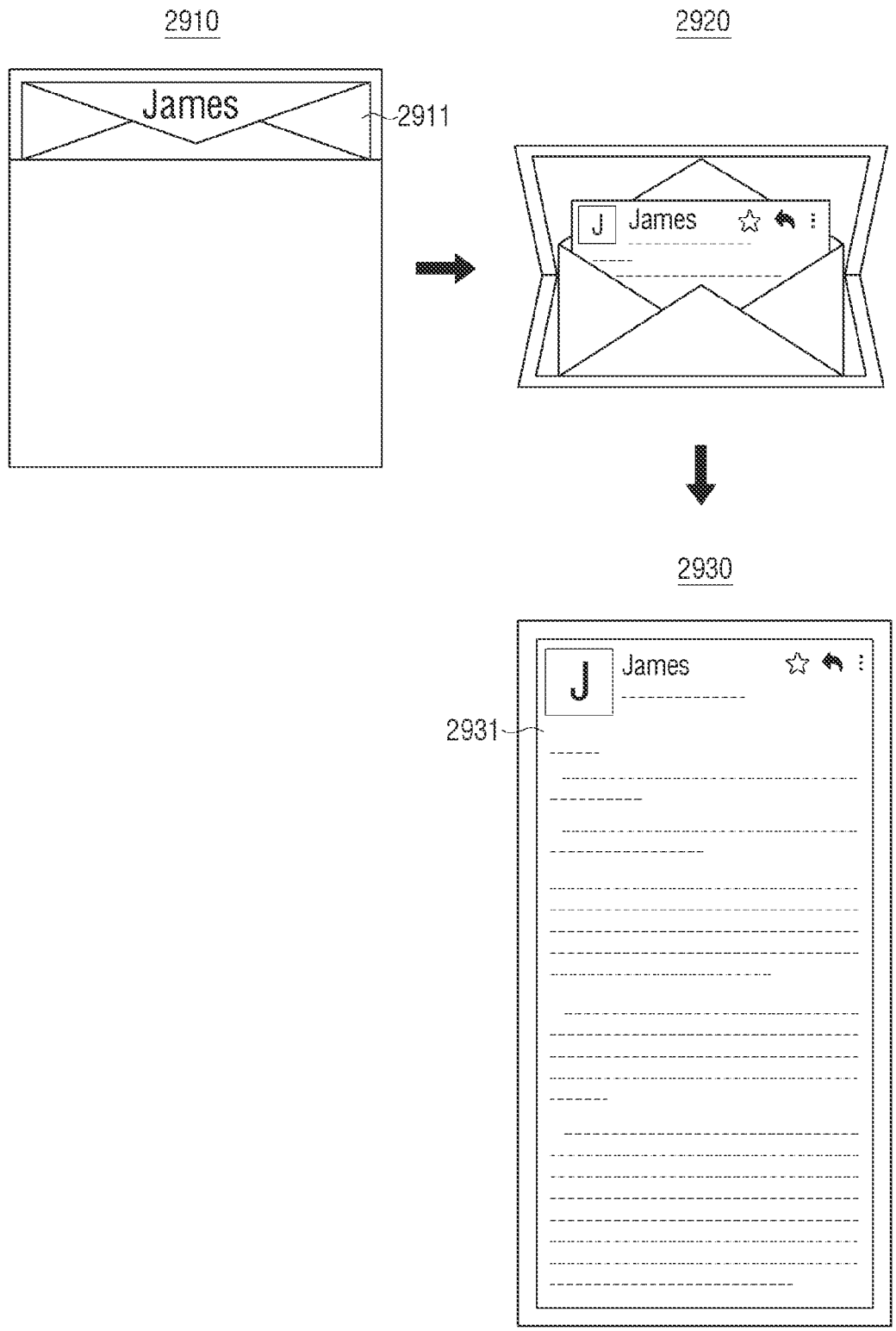

FIG. 29 illustrates an exemplary embodiment of performing various functions of the user terminal device 200 illustrated in FIG. 2 based on a folding interaction.

As illustrated in 2910 of FIG. 29, the controller 290 may control the display 230 to display a screen 2911 including common information (for example, an envelope object) on the exposure area 340 which is an exposed part of the second area 330. While the screen 2911 is displayed, the detector 280 may detect an unfolding interaction of unfolding the display 230.

If the detector 280 detects the unfolding interaction, as illustrated in 2920 of FIG. 29, the controller 290 may control the display 230 to display a visual metaphor effect that a letter appears after the envelop opens. Specifically, as the angle where the display 230 is unfolded increases, the controller 290 may control the display 230 to display the process that the envelop opens and the main contents of a letter appear gradually.

If the detector 280 detects an unfolding interaction of unfolding the display 230 completely, as illustrated in 2930 of FIG. 29, the controller 290 may control the display 230 to display a screen 2931 including detailed common information (for example, the main text of a mail).

According to another exemplary embodiment, the controller 290 may control the display 230 to display the first screen on the second area 330, and to display the second screen related to the first screen on the first area 320.

While the first screen and the second screen are displayed, the detector 280 may detect a flap interaction of folding the display 230 up to a predetermined angle range (for example, more than 30°) with reference to the folding line 310 and unfolding the display 230 again. If the detector 280 detects the flap interaction, the controller 290 may control the display 230 to keep displaying the first screen on the second area 330 and to display the third screen related to the first screen instead of the second screen on the first area 320.

Hereinafter, another exemplary embodiment will be described in greater detail with reference to FIGS. 2 and 30 to 32.

Figure 30:
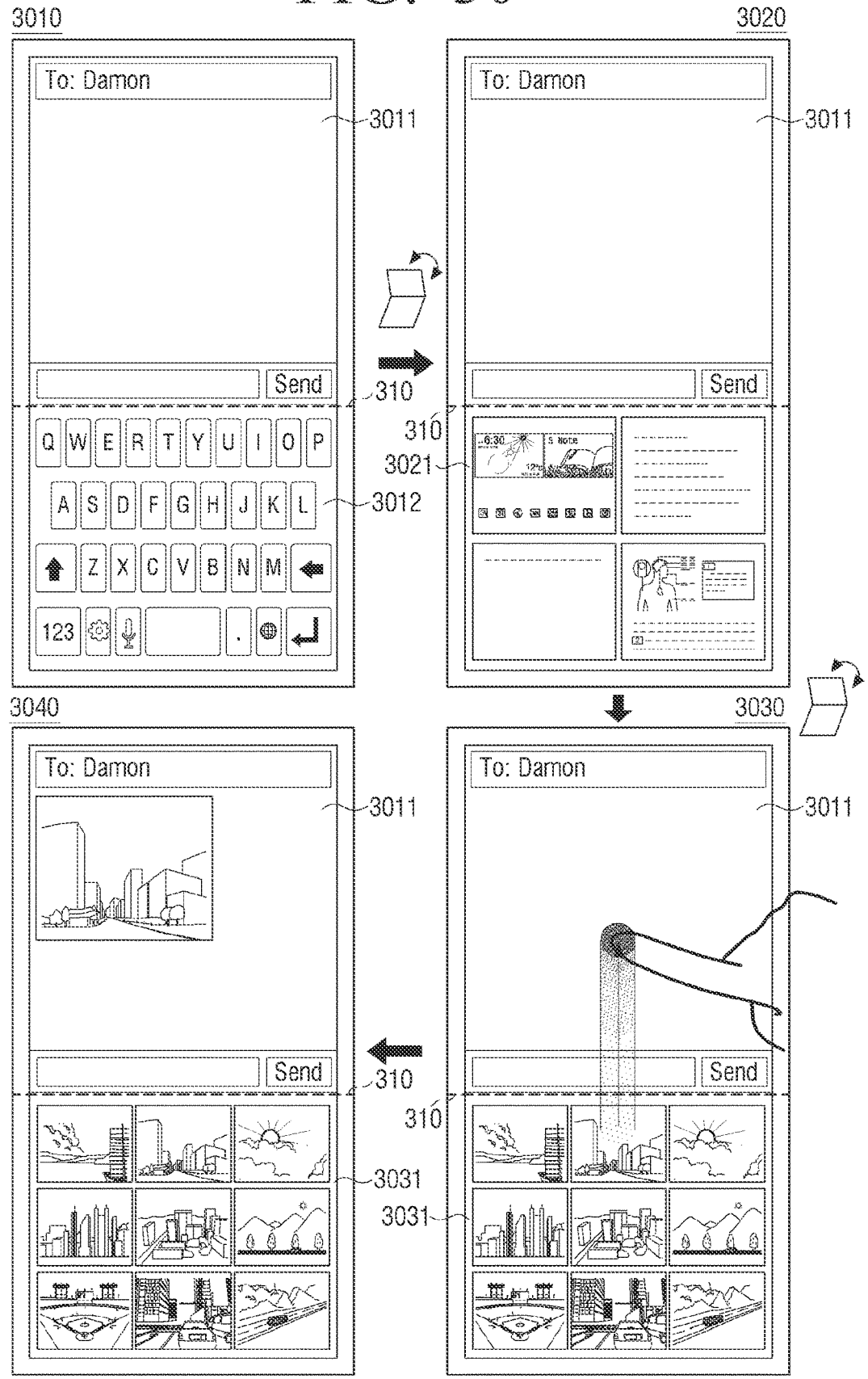

FIG. 30 illustrates an exemplary embodiment of performing various functions of the user terminal device illustrated in FIG. 2 based on a folding interaction.

As illustrated in 3010 of FIG. 30, the controller 290 may control the display 230 to display a message transmission screen 3011 including a message to be transmitted to a counterpart and a transmission button for transmitting a message on the second area 330 and to display a keypad screen 3012 for inputting a text to be displayed on the message display screen 3011 on the first area 320. While the keypad screen 3012 is displayed, the detector 280 may detect a flap interaction of folding the display 230 forward up to a predetermined angle range (for example, more than 30°) with reference to the folding line and then, unfolding the display 230 again.

If the detector 280 detects the flap interaction, as illustrated in 3020 of FIG. 30, the controller 290 may control the display 230 to display the message transmission screen 3011 continuously on the second area 330, and to display a clip board screen 3021 including a previously-copied text or a captured image instead of the keypad screen 3012 on the first area 320. While the clip board screen 3021 is displayed, the detector 280 may detect a flap interaction of folding the display 230 again with reference to the folding line 310 and unfolding the display 230.

If the detector 280 detects the flap interaction, as illustrated in 3030 of FIG. 30, the controller 290 may control the display 230 to display a gallery screen 3031 including images stored in the user terminal device 200 or in an external server instead of the clip board screen 3021. While the gallery screen 3031 is displayed, the detector 280 may detect a user interaction of touching and selecting at least one of the images included in the gallery screen 3031 and dragging or flipping the selected image in the direction of the second area 330.

If the detector 280 detects the user interaction, as illustrated in 3040 of FIG. 30, the controller 290 may control the display 230 to display the message transmission screen 3011 including the selected image on the second area 330. In this case, if the detector 280 detects a touch interaction of selecting a transmission button of the message transmission screen 3011, the controller 290 may control the communicator 240 to transmit a message with an image included in the message transmission screen 3011 to a counterpart.

Meanwhile, if the detector 280 detects a flap interaction while the gallery screen 3031 is displayed, the controller 290 may control the display 230 to display the keypad screen 3012 again instead of the gallery 3031 on the first area 320.

Figure 31:
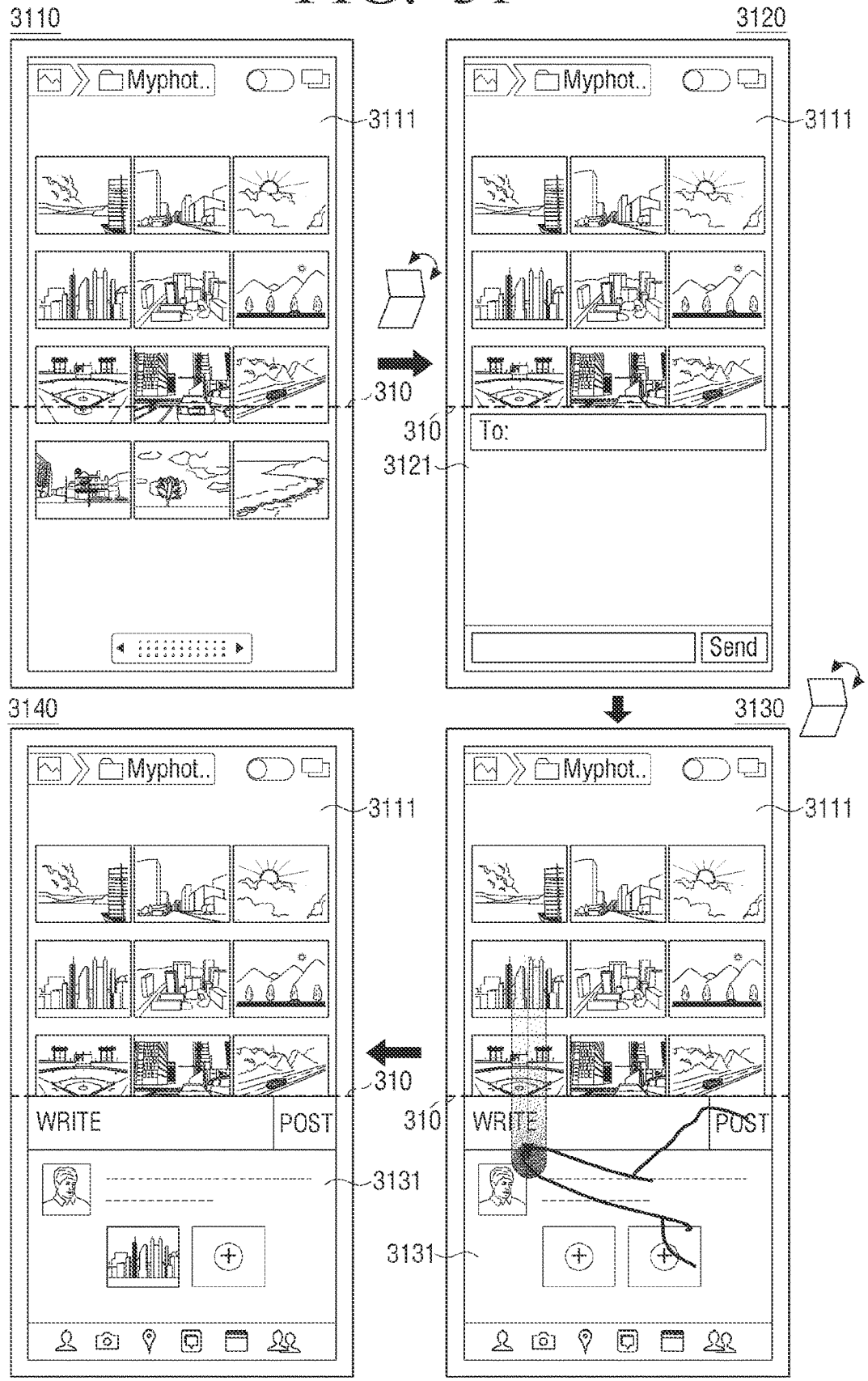

FIG. 31 illustrates an exemplary embodiment of performing various functions of the user terminal device 200 illustrated in FIG. 2 based on a folding interaction.

As illustrated in 3110 of FIG. 31, the controller 290 may control the display 230 to display a gallery screen 3111 including images on the first area 320 and the second area 330. While the gallery screen 3111 is displayed, the detector 280 may detect a flap interaction of folding the display 230 again with reference to the folding line 310 and unfolding the display 230.

If the detector 280 detects the flap interaction, as illustrated in 3120 of FIG. 31, the controller 290 may control the display 230 to display part of the gallery screen 3111 on the second area 330 and to display a message transmission screen 3121 on the first area 320. While the message transmission screen 3121 is displayed, the detector 280 may detect a flap interaction of folding the display 230 again with reference to the folding line 310 and unfolding the display 230.

If the detector 280 detects the flap interaction, as illustrated in 3130 of FIG. 31, the controller 290 may control the display 230 to display a notice screen 3131 for registering a content in a notice provided by a social network service (for example, Facebook, Twitter, etc.) instead of the message transmission screen 3121. While the notice screen 3131 is displayed, the controller 290 may detect a user interaction of touching at least one of the images included in the gallery screen 3111 and dragging or flipping the selected image in the direction of the first area 320.

If the detector 280 detects the user interaction, as illustrated in 3140 of FIG. 31, the controller 290 may control the display 230 to display the notice screen 3131 including the selected image on the second area 330. In this case, if the detector 280 detects a touch interaction of selecting a notice button on the notice screen 3131, the controller 290 may control the communicator 240 to transmit the image included in the notice screen 3131 to a social network server so that the image can be shared with a third party.

Meanwhile, if the detector 280 detects a flap interaction while the notice screen 3131 is displayed, the controller 290 may control the display 230 to display the gallery screen 3111 again on the first area 320 and the second area 330.

FIGS. 32A to 32D illustrate an exemplary embodiment of performing various functions of the user terminal device 200 illustrated in FIG. 2 based on a folding interaction.

Figure 32A:
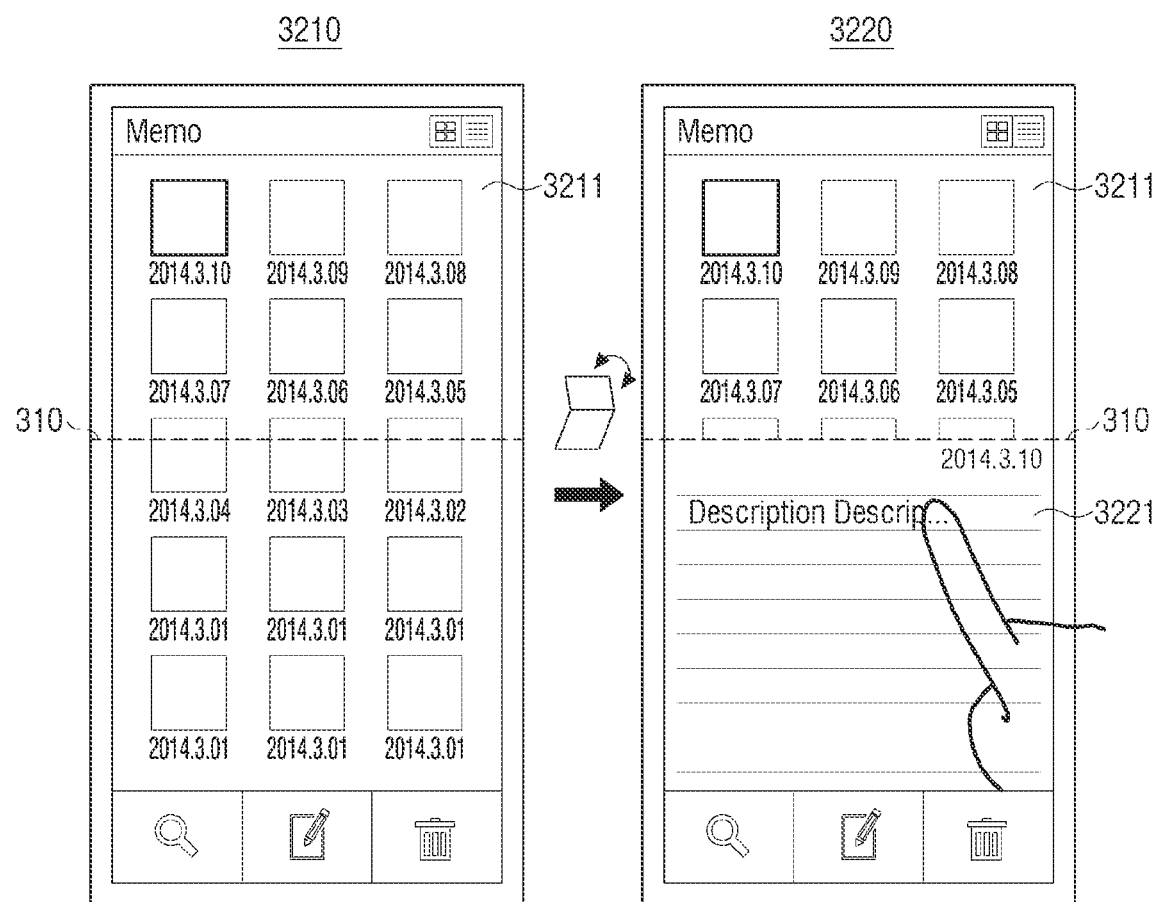

As illustrated in 3210 of FIG. 32A, the controller 290 may control the display 230 to display a memory list screen 3211 including memos on the first area 320 and the second area 330. While the memo list screen 3211 is displayed, the detector 280 may detect a flap interaction of folding the display 230 with reference to the folding line 310 and unfolding the display 230.

If the detector 280 detects the flap interaction, as illustrated in 3220 of FIG. 32A, the controller 290 may control the display 230 to display part of the memo list screen 3211 on the first area 320 and to display a memo writing screen 3221 on the second area 330. While the memo writing screen 3221 is displayed, the controller 290 may detect a user interaction of tap-touching one area of the memo writing screen 3221.

Figure 32B:
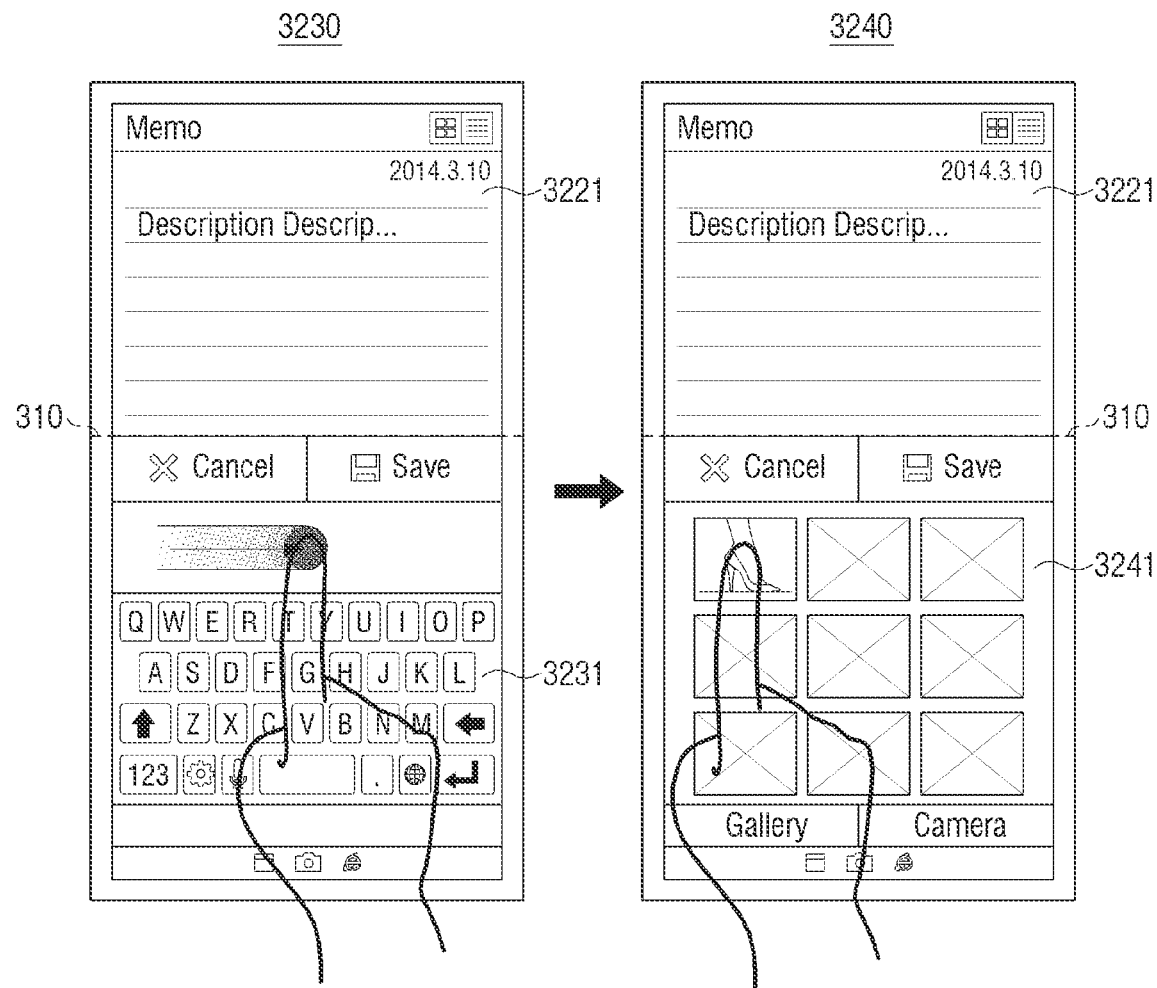

If the detector 280 detects the user interaction, as illustrated in 3230 of FIG. 32B, the controller 290 may control the display 230 to move upward and display the memo writing screen 3221 on the first area 320, and to display a keypad screen 3231 on the second area 330. While the keypad screen 3231 is displayed, the detector 280 may detect a user interaction of panning in one direction on the keypad screen 3231.

If the detector 280 detects the user interaction, as illustrated in 3240 of FIG. 32B, the controller 290 may control the display 230 to display a gallery screen 3241 including images on the second area 330. While the gallery screen 3241 is displayed, the detector 280 may detect a user interaction of long-tapping and selecting one of the images included in the gallery screen 3241.

Figure 32C:
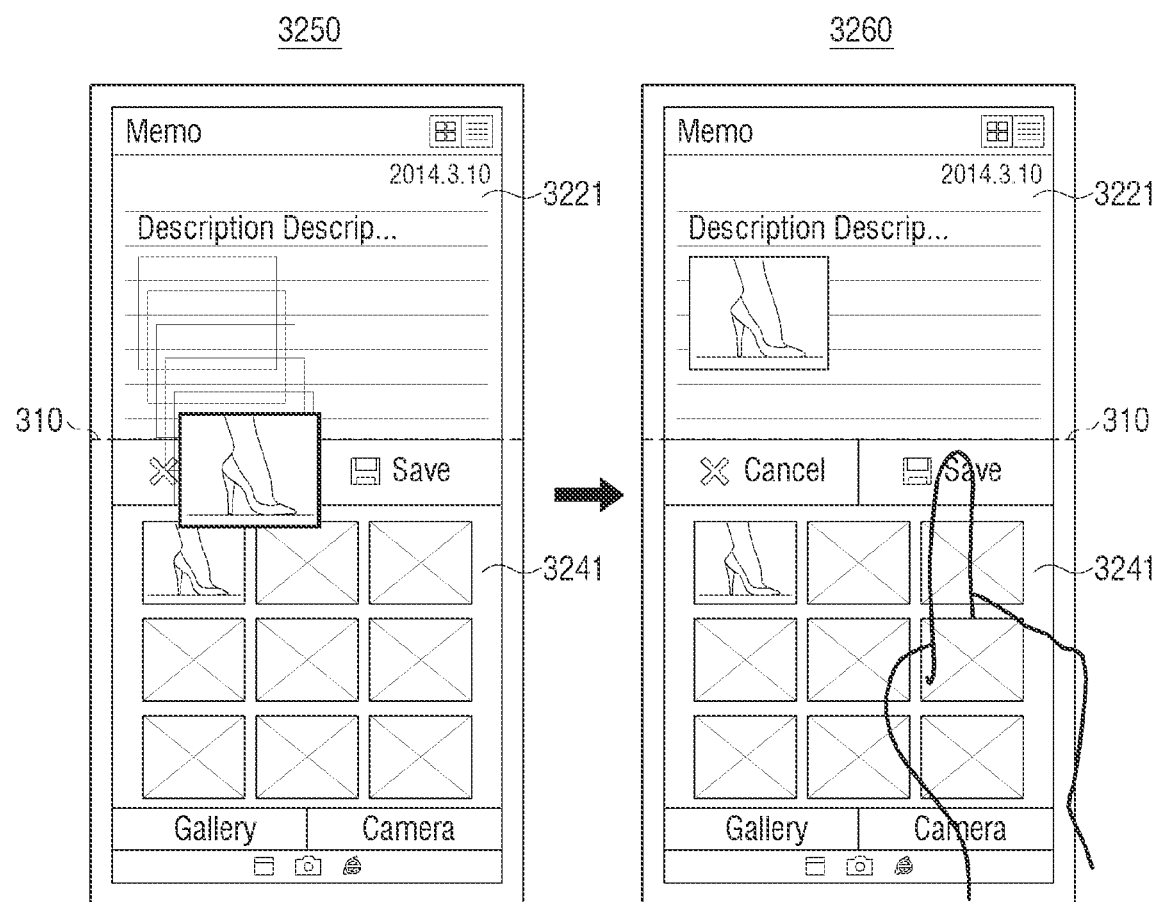

If the detector 280 detects the user interaction, as illustrated in 3250 of FIG. 32C, the controller 290 may control the display 230 to display a visual effect of moving the selected image to the first area 320.

In addition, as illustrated in 3260 of FIG. 32C, the controller 290 may control the display 230 to display the memo writing screen 3221 including the selected image on the first area. While the selected image is included in the memo writing screen 3221, the detector 280 may detect a user interaction tapping a storage button for executing the function of storing a written memo.

Figure 32D:
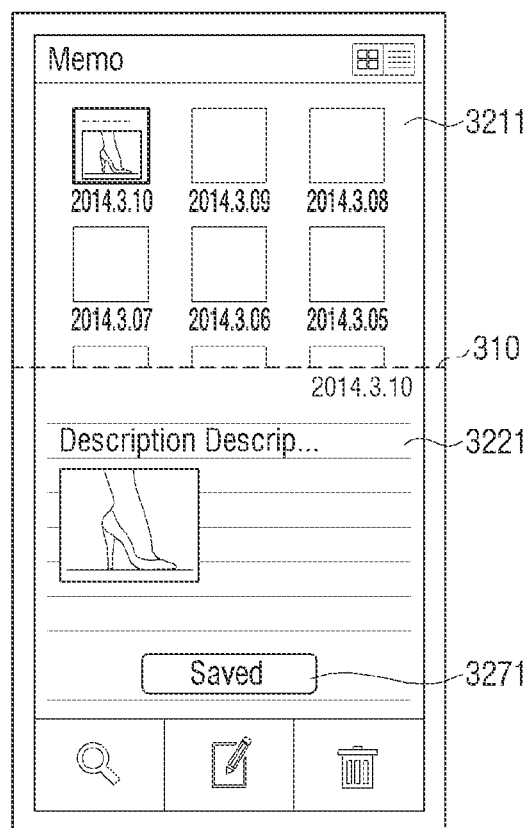

If the detector 280 detects the user interaction, as illustrated in 3270 of FIG. 32D, the controller 290 may store the content of the memo writing screen 3221 including images as a memo, and may control the display 230 to display the memo list screen 3211 including the stored memo on the first area 320. The controller 290 may control the display 230 to display a toast pop-up 3271 informing that the memo is stored for a few seconds (for example, 1~2 seconds).

Figure 33:
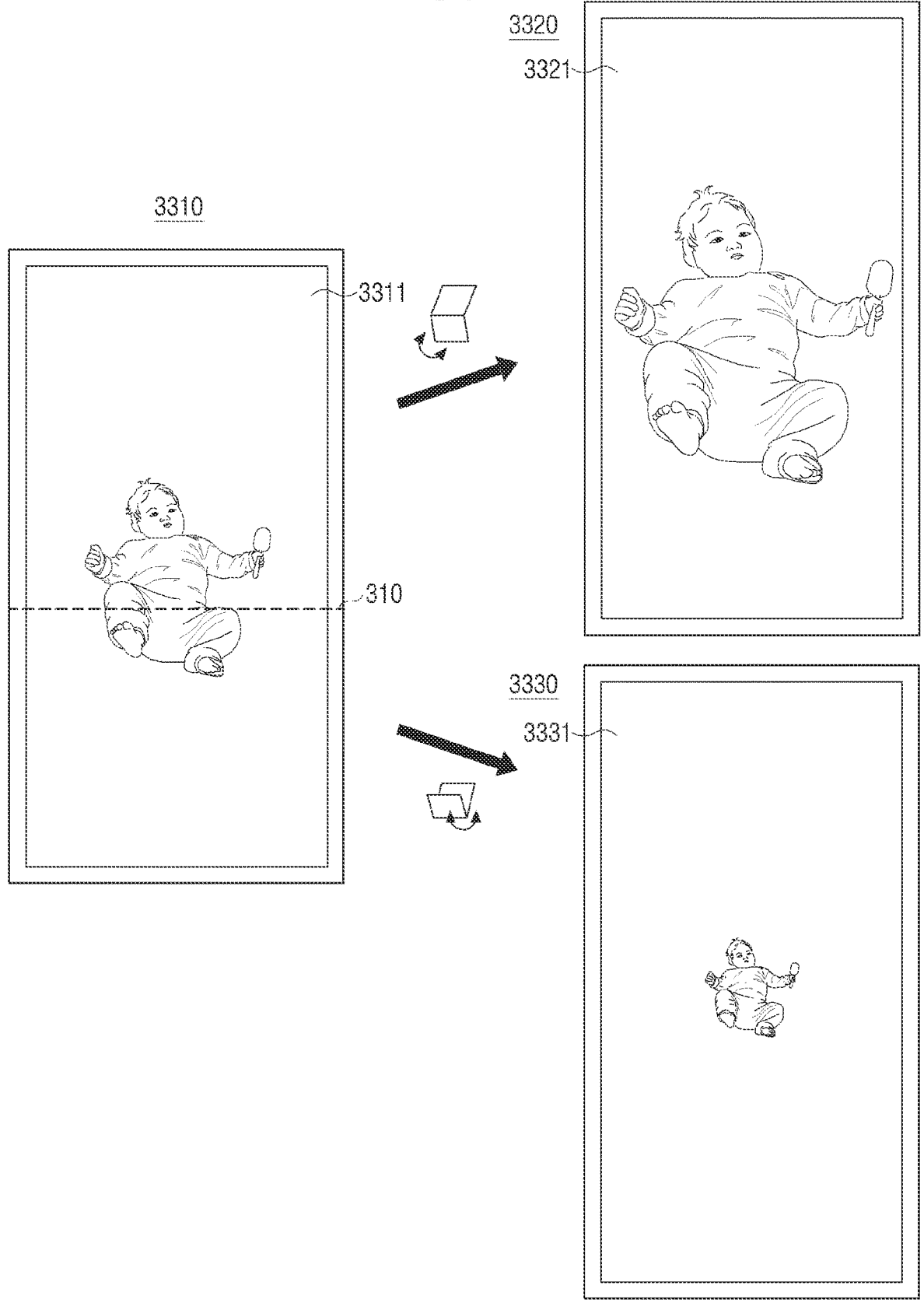

FIG. 33 illustrates an exemplary embodiment of performing various functions of the user terminal device 200 illustrated in FIG. 2 based on a folding interaction.

As illustrated in FIG. 3310 of FIG. 33, the controller 290 may control the display 230 to display a screen 3311 including an image content on the first area 320 and the second area 330. While the screen 3311 is displayed, the detector 280 may detect a first flap interaction of folding the display 230 backward up to a predetermined angle range with reference to the folding line 310 and unfolding the display 230. In addition, the detector 280 may detect a second flap interaction of folding the display 230 forward up to a predetermined angle range with reference to the folding line 310 and unfolding the display 230.

If the detector 280 detects the first flap interaction, as illustrated in 3320 of FIG. 33, the controller 290 may control the display 230 to display a screen 3321 including a magnified image content on the first area 320 and the second area 330. In this case, the controller 290 may change a magnification ratio of the image content according to the angle where the display 230 is folded backward with reference to the folding line 310. For example, the greater the angle where the display 230 is folded, the higher the magnification ratio of the image content.

On the other hand, if the detector 280 detects the second flap interaction, as illustrated in 3330 of FIG. 33, the controller 290 may control the display 230 to display a screen 3331 including a reduced image content on the first area 320 and the second area 330. In this case, the controller 290 may change a reduction ratio of an image content according to the angle where the display 230 is folded forward with reference to the folding line 310. For example, the greater the angle where the display 230 is folded, the higher the reduction ratio of the image content.

Figure 34:
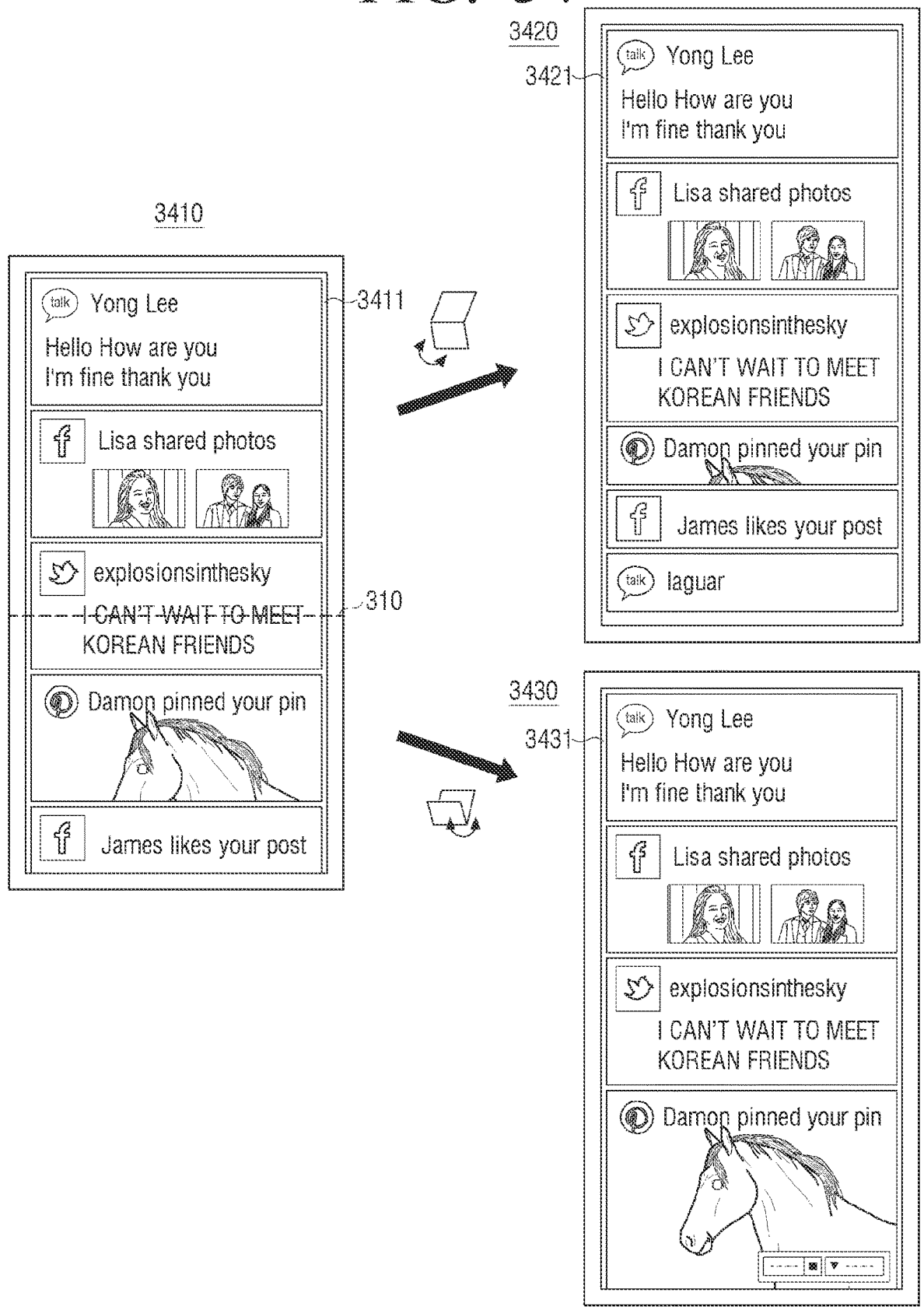

FIG. 34 illustrates an exemplary embodiment of performing various functions of the user terminal device 200 illustrated in FIG. 2 based on a folding interaction.

As illustrated in 3410 of FIG. 34, the controller 290 may control the display 230 to display a screen 3411 including an information list on the first area 320 and the second area 330. If the information list is, for example, a feed list for sharing information with members of a specific group through a social network service, the information list may include at least one of identification information of a counterpart who registers the information, a text, an image content, and icons. While the screen 3411 is displayed, the detector 280 may detect the first flap interaction of folding the display 230 backward up to a predetermined angle range with reference to the folding line 310 and unfolding the display 230. Alternatively, the detector 280 may detect the second flap interaction of folding the display 230 forward up to a predetermined angle range with reference to the folding line 310 and unfolding the display 230.

If the detector 280 detects the first flap interaction, as illustrated in 3420 of FIG. 34, the controller 290 may control the display 230 to summarize and display information included in the first area 320 as screen 3421. Specifically, the controller 290 may control the display 230 to display the titles feeds included in the first area 320 as if they fall down and accumulated in a gravity direction.

On the other hand, if the detector 280 detects the second flap interaction after the display 230 is folded forward, as illustrated in 3430 of FIG. 34, the controller 290 may control the display 230 to magnify and display information included in the first area 320 as screen 3431. Specifically, the controller 290 may control the display 230 to magnify cards of the feeds included in the first area 320 so that the cards including more detailed content can be displayed.

Figure 35:
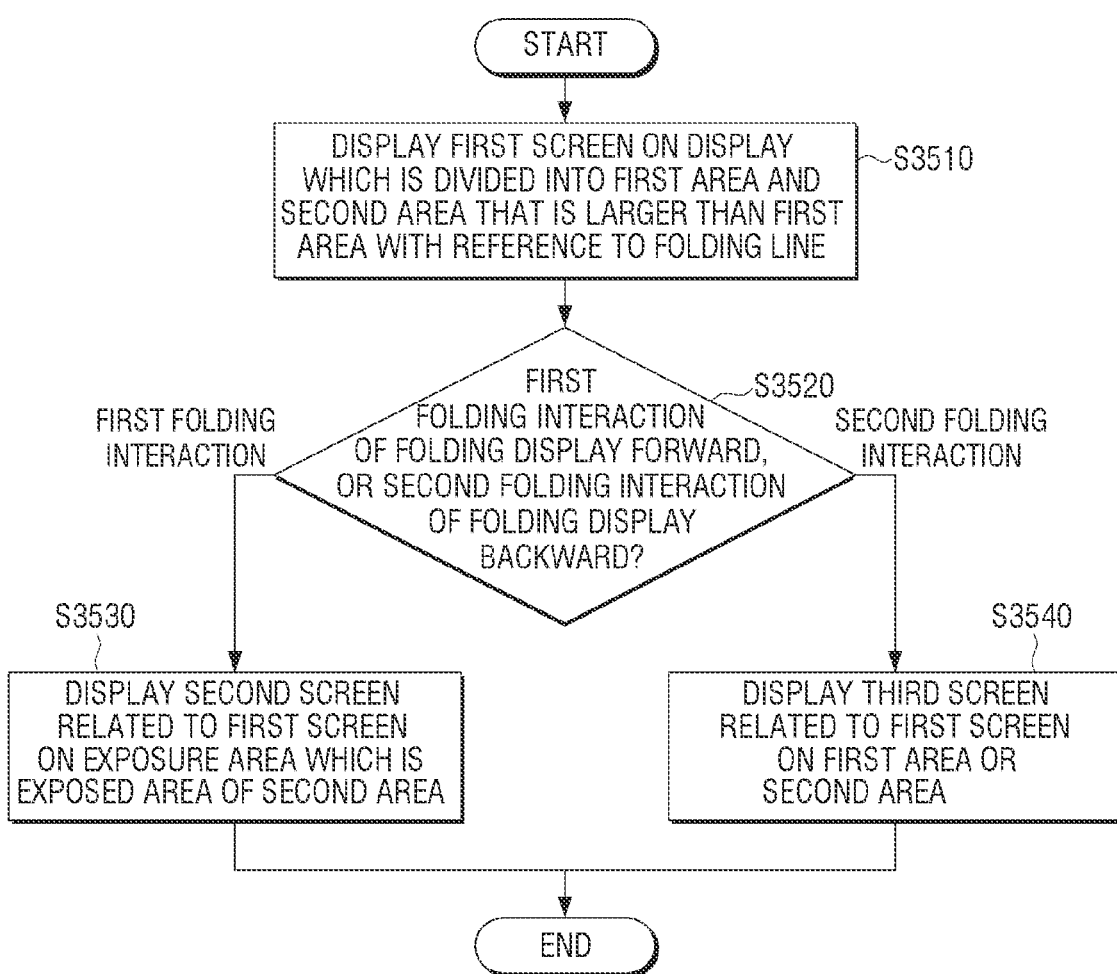
FIGS. 35 to 37 are illustrating a displaying method of a user terminal device according to an exemplary embodiment.

FIG. 35 is a flowchart illustrating a displaying method of the user terminal device 200 according to an exemplary embodiment.

Specifically, the user terminal device 200 may display a first screen on the display 230 which is divided into the first area 320 and the second area 330 which is larger than the first area with reference to the folding line 310 (S3510).

The user terminal device 200 may determine whether a first folding interaction of folding the display 230 forward is detected, or a second folding interaction of folding the display 230 backward is detected (S3520). In this case, the first folding interaction may be a folding interaction of folding the display 230 forward such that the first area 320 faces the second area 330 with reference to the folding line 310. The second folding action may be a folding interaction of folding the display backward such that the first cover 350 corresponding to the first area 320 faces the second cover 360 corresponding to the second area 330 with reference to the folding line 310.

If the first folding interaction is detected, the user terminal device 200 may display a second screen related to the first screen on the exposure area 340 which is an exposed part of the second area 330 (S3530). On the other hand, if the second folding interaction is detected, the user terminal device 200 may display a third screen related to the first screen on the first area 320 or the second area 330 (S3540).

Figure 36:
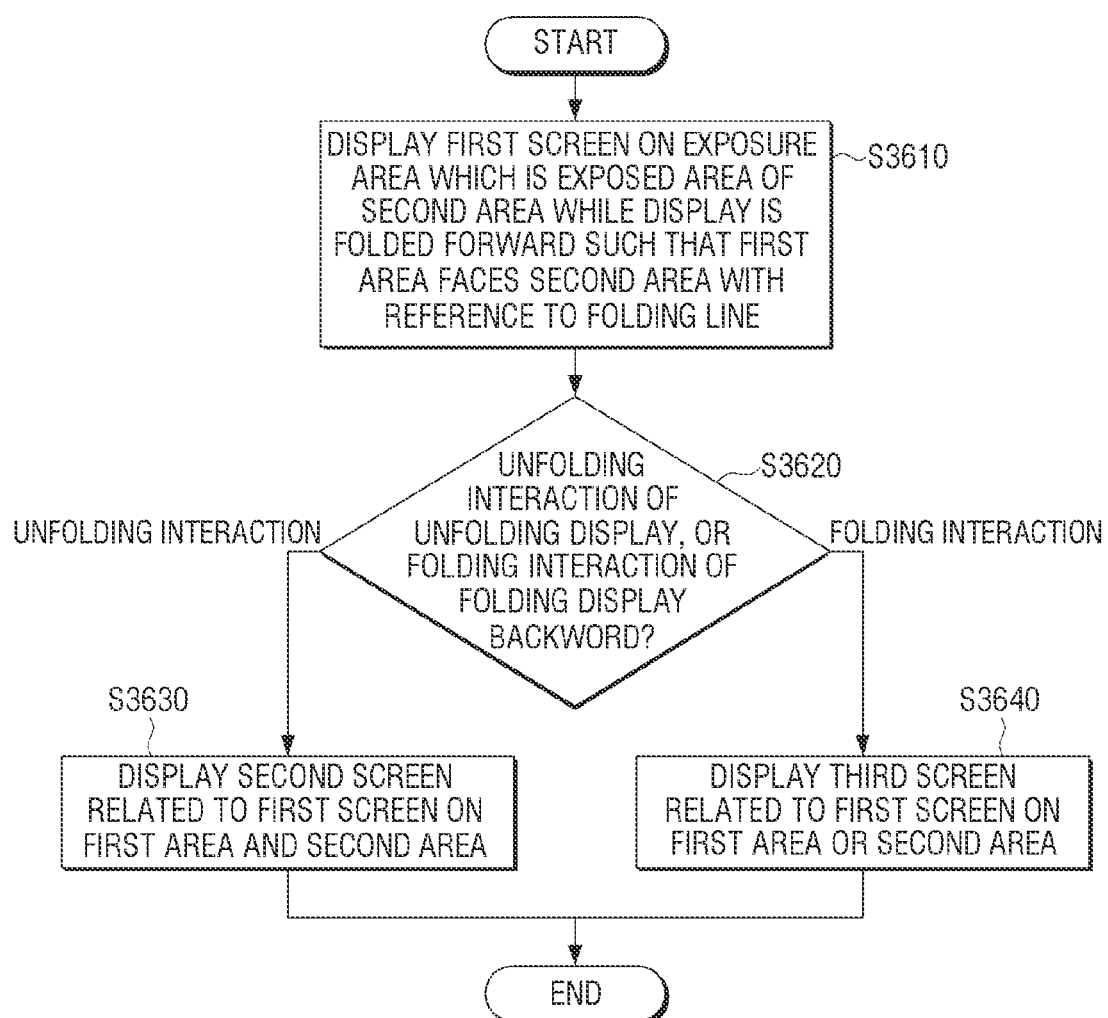

FIG. 36 is a flowchart illustrating a displaying method of the user terminal device 200 according to another exemplary embodiment.

Specifically, the user terminal device 200 may display the first screen on the exposure area 340 which is an exposed part of the second area while the display 230 is folded forward such that the first area 320 faces the second area 330 with reference to the folding line 310 (S3610).

The user terminal device 200 may determine whether an unfolding interaction of unfolding the display 230 is detected, or a folding interaction of folding the display 230 backward is detected (S3620). In this case, the folding interaction may be a folding interaction of folding the display 230 backward such that the first cover 350 corresponding to the first area 320 faces the second cover 360 corresponding to the second area 330 with reference to the folding line 310.

If the unfolding interaction is detected, the user terminal device 200 may display the second screen related to the first screen on the first area 320 and the second area 330 (S3630). On the other hand, if the folding interaction is detected, the user terminal device 200 may display the third screen related to the first screen on the first area 320 or the second area 330 (S3640).

Figure 37:
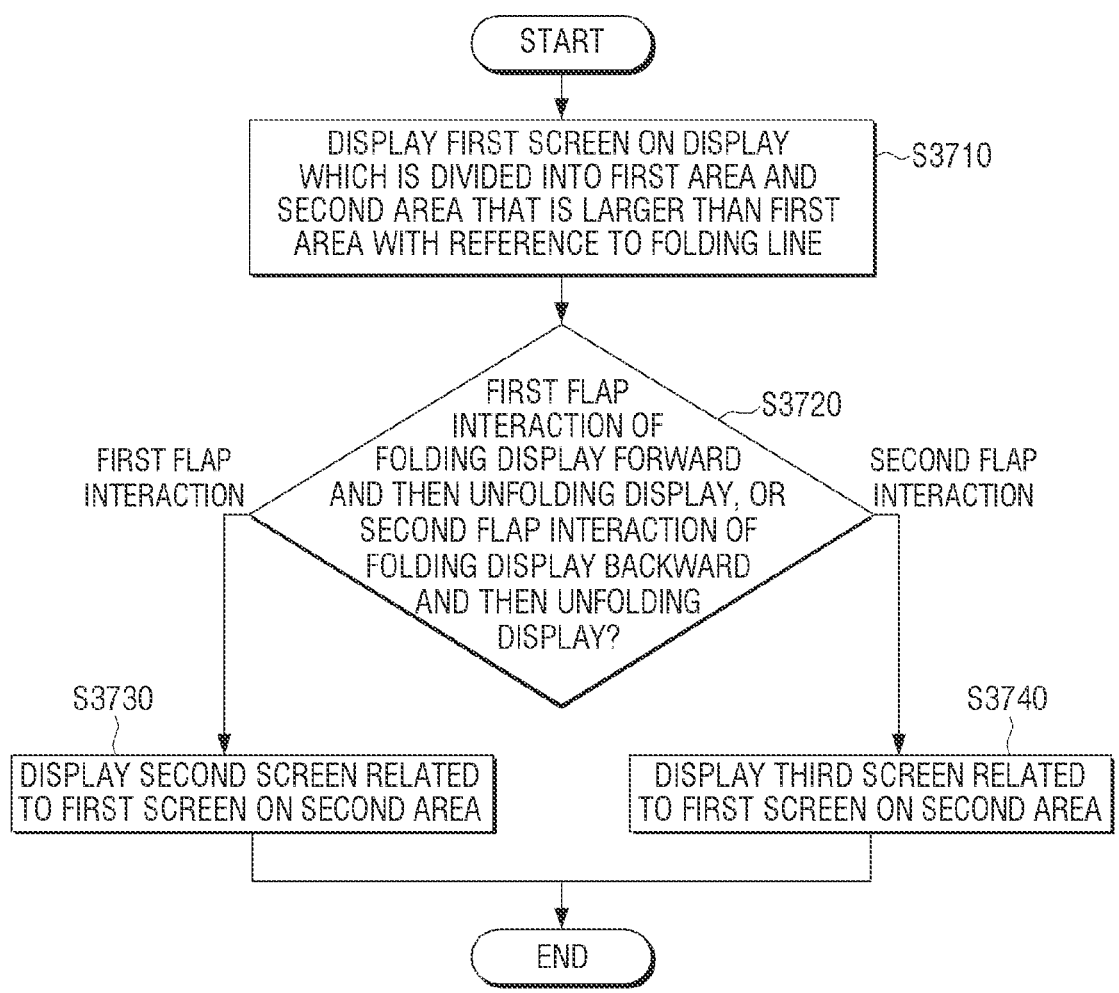

FIG. 37 is a flowchart illustrating a displaying method of the user terminal device 200 according to another exemplary embodiment.

Specifically, the user terminal device may display the first screen on the display 230 which is divided into the first area 320 and the second area 330 which is larger than the first area 320 with reference to the folding line (S3710).

The user terminal device 200 may determine whether a first flap interaction of folding the display 230 forward up to a predetermined angle range with reference to the folding line 310 and then, unfolding the display 230 is detected, or a second flap interaction of folding the display 230 up to a predetermined angle range with reference to the folding line 310 and then, unfolding the display 230 is detected (S3720).

If the first flap interaction is detected, the user terminal device 200 may display the second screen related to the first screen on the second area 330 (S3730). On the other hand, if the second flap interaction is detected, the user terminal device 200 may display the third screen related to the first screen on the second area 330 (S3740).

As described above, a UI is displayed on an exposure area which is an exposed area when the display 230 is folded and thus, a user may perform various functions of a user terminal device through the UI displayed on the exposure area even if the display is folded and may be provided with various information.

A displaying method of a user terminal device according to the above-described various exemplary embodiments may be realized as a program and provided in the user terminal device. Specifically, a non-transitory computer readable medium where a program including a method for controlling a user terminal device is stored can be provided.

The non-transitory recordable medium refers to a medium which may store data semi-permanently and may be readable by an apparatus. Specifically, the non-transitory readable medium may be CD, DVD, hard disk, Blu-ray disk, USB, memory card, ROM, etc.

The foregoing exemplary embodiments and advantages are merely exemplary and are not to be construed as limiting the present invention. The present teaching can be readily applied to other types of apparatuses. Also, the description of exemplary embodiments of the present inventive concept is intended to be illustrative, and not to limit the scope of the claims, and the disclosure includes many alternatives, modifications, and variations apparent to those skilled in the art.

What is claimed is:

1. An electronic device comprising a first cover and a second cover, the electronic device comprising:
   a hinge configured to fold or unfold the first cover and the second cover of the electronic device, the first cover and the second cover being coupled through the hinge;
   a detector comprising circuitry configured to detect unfolded state information of the electronic device; and
   one or more processors configured to:
      based on identifying that the electronic device is in a first unfolded state, control to provide first information to a first display area of a display of the electronic device, the first cover and the second cover being unfolded within a predetermined range in the first unfolded state, and
      based on identifying that the electronic device is in a second unfolded state, control to provide second information on a second display area of the display of the electronic device, the first cover and the second cover being unfolded to exceed the predetermined range in the second unfolded state,
   wherein the first information includes one or more User Interface (UI) elements, and the second information includes information related to at least one of the one or more UI elements.

2. The electronic device as claimed in claim 1, wherein the one or more processors are further configured to, based on a touch interaction being detected on a UI element of the one or more UI elements, perform a function corresponding to the UI element.

3. The electronic device as claimed in claim 1, wherein the one or more processors are further configured to, based on identifying, through the detector, that the electronic device is in the second unfolded state, provide a screen related to a UI element of the one or more UI elements to at least one of the first display area or the second display area.

4. The electronic device as claimed in claim 1, wherein the one or more UI elements include a UI element related to a call request.

5. A displaying method of an electronic device comprising a first cover and a second cover, the method comprising:
   based on identifying, through a detector, that the electronic device is in a first unfolded state, providing first information to a first display area of a display of the electronic device, the first cover and the second cover being unfolded within a predetermined range in the first unfolded state, and
   based on identifying, through the detector, that the electronic device is in a second unfolded state, providing second information on a second display area of the display of the electronic device, the first cover and the second cover being unfolded to exceed the predetermined range in the second unfolded state,
   wherein the first information includes one or more User Interface (UI) elements, and the second information includes information related to at least one of the one or more UI elements.

6. The method as claimed in claim 5, further comprising:
   based on a touch interaction being detected on a UI element of the one or more UI elements, performing a function corresponding to the UI element.

7. The method as claimed in claim 5, further comprising, based on identifying, through the detector, that the electronic device is in the second unfolded state, providing a screen related to a UI element of the one or more UI elements to at least one of the first display area or the second display area.

8. The method as claimed in claim 5, wherein the one or more UI elements include a UI element related to a call request.

9. The electronic device as claimed in claim 1, wherein the first display area is an edge area of the display.

10. The electronic device as claimed in claim 1, wherein the second display area is an entire area of the display.

11. The method as claimed in claim 5, wherein the first display area is an edge area of the display.

12. The method as claimed in claim 5, wherein the second display area is an entire area of the display.

13. A non-transitory computer-readable recording medium having recorded therein a program for performing a displaying method of an electronic device comprising a first cover and a second cover, the method comprising:
   based on identifying, through a detector, that the electronic device is in a first unfolded state, providing first information to a first display area of a display of the electronic device, the first cover and the second cover being unfolded within a predetermined range in the first unfolded state, and
   based on identifying, through the detector, that the electronic device is in a second unfolded state, providing second information on a second display area of the display of the electronic device, the first cover and the second cover being unfolded to exceed the predetermined range in the second unfolded state,
   wherein the first information includes one or more User Interface (UI) elements, and the second information includes information related to at least one of the one or more UI elements.

14. The non-transitory computer-readable recording medium as claimed in claim 13, wherein the method further comprises, based on a touch interaction being detected on a UI element of the one or more UI elements, performing a function corresponding to the UI element.

15. The non-transitory computer-readable recording medium as claimed in claim 13, wherein the one or more UI elements include a UI element related to a call request.

16. The non-transitory computer-readable recording medium as claimed in claim 13, wherein the method further comprises, based on identifying, through the detector, that the electronic device is in the second unfolded state, providing a screen related to a UI element of the one or more UI elements to at least one of the first display area or the second display area.

17. The non-transitory computer-readable recording medium as claimed in claim 13, wherein the first display area is an edge area of the display.

18. The non-transitory computer-readable recording medium as claimed in claim 13, wherein the second display area is an entire area of the display.

19. The electronic device as claimed in claim 1, wherein the unfolded state information includes an angle between the first cover and the second cover.

20. The electronic device as claimed in claim 1, wherein the information related to the at least one of the one or more UI elements in the second information includes detailed information related to the at least one of the one or more UI elements.

21. The electronic device as claimed in claim 20, wherein the detailed information related to the at least one of the one or more UI elements includes at least one of name information or contact information.

22. The electronic device as claimed in claim 4, wherein the second information includes detail information related to the call request.

23. The electronic device as claimed in claim 22, wherein the detail information related to the call request includes at least one of name or contact information of a counterpart of the call request.

24. The electronic device as claimed in claim 1, wherein the identifying that the electronic device is in the first unfolded state and the identifying that the electronic device is in the second unfolded state are both based on the unfolded state information.

* * * * *